United States Patent
Dacus et al.

(10) Patent No.: US 8,410,906 B1
(45) Date of Patent: *Apr. 2, 2013

(54) BATTERY ASSISTED RFID SYSTEM RF POWER CONTROL AND INTERFERENCE MITIGATION METHODS

(75) Inventors: Farron Dacus, Dallas, TX (US); Johannes Albertus van Niekerk, Dallas, TX (US); Alfonso Rodriguez, Shady Shores, TX (US)

(73) Assignee: Intelleflex Corporation, Santa Clara, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 12/205,718

(22) Filed: Sep. 5, 2008

(51) Int. Cl.
*H04Q 5/22* (2006.01)
(52) U.S. Cl. .................................. 340/10.1; 455/41.2
(58) Field of Classification Search ............... 340/10.1, 340/10.2, 10.3, 10.4, 10.41, 10.5, 572.1, 340/541, 426.2, 10.34, 572.7, 10.32; 455/41.1, 455/41.2
See application file for complete search history.

(56) References Cited

U.S. PATENT DOCUMENTS

| | | | | |
|---|---|---|---|---|
| 5,649,295 A * | 7/1997 | Shober et al. | ............... | 340/10.1 |
| 6,100,790 A * | 8/2000 | Evans et al. | ............... | 340/10.3 |
| 6,169,474 B1 * | 1/2001 | Greeff et al. | ............... | 340/10.1 |
| 7,990,249 B1 * | 8/2011 | Hyde et al. | ............... | 340/10.1 |
| 2002/0080024 A1 * | 6/2002 | Nelson et al. | ............... | 340/503 |
| 2004/0150510 A1 * | 8/2004 | Taki et al. | ............... | 340/10.1 |
| 2004/0235428 A1 * | 11/2004 | Nagai et al. | ............... | 455/85 |
| 2006/0238305 A1 * | 10/2006 | Loving et al. | ............... | 340/10.1 |
| 2006/0279408 A1 * | 12/2006 | Atkins et al. | ............... | 340/10.2 |
| 2007/0018793 A1 * | 1/2007 | Stewart et al. | ............... | 340/10.3 |
| 2008/0204193 A1 * | 8/2008 | Zai et al. | ............... | 340/10.1 |
| 2009/0002176 A1 * | 1/2009 | Bekritstky et al. | ............... | 340/572.7 |
| 2009/0121841 A1 * | 5/2009 | Twitchell, Jr. | ............... | 340/10.4 |
| 2009/0295545 A1 * | 12/2009 | O'Haire et al. | ............... | 340/10.5 |

OTHER PUBLICATIONS

Restriction/Election Requirement from U.S. Appl. No. 12/478,672 dated Aug. 17, 2011.
Agilent Technologies, Inc., Application Note 969, "The Zero Bias Schottky Detector Diode", Nov. 1999, pp. 1-6, Obsoletes 5952-9823E.
Agilent Technologies, Inc., Application Note 1089, "Designing Detectors for RF/ID Tags", Nov. 1999, pp. 1-12.

(Continued)

*Primary Examiner* — Nabil Syed
(74) *Attorney, Agent, or Firm* — Zilka-Kotab, PC

(57) ABSTRACT

The present invention discloses battery assisted RFID system RF power leveling methods that optimize the amount of transmitted power and interference from a reader in relation to the sensitivity of the RFID tags, their ranges from the reader, and the unique physics of the backscatter RFID radio link. These methods enhance system reliability when employing battery assisted RFID tags that operate with sensitive transistor based square law tag receivers and highly sensitive RFID readers intended to take advantage of outstanding tag sensitivity. Further enhancement is achieved via design of system command sets and tag state machine behavior that optimally support the power level operations, power level operations that span across tag hibernation and normal modes, and that otherwise control system interference. Embodiments of the present invention are also enhanced with receiver training and synchronizing methods suited to the high tag sensitivity and need for dynamic range state switching. These enhancements may employ pseudo-random sequence based receiver training, activation signaling, and frame synchronizing.

24 Claims, 45 Drawing Sheets

OTHER PUBLICATIONS

Agilent Technologies, Inc., Application Note 1156, "Diode Detectors Simulation using Agilent Technologies EEsof ADS Software", Nov. 1999, pp. 1-4.

Dean Kawaguchi, Preamble PRN Analysis Report, Dec. 29, 2009, pp. 1-4.

Henry C. Torrey & Charles A. Whitmer. "Crystal Rectifiers", vol. 15 of MIT Radiation Labroratroy Series, McGraw-Hill, New York, 1948, pp. 333-350.

Final Office Action Summary from U.S. Appl. No. 12/478,672 dated Sep. 26, 2011.

Final Office Action Summary from U.S. Appl. No. 12/478,672 dated Feb. 7, 2012.

Non-Final Office Action Summary from U.S. Appl. No. 12/478,672 dated Jul. 25, 2012.

Notice of Allowance and Fee(s) Due from U.S. Appl. No. 12/478,672 dated Dec. 12, 2012.

* cited by examiner

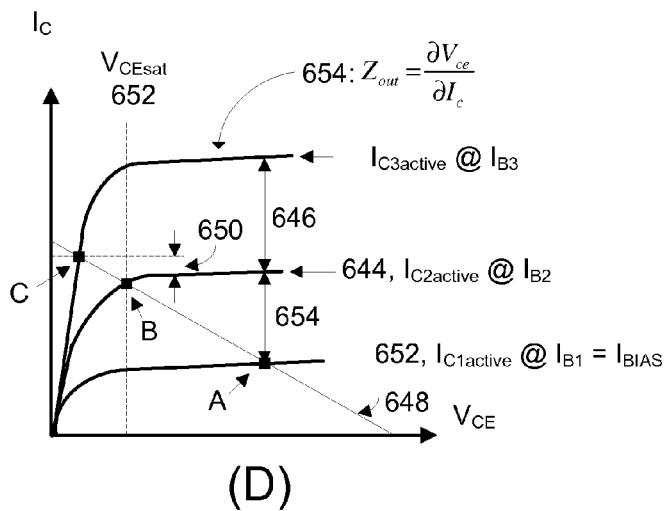
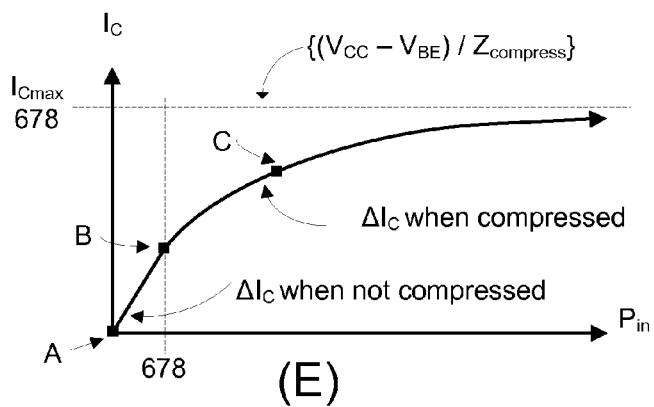
FIG. 6

(Semi-Passive Class 3 Activation Command)

| Preamble | Activation Control (12 bits) | Target (11 bits) | Mask Length (7 bits) | Address/ Offset (7 bits) | Mask (0 to 96 bits) | Reader Info (17 bits) | Extension Flag (1 bit) | CRC (16 bits) |
|---|---|---|---|---|---|---|---|---|
| 1900 | 1902 | 1904 | 1906 | 1908 | 1910 | 1912 | 1914 | 1916 |

FIG. 19

(Semi-Active Class 3 Plus Activation Command)

| Preamble | Activation Control (12 bits) | Target (11 bits) | Mask Length (7 bits) | Address/ Offset (7 bits) | Mask (0 to 96 bits) | Reader Info (7 bits) | Ext Flag (1 bit) | Active Tx Set Up (26 bits) | Ext Flag (1 bit) | CRC (16 bits) |
|---|---|---|---|---|---|---|---|---|---|---|
| | | | | | | | 2014 | 2016 | 2018 | 2020 |

FIG. 20

(Fully Active Class 4 Activation Command)

| Preamble | Activation Control (12 bits) | Target (11 bits) | Mask Length (7 bits) | Address/ Offset (7 bits) | Mask (0 to 96 bits) | Reader Info (7 bits) | Ext Flag (1 bit) | Active Tx Set Up (26 bits) | Ext Flag (1 bit) | Active Rx Set Up (31 bits) | CRC (16 bits) |
|---|---|---|---|---|---|---|---|---|---|---|---|
| | | | | | | | 2114 | 2116 | 2118 | 2120 | 2122 |

FIG. 21

(Expanded Reader Activation Control Field for all activation commands)

|  | RFU | Activation Version | Data Rate | Sensitivity | RFU |
|---|---|---|---|---|---|
| # of bits | 3 | 1 | 3 | 1 | 4 |
| Description | RFU | 0: short format<br>1: long format<br>Must be set to 0 for Short Activation | 000: RFU<br>001: 8 kbit/s<br>010: 16 kbit/s<br>011: 32 kbit/s<br>100: 64 kbit/s<br>101: 128 kbit/s<br>110: RFU<br>111: RFU | 0: low sensitivity (approx -30 dBm to +10 dBm)<br>1: high sensitivity (approximately -30 dBm and below) |  |
|  | 2202 | 2204 | 2206 | 2208 | 2210 |

FIG. 22

(Expanded Reader Info Field for all activation commands)

|  | Reader ID | Reader Lock | Region Field |
|---|---|---|---|
| # of bits | 8 | 1 | 8 |
| Description | Reader ID code | 0: Tag allows any reader to access<br>1: Tag only allows this reader to access | Specifies a region in which the tag operates. Precise interpretation TBD. |

|  | 2302 | 2304 | 2306 |

FIG. 23

(Expanded Target Field for all activation commands)

|  | Class | Session | Inventory Flag Use | Inventory Flag Target | Stateful Hibernate Timeout |
|---|---|---|---|---|---|
| # of bits | 3 | 2 | 1 | 1 | 4 |
| Description | 000: All<br><br>001: Class 3<br><br>010: Class 3+<br><br>011 to 111: RFU | 00: S0<br><br>01: S1<br><br>10: S2<br><br>11: S3 | 0: Don't Care<br><br>1: Do Care, Use Inventory Flag State | 0: A<br><br><br><br>1: B<br><br><br><br>Inv Flag state is used if Inv Flag Use = Do Care | 0000: 0 s<br>0001: 0.25 s<br>0010: 0.50 s<br>0011: 1.0 s<br>0100: 2.0 s<br>.<br>.<br>.<br>1111: 4096 s |
|  | 2402 | 2404 | 2406 | 2408 | 2410 |

FIG. 24

(Expanded Active Tx Set Up field used in Class 3 Plus and Class 4)

| Base Mode | New Channel | Auto Pwr Level | Low Pwr Tag Transmit Power (dBm) (Base Mode = 01) | Hi Pwr Tag Transmit Power (dBm) (Base Mode = 10) | Data Rate (kbps) | Mod Mode |
|---|---|---|---|---|---|---|
| 2 | 13 | 1 | 4 | 4 | 4 | 2 |
| 00: Backscatter 01: Low Pwr Active 10: High Power Active 11: TBD | Absolute Channel number in steps specified during activation | 0: No 1: Yes | 0000:-45 0001:-40 0010:-35 0011:-30 0100:-25 0101:-20 0110:-15 0111:-10 1000:-5 1001:-3 1010:-2 1011:-1 1100: 0 1101: +1 1110: +2 1111: +3 | 0000:-45 0001:-40 0010:-35 0011:-30 0100:-25 0101:-20 0110:-15 0111:-10 1000:-5 1001: 0 1010: +5 1011: +10 1100: +15 1101: +20 1110: +25 1111: +30 | 0000: 4 0001: 6 0010: 8 0011:12 0100: 16 0101: 24 0110: 32 0111: 48 1000: 64 1001: 96 1010: 128 Others RFU | 00: ASK 01: FSK 10: PSK 11: QPSK |
| 2500 | 2502 | 2504 | 2506 | 2508 | 2510 | 2512 |

FIG. 25

(Expanded Active Rx Set Up Field used in fully active Class 4)

| Receiver OFF time | Receiver ON time | New Channel | Data Rate (kbps) | Mod Mode |
|---|---|---|---|---|
| 8 | 4 | 13 | 4 | 2 |
| Number of units of time (each unit is 0.25s) receiver is off. Special Value 11111111 means infinite | Number of units of time (each unit is 0.25s) that the receiver stays ON | Absolute Channel number in steps specified during activation | 0000: 4<br>0001: 6<br>0010: 8<br>0011: 12<br>0100: 16<br>0101: 24<br>0110: 32<br>0111: 48<br>1000: 64<br>1001: 96<br>1010: 128<br>Others RFU | 00: ASK<br>01: FSK<br>10: PSK<br>11: QPSK |
| 2600 | 2602 | 2604 | 2606 | 2608 |

FIG. 26

(Battery QueryRep command structure)

|  | CMD ID | Session | Short Reader ID |
|---|---|---|---|
| # of bits | 2 | 2 | 8 |
| Description | 00 | 00: S0<br>01: S1<br>10: S2<br>11: S3 | Included if locking is in effect. |

(Next Command)

|  | CMD ID | Hibernate Sensitivity NOTE 1 | RN |
|---|---|---|---|
| # of bits | 8 | 1 | 16 |
| Description | 1100 1011 | 0: low sensitivity (approx -30 dBm to +10 dBm)<br>1: high sensitivity (approximately -30 dBm and below) | RN16 or RN16_handle |

(Deactivate_BAT Command)

| | CMD ID | Sel | Session | Target | Inventory Flag Use | Override | Hibernate Sensitivity | Interrogator ID | CRC |
|---|---|---|---|---|---|---|---|---|---|
| # of bits | 8 | 2 | 2 | 1 | 1 | 1 | 1 | 8 | 16 |
| Description | 1100 1010 | 00: All<br>01: All<br>10: ~SL<br>11: SL | 00:S0<br>01:S1<br>10:S2<br>11:S3 | 0: A<br>1: B | 0: Don't care for Inventory state<br>1: Do care for Inventory state | 0:Use SL and Inventory criteria<br>1:Go to Hibernate Always (i.e. all sessions) | 0: low sensitivity (approx-30 dBm to +10 dBm)<br>1: high sensitivity (approximately -30 dBm and below) | Tag checks if interrogator or locking is in effect. | |

Power Leveling Extended Semi-Passive Class 3 Activation Command)

| Preamble | Activation Control (12 bits) | Target (11 bits) | Mask Length (7 bits) | Address/ Offset (7 bits) | Mask (0 to 96 bits) | Reader Info (17 bits) | Pwr Info (5-10 bits) | Extension Flag (1 bit) | CRC (16 bits) |
|---|---|---|---|---|---|---|---|---|---|

Flex_Query Command

| | Command | Tag Type Select | SS Response | DR | M | TRext | Sel | Session | Target | Q | CRC-5 |
|---|---|---|---|---|---|---|---|---|---|---|---|
| # of bits | 8 | 12 | 1 | 1 | 2 | 1 | 2 | 2 | 1 | 4 | 5 |
| Description | 11001111 | | 0: Disable<br>1: Enable | 0: DR=8<br>1: DR=64/3 | 00: M=1<br>01: M=2<br>10: M=3<br>11: M=4 | 0: No pilot tone<br>1: Use pilot tone | 00: All<br>01: All<br>10: ~SL<br>11: SL | 00: S0<br>01: S1<br>10: S2<br>11: S3 | 0: A<br>1: B | 0-15 | |

FIG. 33

Flex_Query Command Tag Type Select Field

| RFU | RFU | RFU | Sensor Alarm | Full Function Sensor | Simple Sensor | Active Class 4 Type 2 | Active Class 4 Type 1 | Semi-Active Class 3+ | Semi-Passive Class 3 | Semi-Passive Class 3 | Passive Class 2 | Passive Class 1 |
|---|---|---|---|---|---|---|---|---|---|---|---|---|
| 1 | 1 | 1 | 1 | 1 | 1 | 1 RFU | 1 RFU | 1 RFU | 1 | 1 | 1 RFU | 1 |
|  |  |  | 0: Disable  1: Enable | 0: Disable  1: Enable | 0: Disable  1: Enable | 0: Disable  1: Enable | 0: Disable  1: Enable | 0: Disable  1: Enable | 0: Disable  1: Enable | 0: Disable  1: Enable | 0: Disable  1: Enable | 0: Disable  1: Enable |

FIG. 34

Example of Tag Capabilities Word

| Bit Meaning | Bit Assignments | Behaviour |
|---|---|---|
| Persistence Maximums (PM) flag<br>1 bit<br>NOTE 1 | Bits 0 | 0: Persistence maximums on flags S2, S3, and SL are not supported.<br>1: Persistence maximums on flags S2, S3, and SL are supported. |
| Passive Fall Back (PFB) flag<br>1 bit<br>NOTE 2 | Bit 1 | 0: Passive Fall Back is not supported.<br>1: Passive Fall Back is supported. |
| PFB Parallel (PFBP) flag<br>NOTE 2 | Bit 2 | 0: PFB cannot parallel other modes.<br>1: PFB can parallel other modes. |
| Passive Fall Back Sensitivity Field (PFBS)<br>2 bits | Bits 3-4 | 00: PFB sensitivity > 0 dBm<br>01: -10 dBm < Sensitivity < 0 dBm<br>10: -15 dBm < Sensitivity < -10 dBm<br>11: Sensitivity < -15 dBm<br>NOTE : nominal (not guaranteed) sensitivity over band of operation at Tari = 25 µs. |
| Dead Battery Response (DBR) Flag, 1 bit | Bit 5 | 0: DBR is not supported<br>1: DBR is supported |
| Dead Battery Response Sensitivity (DBRS) Field<br>2 bits | Bits 6-7 | 00: DBR sensitivity > 0 dBm<br>01: -10 dBm < Sensitivity < 0 dBm<br>10: -15 dBm < Sensitivity < -10 dBm<br>11: Sensitivity < -15 dBm<br>NOTE : nominal (not guaranteed) sensitivity over band of operation at Tari = 25 µs. |
| Advanced PIE (AP) flag<br>1 bit | Bit 8 | 0: Advanced PIE is not supported.<br>1: Advanced PIE is supported. |
| Advanced PIE Hibernate Parallel (APHP) flag | Bit 9 | 0: Adv PIE hibernate cannot parallel other modes.<br>1: Adv PIE hibernate can parallel other modes while receiving. |
| Advanced PIE Normal Parallel (APNP) flag<br>1 bit | Bit 10 | 0: Adv PIE normal can not parallel other modes.<br>1: Adv PIE normal can parallel other modes while receiving. |
| Adv PIE BLF (APB) flag<br>1 bit | Bit 11 | 0: Advanced PIE supports only mandatory BLF's<br>1: Adv PIE also supports currently defined optional BLF's |
| Adv PIE Hibernate Sensitivity (APHS) field<br>2 bits | Bits 12-13 | 00: Nominal tag sens > -10 dBm<br>01: -20 dBm < tag sens < -10 dBm<br>10: -30 dBm < tag sens < -20 dBm<br>11: Nominal tag sens < -30 dBm<br>NOTE : The sensitivities above refer to nominal hibernate sensitivity over design band of operation. Normal sensitivity may vary with data rate. |
| Manchester (M) flag<br>1 bit | Bit 14 | 0: Manchester forward link (Annex P) not supported<br>1: Manchester is supported. |
| Manchester Hibernate Parallel (MHP) flag | Bit 15 | 0: Manchester hibernate can not parallel other modes.<br>1: Manchester hibernate can parallel other modes while receiving. |

FIG. 36A

Example of Tag Settings Word

| Flag or Bit Assignment | Bit Assignment | Behaviour |
|---|---|---|
| Period field (P field)<br>3 bits<br>Applicable to Simple PIE and hibernation as appropriate. | Bits 0 -2 | 000: 500 ms (Note time periods similar to hibernate timer values)<br>001: 1 s<br>010: 2 s<br>011: 4 s<br>100: 8 s<br>101: 16 s<br>110: 32 s<br>111: 64 s |
| Simple PIE Listen field (SPL field)<br>3 bits<br>Notes 3-4 | Bits 3-5 | 000 : 0 s (Simple PIE is OFF)<br>001: 250 ms<br>010: 500 ms<br>011: 1 s<br>100: 2 s<br>101: 4 s<br>110: 8 s<br>111: Listen continuously |
| Advanced PIE Hibernate Listen field (APHL field)<br>3 bits<br>Notes 1-4 | Bits 6-8 | 000 : 0 s (Advanced PIE is OFF)<br>001: 250 ms<br>010: 500 ms<br>011: 1 s<br>100: 2 s<br>101: 4 s<br>110: 8 s<br>111: Listen continuously |
| Manchester Hibernate Listen field (MHL field)<br>3 bits<br>Notes 1-4 | Bits 9-11 | 000 : 0 s (Manchester is OFF)<br>001: 250 ms<br>010: 500 ms<br>011: 1 s<br>100: 2 s<br>101: 4 s<br>110: 8 s<br>111: Listen continuously |
| Tag Duty Cycle Authorization flag (TDCA flag )<br>1 bit | Bit 12 | 0: Tag is not allowed to alter duty cycle<br>1: Tag is allowed to alter duty cycle<br>Interrogator writes this bit to allow tag the option of altering duty cycle in the case of a low battery. |
| Tag Duty Cycle Report flag (TDCR flag)<br>1 bit | Bit 13 | 0: Tag has not altered duty cycles<br>1: Tag has altered duty cycles<br>Tag sets this bit if it has altered duty cycles, and also reports exact settings used in the HP, HL, and SPL fields. |
| Tag Inactivity Threshold Control (TITC) field<br>2 bit | Bits 14-15 | 00: 50 ms<br>01: 250 ms<br>10: 2 s<br>11: 8 s<br><br>Tag Inactivity Threshold Programmability (TITP) flag in BCW's indicates if this field is used. If not used, these bits are Don't Care and this timeout is manufacturer fixed. |

FIG. 36B

BATTERY ASSISTED RFID SYSTEM RF POWER CONTROL AND INTERFERENCE MITIGATION METHODS

BACKGROUND

A. Field of the Invention

The present invention relates generally to the field of Radio Frequency Identification (hereinafter, "RFID") systems, and more particularly to advanced RFID systems which employ battery supported RFID tags allowing a higher degree of active behavior in tags.

B. Background of the Invention

The applications and importance of RFID technology has significantly grown in recent years due to a number of reasons including improvements in IC processes, RFID standards development, government allocation of increased spectrum for RFID, and growing awareness of the value of automated tracking of assets. During this growth, RFID systems have progressed from relatively simple, lower-frequency systems to include more complex systems that operate in the longer-range Ultra-High Frequency spectrum. The lower-frequency, generally inductively-coupled systems are usually referred to as Low Frequency (hereinafter "LF", approximately 100-150 KHz) and High Frequency (hereinafter "HF", typically 13.56 MHz) systems. These system generally operate from ranges of a few centimeters to approximately 1 meter, and are limited in range due to the physics of "near field" communications that do not rely on a propagating electromagnetic wave. The systems operating in the Ultra-High Frequency (hereinafter "UHF", typically 800 to 1000 MHz) range can have longer ranges due to more favorable physical propagation.

Passive LF, HF, and UHF RFID systems comprise tags that operate without batteries and effectively leverage power that is wirelessly received from an RFID reader to communicate information back to the reader. In the UHF case, this process is typically called "backscatter" and allows a passive tag to communicate with an RFID reader over limited distances. Because these tags are effectively powered by the field of an RFID reader, the distance the tag can communicate is limited by its own power consumption. As a result, passive UHF systems generally operate with practical ranges of several meters.

UHF passive backscatter RFID has enjoyed success in recent years due to the availability of small geometry integrated circuit processes that enable low cost integrated chips to go in the tags, low cost tag production and test processes, greater market awareness of RFID benefits, and effective standardization. In the standards arena, the EPCglobal™ Gen 2 standard has been particularly successful in growing the supply chain RFID market. The International Organization for Standardization (ISO) has also recently moved to adopt the EPCglobal™ Gen 2 version 1.2.0 passive standard and to extend it with higher performing battery assisted RFID under its ISO/IEC 18000-6C standard.

The EPCglobal™ Gen 2 standard is a "reader talks first" architecture where the reader "selects" categories of tags with a "Select" command. The chosen tags then are entered into an "interrogation round" or "query round" with a "Query" command. The Query command provides the tags with a random number size range indictor, and the tags generate a random number within that range that is then assigned to a counter to create a "time slot" for each tags. Tags seldom select the same time slot when the random number range is large compared to the number of tags within range of the reader. In the query round a "QueryRep" command then instructs each tag to decrement its random counter. When the tag count reaches zero, the tag "replies" with a 16 bit random number. If there are no collisions between tags that happened to have the same time slot, the reader replies with the same random number and the associated tag then transmits its unique identifying code. The process of separating tag replies in time effectively allows the tags to use low cost receivers that are on the same RF "channel" as far as the relatively broadband tags can tell. The process of the reader establishing contact with a particular tag is called "singulation", and the process of the reader further interacting with the tag is called "access." In access, the reader can read and write data to tag memory.

To allow multiple readers to be in communications with overlapping populations of tags, EPCglobal™ Gen 2 based standards use the concept of "sessions". A two bit variable called the "session" or "session code" identifies 4 sessions, each of which have a "Session" or "Inventory" flag with a "session state". The flag is normally described as having state symbolic logic state "A" or "B", where each of these can be mapped in a particular tag's internal design to either Boolean state "0" or "1". Either "A" or "B" can be used to indicate that a tag has been successfully singulated or "inventoried", though it is more common in practice to use "A" for "not yet inventoried" and "B" for "recently inventoried". When up to four readers are simultaneously in range of a tag, these readers may each singulate the tag in near real time (the tag can be in the singulation process with all) via each reader using a different session, that is, using a different session code and the flag associated with that session.

Despite UHF RFID systems having extended range as compared to LF and HF, there are many applications needing a still longer operating range while also maintaining high reliability. Also, the limited range of the passive tags when the tags are in motion leads to limited time to conduct operations such as memory reads and writes. Sometimes even the time to send separate Select and Query commands for selective tag access is not reliably available.

Active RFID systems extend range by providing a power source and full featured radio on the tag. "Full featured" is intended to mean a highly sensitive and selective (interference rejecting) receiver and active transmitter whereby the tag creates its own transmit signal. These active systems can achieve ranges of hundreds of meters, but cost significantly more than passive systems. Additionally, the operational life of the active systems is limited by the batteries deployed within the tags and the ability to replace these batteries over the life of the system. Some applications, such as tracking of military supplies, can absorb the relatively higher cost of these active systems, but many others cannot.

To provide an intermediate level of performance between fully passive and fully active RFID systems, there has been over the last few years a movement to introduce "battery-assisted" or "semi-passive" RFID systems. These systems utilize the UHF band and extend upon passive tags by providing tag operating power from a compact battery such as a coin cell, thus enhancing range by eliminating the requirement for the tag to receive sufficient RF signal power to actually power itself from the signal. The tag may also utilize baseband signal gain to further enhance sensitivity. The tag maintains the use of a simple and low power "backscatter" transmitter that operates by modulating a reflection of a reader provided RF signal back to the reader. Standardization efforts have been underway within the International Standards Organization (ISO) to add semi-passive RFID technology to its EPCglobal™ Gen 2 based UHF RFID standard, ISO/IEC 18000-6C. The applicant is an active member of this organization and has contributed significantly to this particular effort.

1. Definitions

For the purposes of this invention, the following RFID tag types are defined by class. The RFID tag descriptions refer to UHF RFID tags generally operating in industrial, scientific, and medical bands with other short range radio applications, or in specialized RFID bands from 400 to 1000 MHz (most commonly 800 to 1000 MHz).

1. Passive or Class 1. In these systems, tags operate without a battery and are powered by an incoming reader field of a reader. A tag has a detector which converts RF energy into DC energy to power associated integrated circuitry within the tag. Tag sensitivity is generally on the order of about −5 dBm to −20 dBm, and reader sensitivity is on the order of about −60 to −80 dBm. Practical ranges are generally 1 to 5 meters. The system is generally "forward-link limited" due to the modest sensitivity of the tag.

2. Passive plus security or Class 2. These systems feature the same radio link technology as Class 1, but with added memory and security, and sometimes other features such as sensors.

3. Semi-Passive or Class 3. These systems feature a small battery (e.g., lithium manganese dioxide coin cell), for providing power to the tag, thus relieving the tag of very close proximity requirements to the reader. The tag receiver will generally still be wide-band detector based, though optionally improved by the use of active gain, and the tag transmitter will still use backscatter modulation. A well designed Semi-Passive tag may have tag sensitivity of up to approximately −60 dBm without an RF amplifier. A well engineered Semi-Passive system can have free space range of several hundred meters and practical ranges of several tens of meters. However, due to asymmetric backscatter link physics that favors the forward-link from reader to tag, these systems will typically be "reverse-link" limited by the sensitivity of the reader receiver. The system may also be limited by interference seen at either the tag or the reader.

4. Semi-Active or Class 3 Plus. These systems supply an optional active transmitter in the tag to substitute for backscatter transmission. This relieves the reverse-link limit of the Class 3 link, and with the addition of an RF amplifier in the tag creating tag sensitivity in the range of −70 to −80 dBm (U.S. bandwidth) generally results in an approximately "balanced link" where approximately the same link loss is allowed in both directions. For example, a link employing a reader transmitting a maximum effective radiated power of +36 dBm (the current limit for U.S. operation) and a tag sensitivity of −75 dBm can allow up to 111 dB of total link loss in the forward link. If the reader sensitivity is −110 dBm (achievable when the carrier does not have to maintain a carrier due to the transmitter providing its own transmitter), and the tag transmits 0 dBm, then the reverse link loss can be up to −110 dB. Class 3 Plus systems are not currently fielded, but they are the only class that has almost near perfect matching between forward and reverse link performances, and there are compelling technical and economic reasons to develop them.

5. Fully-Active, Active, or Class 4. These systems use fully functioning radios at the tag with receiver bandwidths similar to spectral occupancies of reader transmit signals, thereby allowing higher sensitivity and interference rejection at the tag. They also use tag transmit carriers generated on the tag that do not have to decline in transmit power as range increases, which is an inherent weakness of backscatter systems. These systems currently exist and function well, although the tags are approximately an order of magnitude higher in cost than semi-passive systems, and about two orders of magnitude higher in costs than passive systems. An enhancement to the state of the art presented in this disclosure is the part time use of Fully-Active radio circuitry in the tag in combination with high performance Semi-Passive circuitry that is used under most operating conditions, thus maximizing battery life while providing additional performance when needed.

6. Battery Assisted Passive tag, or BAP tag. This term specifically means a battery assisted tag that maintains a backscatter transmitter, or a Class 3 tag.

7. Battery Assisted Tag, or BAT. This term also commonly refers to a tag with battery assisted tag receiver enhancement, while still maintaining a backscatter based tag transmitter. The term was originally coined to specifically refer to Class 3 operation and to distinctly mean not having active radio features on the tag. However, it is envisioned here that Class 3 will become a battery saving "base mode" for Class 3 Plus and Class 4 tags that use Class 3 when the link is sufficient, and progress to the active modes as needed. Thus, the use of the term "BAT" may in the future come to refer to any tag with battery assisted tag receiver enhancement. In this disclosure a BAT may thus refer to a Class 3 Plus or Class 4 tag that supports Class 3 operation, with the option of using the more advanced Class 3 Plus or Class 4 modes when link conditions require that higher performance.

8. Hibernation or Hibernate Mode. A state of low power consumption (sleep) in which a tag can listen for an "activation" command to awaken it to "normal mode" for full communication and operation. Class 3, 3 Plus, 4 and other tags may optionally implement a hibernate mode.

8. Power Leveling. A wireless industry term applied to general intelligent control of transmitter RF power levels. Transmit power control is a commonly used means of controlling interference in dense wireless system such as cellular telephony.

SUMMARY OF THE INVENTION

Systems, methods and devices are described for battery supported RFID systems that can both provide an intermediate level of performance between passive and Fully-Active systems, which provide for extension to active operation, and which for provide for reliable interference resistant operation in the presence of passive, battery assisted passive, and Fully-Active tags. This allows for flexibility across various system implementations, which enables an RFID infrastructure to efficiently operate with tags covering a wide range of possibilities, and where users can select the tag performance corresponding to a particular application.

Simply adding tag sensitivity and greater range to the existing standardized passive RFID system design results in escalating difficulties. These include the fact that only four session codes are highly interference prone in that it is insufficient to fully separate the readers that may be in range of a sensitive tag. Also, the state machine governing passive tag operation is interference prone in that it was not designed to allow for rejecting reader commands from distant readers that more sensitive tags can hear. Greater tag sensitivities, and the improved reader sensitivities that are needed to operate with more sensitive tags, are also subject to interference both within and from outside the RFID system.

Certain embodiments of the present invention provide improved battery assisted RFID systems and tag designs by facilitating better levels of sensitivity than prior art tags, optionally using a plurality of dynamic range states to cover the necessary tag receiver dynamic range. These embodiments support methods of tag receiver circuit training to protect this tag sensitivity, allow selection of the proper tag receiver dynamic range state, and also allow receiver AC coupling training and symbol and frame synchronization.

Command sets and tag state machine designs are provided to allow improved interference control to protect the improved sensitivity of readers (interrogators) and tags, and to allow convenient extension of activation and other commands for incorporation of more active behaviors in the tag. This allows for a scaleable system design for various performance and price tags whereby users can select the tag performance needed under a common system and infrastructure design. In certain embodiments, additional interference control may be achieved through RFID specialized methods of reader and tag transmit power level control.

A preferred tag sensitivity at ultra-low tag power consumption is achieved using a transistor detector based "square law" receiver mode that improves the possible sensitivity of a "direct detector" receiver architecture. The term "direct detector" is intended to mean a detector that converts input RF power to baseband voltage or current without needing a power consuming local oscillator. A "square law" receiver, as opposed to a peak detector direct detector receiver, is a direct detector architecture receiver where output current or voltage is proportional to input current or voltage squared.

In various embodiments of the invention, a biased transistor-based square law detector is employed within the BAT receiver that efficiently harvests current from an RF signal by reducing the effects of voltage or current division experienced in prior art diode-based square law detectors. The power output of a square law receiver is proportional to the square of the RF power input. This inherently tends to limit the dynamic range achieved by the square law receiver. In prior art diode-based square law receivers, their more limited sensitivity has tended to mask this dynamic range limitation. However, improvements in RF sensitivity according to various embodiments of the invention result in the need to improve baseband dynamic range. Accordingly, certain embodiments of the square law receiver may be especially suitable to operate within a system employing several dynamic range states with a total larger dynamic range. This may ensure that full sensitivity needed for longer range and lower reader transmit powers used to limit interference are simultaneously available with the higher tag receive powers that occur in very close range operation. This allows the system to achieve the practical requirement of operating over a wide range of distances from a few centimeters to tens or even hundreds of meters. Also disclosed are protocol features allowing rapid selection of the proper dynamic range state for conducting a particular communications.

Certain embodiments of the present invention provide "tag training" and frame synchronization methods that may be applied to battery assisted RFID tags covering large dynamic range. For example, protocols that allow selection of optimum preferred dynamic range state are disclosed. These methods also allow for improved AC coupling training, or equivalently, for settling of a slicer (comparator) reference acquisition system that provides a slicing comparator reference level that adapts to the signal strength variation of the RF input. Use of well-controlled comparator reference levels may be particularly relevant to a preferred sensitivity, and are provided for by various disclosed training methods. These training methods are extended herein to also provide for reliable identification of tag "wake-up" or Activation commands by use of pseudo-random or "PN" data sequences. The PN sequence method may also be used to provide for frame synchronization flags using just the zero and one digital symbol alphabet; as opposed to prior art methods using additional specialized symbols with different length and spectral content from the standard symbol set. Prior art methods using longer symbols as flags require AC coupling methods that have lower high pass corners, which are more expensive of integrated circuit die area and take longer to train.

Embodiments of the present invention also provide a command structure that allows for improved operation using battery assisted tags. An example of such an improvement is "tag-to-reader locking" where the tag responds only to the reader which awakened or "activated" it from a low power hibernate mode. This mode effectively overcomes the limitation of only four sessions by introducing a replacement that can in a preferred embodiment provide up to 256 "effective" sessions while remaining backward compatible. Various embodiments also provide for an intermediate level of interference rejection by introducing "session locking" whereby the RFID system makes improved use of the interference resistance that is possible with only four sessions. For example, under current EPCglobal™ based standards, the Select command will pull a tag out of most logical states in its state machine and send it back to the starting point "Ready" state. In a preferred embodiment, the present invention introduces "Session Locking" whereby during the activation process a deliberate decision is made as to whether to allow such interference by Select commands, or whether to reject it with an "Interference Resistance" or "Session Locking" mode. This decision is enforced via a flag state introduced into the Activation command. A suggested embodiment was an explicit "Interference Resist Flag" in the Activation command. The method subsequently chosen for standard implementation was to make double use of another suggested flag which placed a "care/don't care" status for checking the state of the session flag as reused in hibernate mode and controlled by a newly introduced preferred embodiment precision timer. This timer controlled the state of the session flag in hibernate mode, thus reusing this flag that in normal mode indicated inventoried state. The standardized compromise was to also interpret a "care" on the inventory flag state as also commanding "Session Locking" to be in effect following activation.

Though tag-to-reader locking has so far been drafted into standardized form only for the case of the tag-to-reader locking to apply while in normal mode following activation, it may also advantageously be applied in hibernate mode. In that embodiment, the hibernating tag keeps track of the last reader ID code that awakened it, and only allows reprogramming by a reader providing that same code within an Activation command. An additional flag in the Activation command may be used for commanding hibernation mode tag-to-reader locking, or a single such control flag could command tag-to-reader locking to apply in both the hibernate and normal modes.

New Query commands and Query command behavior are also introduced which provide expanded functionality, via providing a built in "mini-select" functionality for quickly identifying groups of tags with features in common for fast access. This eliminates the need for slower use of the "Select" command to screen tag populations for inclusion in Query rounds. It is backward compatible to future passive RFID systems. The command set improvements disclosed may also provide scalability functionality that allows the command infrastructure to accommodate more advanced and later-deployed devices within the RFID system, such as those featuring higher degrees of active behavior.

Embodiments of the present invention further provide battery management techniques in which a tag is duty cycled to reduce current drain from the battery. Such techniques may use either or both of duty cycle control fields in commands, or files on the tag whereby duty cycle is specified. Such files may be altered by standard memory access commands. Other functionality, such as interference limiting transmit power control or "power-leveling", is also supported by certain commands and features.

In various embodiments of the invention, tags can be "awakened" from hibernate to a higher power operational or "normal" mode by an Activate Command. Activation command structures and feature sets are disclosed that extend the previous state of the art with new capabilities. One example is the previously mentioned method of optimizing the channel bandwidth to that only needed for the data symbol set in use via elimination of special and rarely used symbols, such as unusual frame synchronization flag symbols with frequency content significantly different from the standard symbol alphabet. This is achieved by use of PN sequences for activation identification and frame synchronization, and use of these PN sequences in ways not used in the prior art. Another example is to specify flags and flag states to be used in power level control operations. Another example is use of programmable tag sensitivity to raise it above the particular noise environment.

Various embodiments of the invention expand the Activation command to scale with future deployments by having extendable fields that are able to convey information potentially needed by future devices. For example, those fields may contain the class or classes of devices awakened by the activation code, in particular tags with active functionality. Such tags may need additional control fields in activation, such as active transmit frequency, active transmit power, active receive frequency, active tag receive sensitivity, and active receiver duty cycle.

In certain embodiments of the invention, the battery assisted backscatter tag system is shown to be "reverse link limited," and for operating conditions where this limit is unacceptable, the system may switch to active transmit at the tag. A preferred square law receiver may be supplemented by an RF Low Noise Amplifier to establish a "balanced link," where both forward and reverse links have path losses that are approximately equal. For example, an active transmit power level on the tag may be supplemented to enable a balanced link by activating a tag battery(s), such as lithium manganese dioxide coin cells. Thus, a preferred square law receiver in conjunction with part-time active transmitter provides a blend of maximum battery life and high performance.

The battery supported backscatter system with a square law tag receiver may lead to a reverse link limited situation where full power reader transmission would allow for longer reader-to-tag range than tag-to-reader range. The reason for this asymmetric link physics of backscatter RFID systems is the decreasing tag transmit power with increasing range from the reader. In various embodiments of the invention, this physical fact is used to control interference by using variable power levels on the forward and reverse links. Generally, more power is used to support the backscatter reverse link than is used for the forward reader to tag link. Since it is the forward transmissions that cause the most interference, this step limits interference.

In various embodiments of the invention relative to Class 3 power control, an Activation command and other commands are provided in which fields indicate the reader transmit power used in the forward link and the difference between the power used in the forward link and the backscatter supporting reverse link. This information may be communicated by separate fields, or by a single field in which a bit specifies where the particular information is forward reader power or the difference between forward reader power and reverse reader power. Alternatively, separate fields may communicate reader forward power and reader reverse (backscatter supporting carrier) power. These Class 3 power control methods also apply to Class 3 Plus and Class 4 tags with optional active behavior when those tags are operating in their Class 3 backscatter fall back mode of operation.

The information on the difference between forward and reverse reader power allows a BAT to adjust the percentage of incident power reflected as backscatter power in order to meet regulatory requirements and reduce interference, which may be relevant in various environments including a Class 3 mode. The information about forward reader transmit power allows the tag to calculate path loss and determine an appropriate tag transmit power to use during an active mode, such as in Class 3 Plus (square law receiver plus part-time active transmitter) or Class 4 (part-time fully active transmit and receive) modes. In these active modes there is no reader carrier to backscatter as the tag creates its own transmit carrier.

Embodiments of the present invention also employ power leveling methods that optimize the amount of transmitted power from a reader in relation to that needed to reliably support the desired communications. This improvement of transmitted power allows the reader to potentially reduce the amount of interference caused to other RFID readers and other radio systems, and reduce RF energy exposure to individuals or material proximate to the reader.

Embodiments of the present invention also provide for discovery and access of tags using a plurality of "mini-rounds" (tag accessed in sets as a function of approximate similar range) and optimum link operation based on the unique physics of backscatter RFID, which allows for sequential discovery and access of tags based on their relative distance from a reader. Within each mini-round, the above-discussed increase of backscatter supporting reader carrier power as compared to forward link power is used to resist the effects of the asymmetric link physics. Tag state controls may be employed within this discovery process such that discovered tags are placed in a non-responsive state which prevents them from responding to a reader in subsequent rounds of higher power and longer range discovery. The time period in which such tags do not respond is controlled by accurate timers, which may be programmed by the reader to adapt to the actual situation.

The discovery and accessing of tags by a reader may involve the RFID readers first transmitting at low power, interrogating tags in a low power mini-round, typically using an increase in reader carrier power during backscatter to offset the asymmetric link physics, putting the successfully accessed tags into a non-responsive state for a period of time that is accurately controlled by a timer that has been appropriately programmed for the actual environment, and then increasing the power to conduct another mini-round at a higher power (i.e., longer distance). This process may be iteratively repeated until the maximum range, determined by the weakest link (usually the reverse link), has been reached. Still higher ranges may be supported by using the Class 3 Plus capability, if available, for more distant tags to link back to the reader. This process allows identification of tags and access of their memory and features over a wide range of distances without unnecessarily using higher power than necessary to access other tags that are closer to the reader, thus reducing interference.

A preferred embodiment is for the power leveling used in the active Class 3 Plus and Class 4 modes to be fully integrated with the hibernate mode of Class 3 for maximum total system performance. Thus activation and normal mode command set designs are disclosed supporting methods of power level control that begin during the activation process and continue into normal operation.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the analyses, drawings, specification, and claims herein.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 19 illustrates a Semi-Passive Class 3 Activation command structure according to various embodiments of the present invention.

FIG. 20 illustrates a Semi-Active or "Class 3 Plus" Activation command structure according to various embodiments of the present invention.

FIG. 21 illustrates an active or "Class 4" Activation command structure according to various embodiments of the present invention.

FIG. 22 illustrates an expanded reader Activation Control field that may be integrated within an Activation command structure (such as those illustrated in FIGS. 19-21) according to various embodiment of the present invention.

FIG. 23 illustrates an expanded Reader Information field that may be integrated within an Activation command structure (such as those illustrated in FIGS. 19-21) according to various embodiments of the present invention.

FIG. 24 illustrates an expanded Target Field that may be integrated with an Activation command structure (such as those illustrated in FIGS. 19-21) according to various embodiments of the present invention.

FIG. 25 illustrates an expanded Active Tx Set Up Field that may be integrated with an Activation command structure for a tag featuring active transmission (Activation commands of FIGS. 20-21) according to various embodiments of the present invention.

FIG. 26 illustrates an expanded Active Rx Set Up Field that may be integrated with an Activation command structure featuring fully active reception (such as shown in FIG. 21) according to various embodiments of the present invention.

FIG. 27 illustrates a battery tag QueryRep command structure according to various embodiments of the invention.

FIG. 28 shows the battery tag command Next with a field that sets the hibernate sensitivity range to be used by the tag after it returns to hibernate mode according to various embodiments of the invention.

FIG. 29 shows the battery tag command Deactivate_BAT, which can command hibernate mode sensitivity according to various embodiments of the invention.

FIG. 30 shows an exemplary Class 3 Activation command expanded from the command shown in FIG. 18 by addition of a reader power information field according to various embodiments of the invention.

FIG. 33 shows an exemplary Flex_Query command that allows faster access while still maintaining the ability to selectively bring tags into Query rounds based on their basic types and attributes according to various embodiments of the invention. The types are selected in the Tag Type Select field.

FIG. 34 depicts certain details of the Tag Type Select Field of FIG. 33 according to various embodiments of the invention.

FIG. 36A provides a general example of a Battery Capabilities Word ("BCW") according to various embodiments of the invention.

FIG. 36B provides an example of a Battery Settings Word ("BSW") according to various embodiments of the invention.

DETAILED DESCRIPTION OF THE INVENTION

Figure 1:
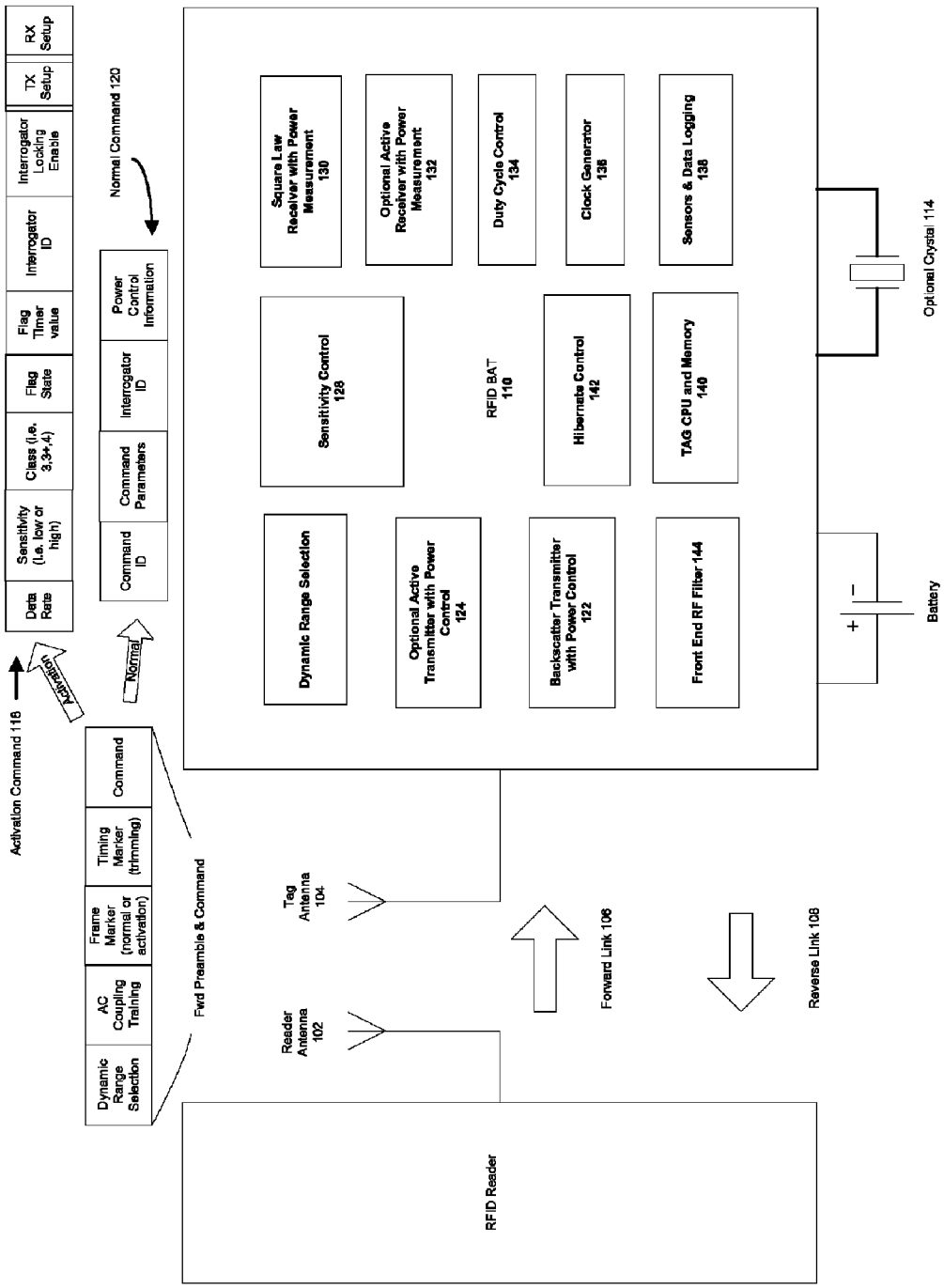
FIG. 1 generally illustrates communication between an RFID reader and a battery assisted RFID tag according to various embodiments of the invention.

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

A. Battery Assisted RFID System and Tag

Class 1 passive systems are typically of only modest tag sensitivity and are typically "forward link limited," meaning the reader-to-tag link fails at a shorter range than the tag-to-reader link. Using a battery in the tag improves tag sensitivity; however, due to the characteristics of the tag square law receiver, AC coupling and the implementation of multiple dynamic range states may be required, which may be accounted for in a protocol according to various embodiments of the invention. In many instances, it is difficult for the weak reverse link to keep up with the now much more capable forward link. However, the reverse link may be strengthened by advanced reader designs, such as ultra-low phase noise local oscillator and maximum transmit carrier to reader receiver isolation. Even so, with tag sidebands close to the carrier frequency, the reader will usually be phase noise limited as to sensitivity. This is improved by the use of tag backscatter "subcarriers," such as the Miller modulation mode of ISO/IEC 18000-6C, in which higher frequency subcarriers move tag backscatter sidebands "down the phase noise curve" and thus improve reader sensitivity.

Making intelligent use of this improved sensitivity at both ends of the link allows for reducing reader-on-reader and reader-on-tag interference with lower forward modulated power than the pure carrier used to support backscatter. Additionally, power control may be adjusted for better interference control brought about by the higher sensitivities of both links. Other interference control measures, such as optional split bandplans and time coordination, may also be used as well as optional or full time active transmission from the tag for links or applications needing a better link than is possible with backscatter.

FIG. 1 illustrates the system operation of a battery supported RFID tag. A tag 110 wirelessly receives a forward link signal 106 from an RFID reader 100. The forward link signal is modulated by the reader 100 and demodulated by the tag 110. Tag front end RF filter 144 provides RF channel selectivity in the tag's low power RFID receiver, which is a limitation on RFID system performance since the tag is subjected to interference from all transmitters above its sensitivity level in the RF band. In certain embodiments of the invention, high sensitivity RF tags employ wide band filters that are subject to interference and RFID interference control measures are described to cope with such interference. In other embodiments the front end filter 144 is narrower and its frequency is adjusted in accordance with the regulatory region of operation or the presence of interference. For example, the reader may sense the presence of interference due to cellular transmissions near the frequency of RFID operation, and command the tag to alter its front end filter frequency range. Such settings may be conveniently commanded through memory writes by the reader to the Settings File disclosed herein. If the tag 110 includes optional Active Receiver 132, then tag 110 has access to a narrow-band interference rejecting receiver.

When it is the tag's turn to transmit, and the tag is going to use Class 3 mode, the reader provides a pure carrier that the tag can reflectively backscatter as reverse link signal 108 having an associated power level and containing information to be received by the RFID reader 100. The use of the backscatter transmitter saves the cost and power consumption of having an active transmitter on the tag.

Various embodiments of the invention include devices and methods that enable improved reception of received signal at the tag, provide for preferred modal operation (e.g., active or square law mode) of the tag, and provide for interference control within the total RFID system. Square law tag receiver 130 provides a certain level of sensitivity in the tag. If this sensitivity is too much for the interference environment, then sensitivity control 128 controlled by Activation command 118 is used to limit sensitivity. When better sensitivity or interference rejection is needed, then the tag may be commanded to switch to optional active receiver 132, which is supported by battery 112.

Power measurement capability in both square law receiver 130 and active receiver 132 allows the tag to be aware of receive signal power, and combined with power control information in normal command 120 allows control of the power output of both backscatter transmitter 122 and optional part time active transmitter 124. To improve battery life, duty cycle control 134 may be applied to place the receiver in a hibernation or normal mode.

Clock generator 136 may be used in conjunction with single crystal 114 to generate return data rate clock, return subcarriers, controller clock, data logger clock, and input reference frequency for the frequency synthesizer of active transmitter 124 and active receiver 132. In certain embodiments, crystal 114 is a low cost and low power tuning fork type from approximately 20 kHz to 100 kHz, such as the common 32.768 kHz "watch crystal." Sensor and data logger 138 expands the normal identification function of RFID to allow for market desired sensor operations such as temperature logging of goods in the cold chain, and is improved via the timing precision of crystal 114.

Tag controller 140 may be of digital state machine or firmware programmed microcontroller form, or a combination of microcontroller plus hardware support such as subcarrier generation and receive symbol synchronization. Hibernate control 142 may be a low power microcontroller or a dedicated state machine. Hibernate controller 142 may include pseudo-random "PN" sequence flag correlator and bit destuffer as later described.

PN flag usage will be fully described later and is a method that allows a standard $\{0, 1\}$ symbol set to serve as activation validity signaling and frame synchronization. Use of only the $\{0, 1\}$ symbol set is preferred over prior art methods of special longer symbols because it allows a reduced channel bandwidth, a reduced coupling capacitor size and die area, and a reduction of on-die flicker noise that limits tag sensitivity. Flicker noise is a particular problem in the case of CMOS integrated circuit implementation.

B. Backscatter RFID Link Physics

A tag may receive energy from an RFID reader field and use this energy to power itself, receive information from the reader, and backscatter an information-bearing signal back to the RFID reader. In the case of a passive tag, the tag sensitivity will typically be limited by its operating power requirements.

One skilled in the art will recognize that the Friis equation may be employed in mathematically calculating BAT receive power from forward link 106 as a function of reader transmit power and range, and determining BAT transmit power used in reverse link 108.

Power available to backscatter is generally four times (i.e., 6 dB) the available receive power at tag antenna 104 because when the tag antenna load is shorted for maximum reflection, its total impedance is cut in half and its current doubles. As a result, the backscatter power increases by a factor of four minus a small reduction caused by losses associated with switching across the antenna The Friis equation giving available receive power as function of transmit power is given as Equation 1 in simplified form assuming polarization alignment between transmit and receive antennas.

$$P_{rec} = P_{tran}\left(\frac{\lambda}{4\pi}\right)^2 \frac{G_{trans}G_{rev}}{R^n} \qquad \text{Equation 1}$$

In this equation, "R" is the range in meters, "n" is the link exponent (ideally 2.0 for free space), transmit and receive antenna gains are "$G_{trans}$" and "$G_{rec}$", and wavelength is "$\lambda$".

Using the Friis equation, the average tag transmit power in reverse link 108 may be written as:

$$P_{tran\_tag} = \frac{4d_c e P_{tran\_reader}\left(\frac{\lambda}{4\pi}\right)^2 G_{reader}G_{tag}D}{R^n} \qquad \text{Equation 2}$$

In Equation 2, "e" is the efficiency associated with the tag switching, generally about 0.5 to 0.8, but sometimes deliberately lower in order to meet specific regulatory requirements. The term $d_c$ is the duty cycle associated with the return modulation, generally about 50% for Amplitude Shift Keying ("ASK"). $G_{reader}$ is the gain of the reader antenna and $G_{tag}$ is the gain of the tag antenna. The term "D" is representative of "degradation" in the link due to non-ideal factors such as polarization misalignment, multi-path cancellation, and absorption of power by materials in the link.

Power at the reader receiver antenna 102 from the tag is obtained by substituting Equation 2 back into Equation 1.

$$P_{rec\_reader} = \frac{4d_c e P_{tran\_reader}\left(\frac{\lambda}{4\pi}\right)^4 G_{tran}^2 G_{rec}^2 D^2}{R^{2n}} \qquad \text{Equation 3}$$

Here the link exponent has doubled from "n" to "2n" because the tag receive/transmit power fades once with the link exponent from the RFID reader 100 to the tag 110 and fades again from the tag 110 to the RFID reader 100. In other words, if the forward link is the inverse square, then the reverse link is inverse $4^{th}$.

Using the Friis transmission equation with reader transmit power and the minimum necessary power at the tag receiver as sensitivity Stag, the maximum forward link range as limited by tag sensitivity may be derived as shown below.

$$R_{max\_tag} = \left[\left(\frac{\lambda}{4\pi}\right)^2 \frac{D P_{tran\_reader} G_{reader} G_{tag}}{S_{tag}}\right]^{\frac{1}{n}} \qquad \text{Equation 4}$$

Similarly, by substituting reader sensitivity $S_{reader}$ for reader receive power in Equation 3, the below expression for maximum reader sensitivity limited reverse link range is obtained.

$$R_{max\_reader} = \left[\left(\frac{\lambda}{4\pi}\right)^4 \frac{D^2 4 d_c e P_{tran\_reader} G_{reader}^2 G_{tag}^2}{S_{reader}}\right]^{\frac{1}{2n}} \qquad \text{Equation 5}$$

These forward and reverse link ranges define the range limitation of an RFID system, which clearly depend on the strength of the field received by the tag and its ability to reflect this energy as transmission power. It turns out that the battery assisted tag receiver can achieve sufficient sensitivity that the tag backscatter and reader sensitivity set the link performance limits—a reverse link limited situation. Accordingly, greater care is needed in Semi-Passive Class 3 systems than in forward link limited Class 1 systems in order to minimize backscatter losses. In other words, the term "e" in the equations above must be as close to 1.0 as can practically be achieved.

C. Tag and Reader Sensitivity Relationship

The performance of the system depends on both the reverse and forward link ranges. Ideally these ranges should be about equal to maintain the link; otherwise, if one link is inferior then the better link simply goes to waste. If the ranges are set to be approximately equal to each other, the RFID reader sensitivity and the RFID tag sensitivities as functions of each other may be found as below.

$$S_{reader} = \frac{4d_c e S_{tag}^2}{P_{tran\_reader}} \quad \text{Equation 6}$$

and, $$S_{tag} = \sqrt{\frac{P_{tran\_reader} S_{reader}}{4d_c e}} \quad \text{Equation 7}$$

These sensitivities are relative to total receive power, which includes carrier, any subcarriers used, and information bearing sidebands. It is common practice in UHF RFID to use subcarriers in the tag to reader link. This practice moves the information bearing sidebands out in frequency, where there is less carrier phase noise in the reader to degrade reader sensitivity. In the case of commonly used "Miller Modulation," such as specified in EPCglobal™ Gen 2 version 1.2.0 and ISO/IEC 18000-6C standards, the subcarrier is modulated via phase modulation, and the subcarrier is thus suppressed. This avoids wasting energy in the subcarrier, so that the only penalty for using the subcarrier is the 3 dB penalty of splitting from 2 standard AM sidebands to 4 sidebands (one on each side of the two subcarriers above and below the carrier). This 3 dB penalty is usually far outweighed by the gain in reader sensitivity achieved by getting "down the phase noise curve" (farther from the carrier in frequency, where phase noise is less) by use of the subcarrier.

Figure 2:
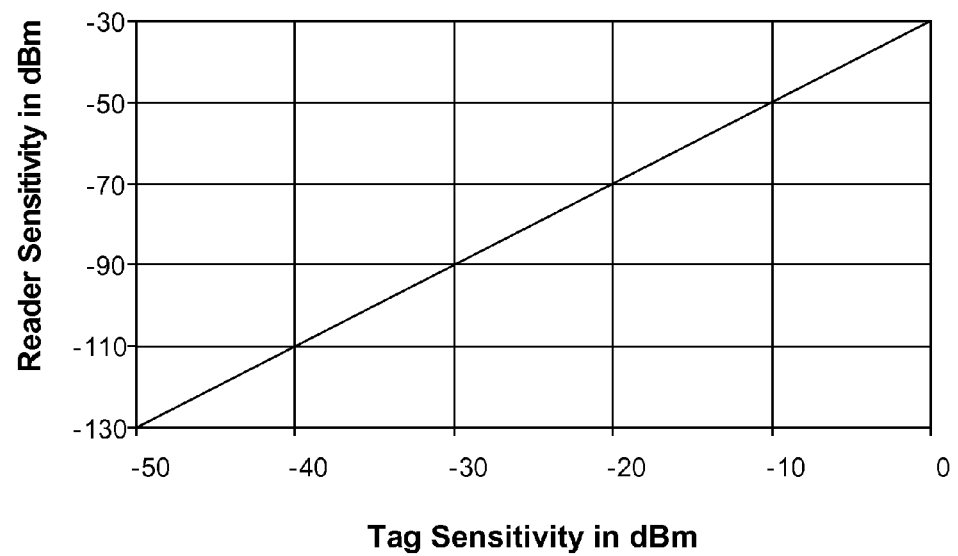
FIG. 2 is an exemplary plot showing a relationship between reader sensitivity needed to successfully maintain communications with the illustrated tag sensitivity according to various embodiments of the invention.

As Equation 6 illustrates and as is shown in FIG. 2, each time an improvement is made in the forward link 106 of one dB in tag sensitivity, the reverse link 108 must improve by 2 dB of reader sensitivity to maintain the same link margin. Accordingly, the physical limitations of an RFID reader 100 will typically be reached before a BAT 110 reaches its sensitivity limits (these BAT sensitivity limits will be derived later). The relationship between required reader and tag sensitivities as graphed in FIG. 2 is very important in Class 3 RFID system design. As is seen in FIG. 2, a −40 dBm tag sensitivity requires a reader sensitivity on the order of −110 dBm in order for the reader to supply a balanced link.

Figure 3:
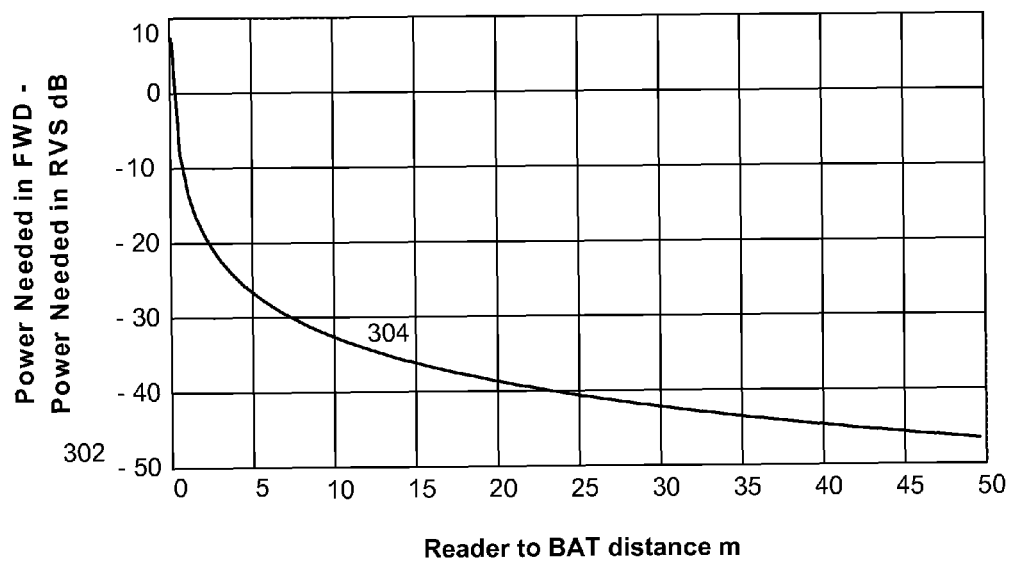
FIG. 3 is an exemplary plot showing the reader carrier power needed in the forward link minus the reader carrier power needed reverse link at the same range in order to successfully support communications as a function of reader-to-BAT range according to various embodiments of the invention.

This result is shown in a different form in FIG. 3, where the difference between required reader forward power and required reader reverse power 302 is graphed using the high tag sensitivities disclosed herein against reader-to-tag range 300. The plot in FIG. 3 has the assumptions of free-space propagation, reader antenna gain of 6 dB, tag sensitivity of −60 dBm, reader sensitivity of −90 dBm, fade margins of 10 dB in the forward link and 10 dB in the reverse link, BAT backscatter loss of 5 dB, BAT antenna gain of −2 dB, and a frequency of operation of 915 MHz. At a reader-to-BAT distance of 7 meters, the reader transmit power required in the forward link is 1000 times smaller (−30 dB) than the reader CW transmit needed to provide for tag backscatter in the reverse link. Accordingly, one skilled in the art will recognize the need to implement power control in the forward link, and for reader power to generally be higher in the reverse link.

A factor in determining sensitivity limits is that in the absence of an RF low noise amplifier, it is usually the baseband signal-to-noise ratio (hereinafter, "SNR") that limits the tag sensitivity. This baseband SNR limits the signal integrity because the conversion efficiency from an RF input to the baseband output of even a highly efficient square law detector is still fairly low. The small harvested signal then has to compete against baseband noise which can be fairly significant. For example, a −60 dBm RF input power will be converted to baseband with about a 40 to 50 dB conversion loss relative to the total carrier plus the sideband power. The resulting baseband signal power output of about −100 to −110 dBm must then compete with baseband noise. If the electronic noise floor is about 8 dB above thermal noise, then with the thermal noise in a 50 KHz bandwidth about −127 dBm, the noise is about −119 dBm as compared to the signal power at about −100 to −110 dBm (SNR=9 to 19 dB). Since detected output power is dropping as the square of declining input power (2 dB per dB), the tag may be expected to hit noise limited sensitivity not far below −60 dBm. This is found to be true via experimental verification.

A detector may be designed to overcome the baseband noise limit by generating sufficient front-end RF gain prior to the detector. When this happens, the receiver sensitivity will improve until it becomes limited by the noise in the RF bandwidth of the receiver. For example, the thermal noise power in a 50 MHz bandwidth appropriate to a U.S. RFID tag is about −97 dBm. If the front-end filter has about a 3 dB loss and the low noise amplifier (hereinafter, "LNA") has about a 3 dB noise figure, then the receiver generally has approximately a 6 dB noise figure. This noise figure may be increased by a small amount to account for back-end noise within the receiver, so a reasonable estimate would be 8 dB. This results in a receiver input noise from the LNA of about −97 dBm+8 dB=−89 dBm.

An AM modulation mode requires about a 3 dB loss due to half the energy being in the carrier and not in the information bearing sideband. Accordingly, the SNR ratio required is approximately 15 dB (typical 12 dB relative to information bearing sidebands, plus this additional 3 dB of penalty). However, this is the demodulated SNR requirement, and due to the square law behavior only half of this in dB is required at RF. Using a low noise RF amplifier, the Manchester coded AM sensitivity would be expected to be limited to about −81 dBm [i.e., −97 dBm (50 MHz noise floor)+8 dB (Rx noise figure)+ 8 dB (total RF SNR needed rounded to nearest dB)]. It may degrade several more decibels with practical limitations in circuit design.

This sensitivity could be moderately improved for a European tag with a narrower surface acoustic wave (SAW) front end RF filter appropriate to the narrower European bands. As the current European band is 865 to 868 MHz, a front end filter with a 3 dB bandwidth of approximately 5 MHz would be appropriate. This would improve LNA enhanced noise limited sensitivity from about −81 dBm to −91 dBm. These sensitivity calculations illustrate the physical limits of certain detector-based square law receivers using RFID bandwidths. These limits are approximately 20 to 40 dB inferior to active receiver sensitivities, but they are as much as 80 dB superior to passive tag sensitivities.

D. Diode-Based Detection and its Limitations

Figure 4A:
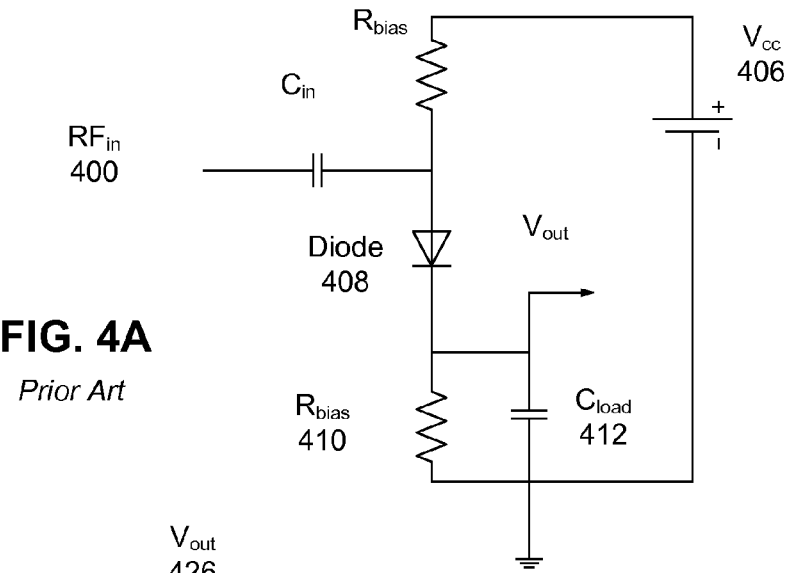
FIG. 4A is a circuit diagram illustrating a prior art biased diode-based detector.

FIG. 4A is an illustration of a prior art biased diode-based detector. This diode-based detector has improved sensitivity over a peak detector passive approach by biasing it to overcome the turn-on voltage of the diode. The detector diode 408 has a small steady state DC current flow that is provided by supply 406 and a first series resistor 404 and a load resistor 410. The small DC current "biases up" the diode so that it is always on, which allows relatively small input RF signals 400 to cause peak detection on the load resistor 410 and peak holding capacitor 412. The load resistor 410 provides a discharge function of the peak voltage captured on the holding capacitor 412 to follow the envelope of amplitude modulated RF input signal 400. Additionally, and as will be later described in detail, signals that are too low for peak detection even with a biased detector can still be detected using the square law process to be described.

Figure 4B:
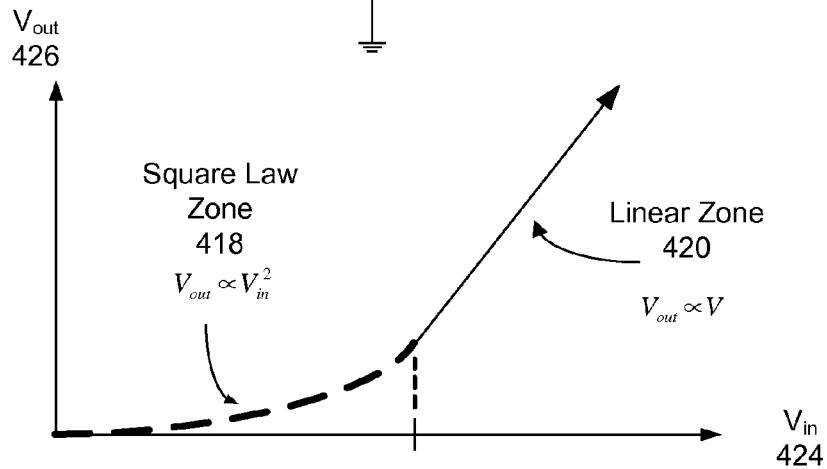
FIGS. 4B and 4C are plots showing a square law zone and a linear detection zone of the prior art diode-based detector of FIG. 4A.

FIG. 4B is a graph generally illustrating two zones of operation for a diode-based detector. The graph illustrates the output voltage 426 on the detector as a function of the RF input carrier voltage 424. A first zone of operation, identified as a linear or peak detecting zone 420, exhibits a linear relationship between the RF input carrier voltage 424 and the output voltage 426. This first zone 420 is defined as operating when the RF input carrier voltage 424 is above a particular power threshold value, which in certain examples of the diode-based detector is approximately 10 µW (−20 dBm).

A second zone, identified as a square law zone 418, exhibits a non-linear squared relationship between the RF input carrier voltage 424 and the output voltage 426. As the input carrier voltage 424 (which is proportional to the square root of the RF input power) declines to lower RF powers, the peak detecting operation of the diode-based detector starts to function differently once the power threshold is passed. This threshold is typically at the point where the diode conduction cycle becomes noticeably greater than 180 degrees in response to the decrease in applied RF signal. In other words, this occurs for signals sufficiently small that the diode does not "turn-on hard" on the positive half of the RF swing. For sufficiently small signals, the diode conduction cycle actually becomes 360 degrees.

Figure 4C:
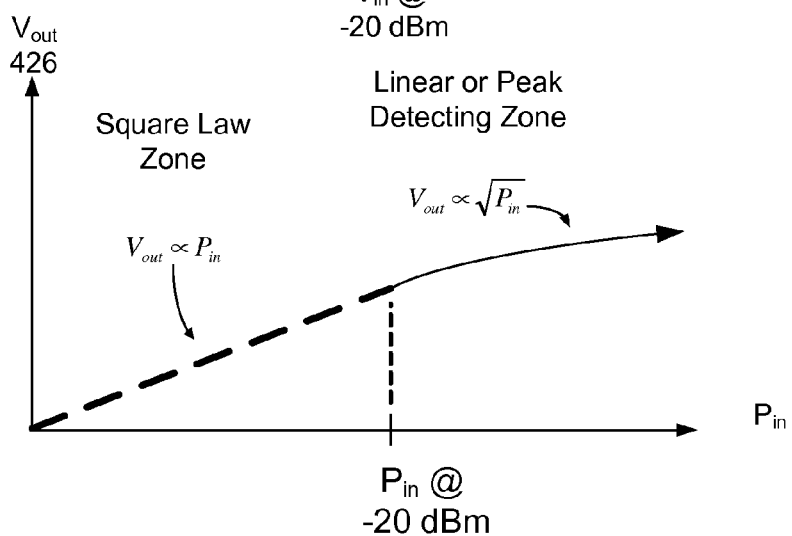

The non-linear behavior of the diode means that for very small signals, there is a non-linear increase in current induced forward through the diode for the upper half of the RF signal and a non-linear decrease in current through the diode for the reverse half of the swing. This non-linearity causes a small shift in the detected baseband voltage across the load resistor 410 and the holding capacitor 412, even for very small signals. In this detection of very weak signals, the detected voltage is proportional to the input RF power, and more specifically, is proportional to the square of the RF voltage. The detection of these very small RF signals is shown as occurring within the square law zone 418. If the output voltage of the detector is graphed as a function of input RF power, then the graph shown in FIG. 4C results.

A square law receiver may be implemented within an RFID tag to detect weak RF signals of the general levels described above. The square law receiver harvests a baseband voltage or current from a detector that is proportional to the RF power input to the detector. In particular, the output power of the receiver is proportional to the square of this voltage or current, and thus the output baseband power is proportional to the square of the input RF power. This is the source of the term "square law receiver", and is also the source of the physical fact that output baseband power changes 2 dB per input RF power change of 1 dB. A weakness of the square law receiver is that this 2 dB per dB relationship limits the dynamic range of the output of the tag receiver.

The following equations provide a mathematical model to analyze signal harvest within a square law receiver. The total current "i" in a non-linear detector driven by an RF or other time domain signal "$V_{in}$" may be described by a generic Taylor Series expansion of a non-linear function as:

$$i = I_{bias} + \frac{di}{dv}V_{in} + \frac{1}{2}\frac{d^2i}{dv^2}V_{in}^2 + ... \quad \text{Equation 8}$$

The derivatives in the above expression capture the nature of the particular non-linear device, meaning a device where the current flow does not follow Ohm's law but instead follows a non-linear function of applied voltage such as the exponential function typical of diodes, bipolar transistors, and MOS transistors operated in weak inversion. The second order term is always significant since it is the lowest order non-linear term that can perform RF to baseband frequency conversion, and for smaller signals it will give a larger "harvest" than the higher order terms. For an RF signal of $V_s$ Sin(ωt) the below trigonometric identity will allow evaluation of the 2nd order term:

$$V_{in}^2 = (V_s \text{Sin}(\omega t))^2 = V_s^2\left(\frac{1}{2} - \frac{1}{2}\cos(2\omega t)\right) \quad \text{Equation 9}$$

If the second harmonic term in this identity is neglected and a substitution of the DC term into the second order term of the Taylor Series is done, for the DC current induced by an RF input of carrier peak voltage $V_s$ is:

$$\Delta I = \frac{1}{2}\frac{d^2i}{dv^2}V_s^2\frac{1}{2} = \frac{V_s^2}{4}\frac{d^2i}{dv^2} = \frac{P_{in}Z_{in}}{2}\frac{d^2i}{dv^2} \quad \text{Equation 10}$$

In the above equation, $Z_{in}$ is the impedance environment on the input to the detector and $P_{in}$ is the available RF input power. In order to receive a benefit of passive voltage gain, an up-transform is performed from the antenna to the detector input. The effectiveness of this gain, and the size of the harvested currents that depend upon it, depends on the structures and methods used in this up-transform.

As illustrated below, the bias current through a diode-based detector is given as a function of input voltage $V_{in}$ as:

$$I_{bias} = i_0 e^{\frac{V_{in}}{V_T}} \quad \text{Equation 11}$$

where $V_T$=kT/q and k is Boltzman's constant, T is absolute temperature and q is the charge of an electron. Differentiating twice with respect to $V_{in}$ gives:

$$\frac{d^2 I_{bias}}{dV_{in}^2} = \frac{I_{bias}}{V_T^2} \quad \text{Equation 12}$$

Substituting this into the expression for harvested DC current above, the following equation is derived for the diode-based detector:

$$\Delta I = \frac{V_s^2}{4}\frac{d^2i}{dv^2} = \frac{I_{bias}V_s^2}{4V_T^2} \quad \text{Equation 13}$$

Figure 5:
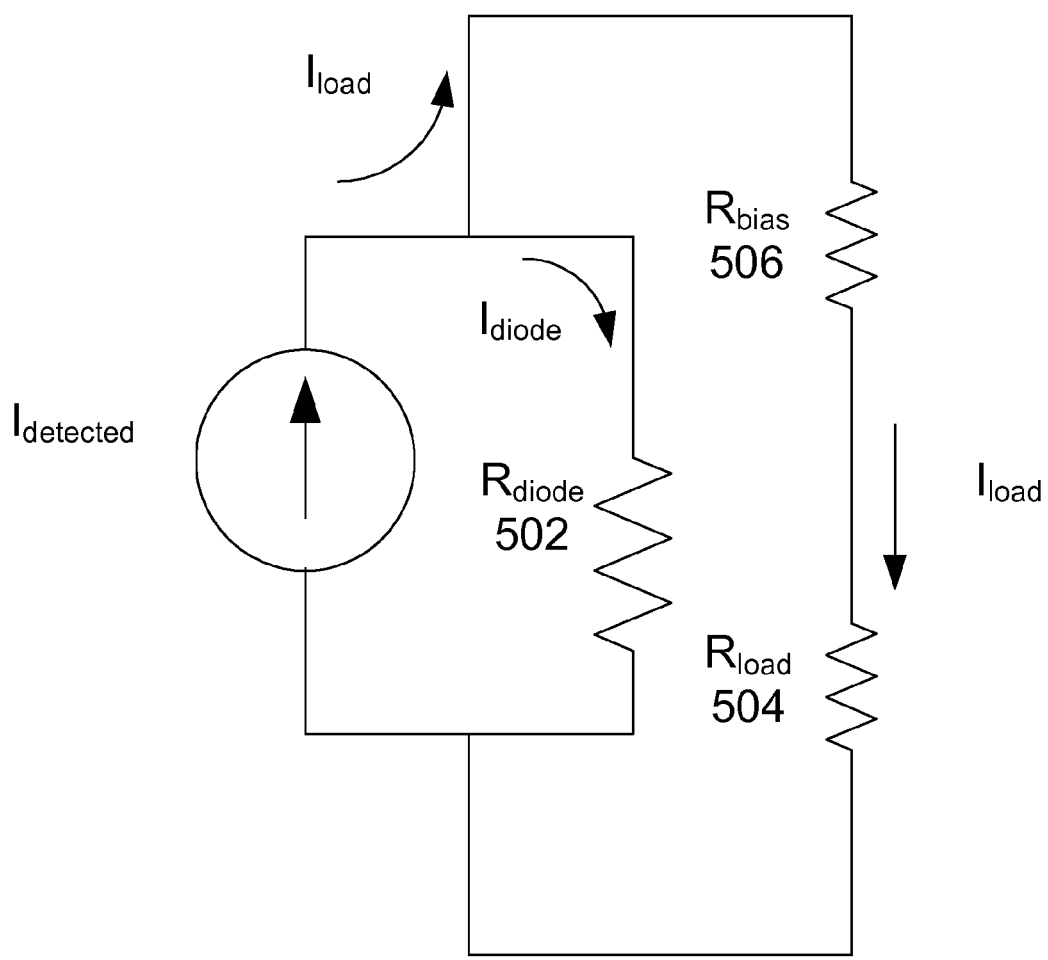
FIG. 5 is a circuit diagram illustrating a small signal model for the diode-based detector.

As will be discussed below, the diode-based detector is unable to provide all of this harvested current to a load. FIG. 5 illustrates a small signal model of the biased direct detector diode shown in FIG. 4A, which shows inefficient current detection because a portion of the detected current is wasted in the diode and not provided in the desired load. The problem is that while it is desired that all the current flow in the load resistor 504, that current is limited by the bias resistor 506 in series with the load resistor 304, and the tendency of the detected current to be trapped by the small signal impedance 502 of the diode itself.

The detected current in the load resistor 504 is given by current division as:

$$\Delta I_{load} = \Delta I_{total}\left(\frac{R_{diode}}{R_{load} + R_{bias} + R_{diode}}\right) \quad \text{Equation 14}$$

By the Maximum Power Transfer Theorem, maximum power will be delivered to the load when:

$$R_{diode} = R_{load} + R_{bias} \quad \text{Equation 15:}$$

The maximum power occurs when half the current is diverted into the load.

This is the maximum power available from the "source" of $I_{detected}$ in parallel with $R_{diode}$. It is evident that current division will noticeably limit the harvested current within the receiver. In fact, if $R_{diode}$ was infinite, then doubling the current delivered to $R_{load}$ would actually increase harvested power by a significant 6 dB from the ideal matched case, and more in the case of less than perfect matching. This 6 dB or more loss of harvested power may significantly reduce the performance of certain RFID systems.

E. Improved Transistor-Based Detector

The transistor-based detector disclosed herein may overcome the above-described deficiencies in diode-based detectors. FIGS. 6A-6D illustrates a transistor-based detector with improved sensitivity according to various embodiments of the invention. The detector is able to maintain the square law function, described above, while providing current gain, relatively higher input impedance that improves sensitivity, and reduction of the lost part of the detected current by the current divider within the diode detector. It also provides convenient mirroring and deliberate dynamic range extending compression of the detected current.

FIG. 6A is a basic circuit diagram of a transistor-based detector according to various embodiments of the invention. The detector transistor is 610, and the other transistors are for signal processing of the detected signal. Though a bipolar transistor is depicted, similar detection processes and advantages apply to MOS transistors also. $Ra_{in out}$ signal 600 may have most of its voltage applied directly across the base-emitter junction of detector transistor 610, as there are no other impedances in series with the base-emitter junction. There is no requirement to power match (the detection is a voltage driven process) and the base-emitter small signal impedance may be greater than source impedance 602, thus allowing most of the available RF voltage from source 600 to be directly applied to the detector base-emitter junction.

In various embodiments of the invention, impedance upconversion circuit 605 inserted from source 600 to the base of 610 can also apply passive voltage gain from source 600 to supply still more voltage swing. This delivers still more harvested current, since the detected current is proportional to the square of the voltage swing across the base-emitter junction and not actually the power delivered to the junction. As a result of these factors, more detector current results, and a much improved percentage of the detected baseband signal is harvested in the transistor detector 610.

The current multiplying behavior of transistor 610 allows the detected current $\Delta I_b$ in total base current 606 to be multiplied by the current gain and generate a new and much larger detected current, $\Delta I_c$, which can be passed through arbitrary impedances to generate larger voltage swings. These impedances may be as large as other circuit limits allow because there is no need to impedance match a load resistor value to diode small signal impedance as was the case for the diode detector. Alternatively, this circuit design freedom allows the new current, $\Delta I_c$, to be mirrored and gained before passing through an impedance that converts the current into a voltage signal. For example, the final impedance may be a very high impedance active load for maximum sensitivity. The net result of these many combined improvements is that a much larger signal is harvested, and much greater sensitivity results.

FIG. 6B illustrates the transistor detector 610 in a large signal model form (including both bias currents and detected currents) with a non-linear detecting diode 620. The detecting diode 620 is formed by the base-emitter junction through which the sum of bias current and a detected current 618 flows. A current source 622 represents the collector current multiplier of the base current, which results in the current 618 being multiplied by the current gain "$\beta_t$" of the transistor into total collector current 624. The term $\beta_t$ is used because the commonly used term "$\beta$" is also used in the detector diode literature to refer to detector diode gain from input RF power in watts to output current. The term "$\beta_d$" will be used herein for diode detector gain in Amperes/Watt.

FIG. 6C is a simplified small signal model of the transistor detector 610 according to various embodiments of the invention. As shown, the detected current $\Delta I_b$ 628 flowing through the base-emitter junction is not subject to the current division in the diode-based detectors. Although the detected current 618 flows in the self-impedance 626 of the base-emitter junction, there is little, if any, loss associated with this action. Instead, this "current trap" is used to advantage by providing a change in base current to be multiplied to a change in collector current without loss, which constitutes a major advantage of the detector transistor over the detector diode. The final detector current $\Delta I_c$ 628 is now much larger than detected diode current would be, and has the very large advantage of circuit freedom from division and matching. It may be mirrored and passed through arbitrarily large impedances to maximize sensitivity.

As previously discussed, the detected base current 628 may be multiplied by the current gain or $\beta_t$ of the transistor, which is typically on the order of 100 times. A potential problem may appear to be the normal large variation in $\beta_t$ of the transistor. But, if a bipolar transistor is biased at a nearly constant (except for variation caused by detected current) collector current, then transistor $\beta_t$ and its undesired variation drop out as follows:

$$\Delta I_c = \frac{I_{base} V_s^2}{4 V_T^2}\text{Beta} = \frac{\frac{I_c}{\text{Beta}} V_s^2}{4 V_T^2}\text{Beta} = \frac{I_c V_s^2}{4 V_T^2} \quad \text{Equation 16}$$

In this equation, $V_s$ is the peak voltage of the sinewave RF signal $V_{in}$. As shown by Equation 16, detected final current is not actually a function of $\beta_t$, which is a very desirable behavior since $\beta_t$ is not a very well controlled parameter. The detected current is proportional to total collector current just as it is proportional to total diode current in the detector diode case.

Figure 6:
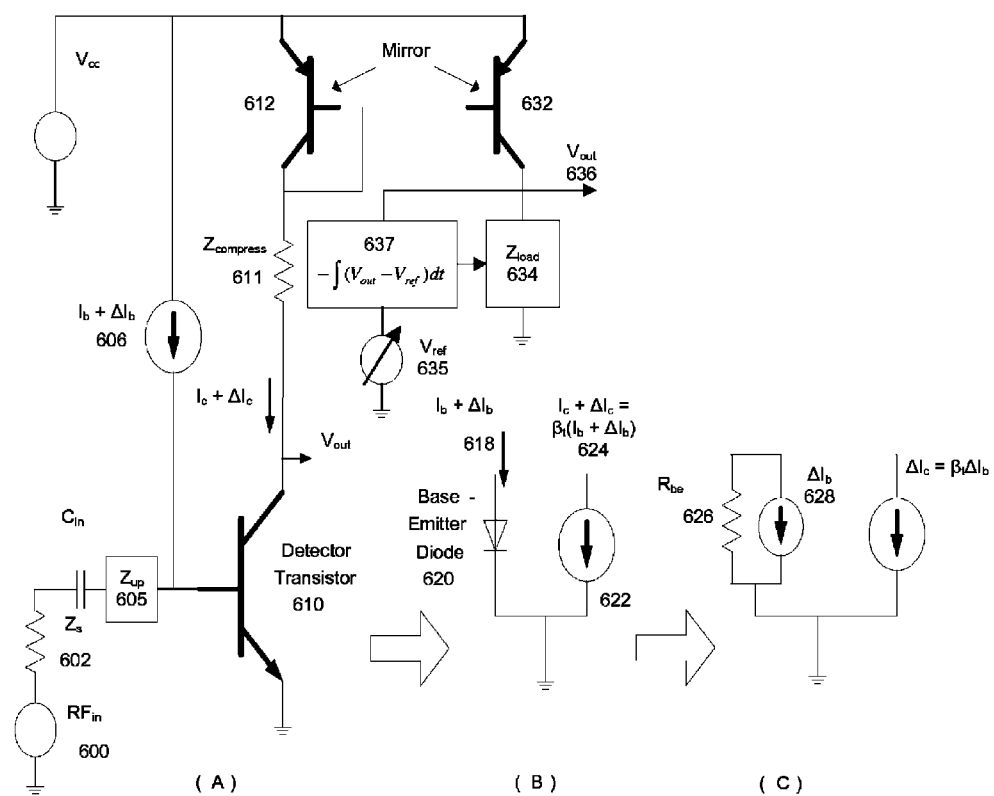
FIGS. 6A-6E are circuit diagrams and relevant operating curves of an improved transistor-based detector using an NPN bipolar transistor according to various embodiments of the invention, and small signal models thereof used to analyze signal harvest.

To summarize, the transistor-based detector, as illustrated in FIG. 6, turns the disadvantage of harvested current dividing into the detector's own impedance into an advantage by dividing all the current into the base-emitter, and then harvesting it through the current multiplying effect from base to collector. The high input impedance of the transistor also allows high "voltage gain" from RF input to transistor input, further improving sensitivity. As previously mentioned, the current can be mirrored, gained, and passed through high impedance active loads to attain sufficient voltage swing to drive a comparator. For example, a detected collector current of only 1 nA may be used to develop adequate voltage to trigger a comparator using an "active load" impedance of 1 MΩ:

$$V_{out} = \Delta I Z = (1 \text{ nA})(1 \text{ M}\Omega) = 1 \text{ mV} \qquad \text{Equation 17:}$$

Referring now to FIG. 6A, the detected current $\Delta I_c$ flows through compression resistor (explained below) into first mirroring transistor 612. This transistor is "diode connected" as is known in the art, and its base-emitter voltage is also provided to second minor transistor and output stage drive 632. Since transistor 632 has the same $V_{be}$ as 612, its collector current will almost exactly equal that in transistor 612, thus generating a "current mirror". It is also possible through transistor geometry adjustment or provision of resistance in the emitters of the two mirrored transistors 612 and 632 to provide "gain" in the mirror which may be less than one, equal to one, or greater than one. A current minor may thus serve an amplification function or attenuation function, either of which can be referred to as gain. When a current mirror drives a load or active load it may also be referred to as an "amplifier".

The "active load" is the small signal output impedance of a transistor, as indicated in FIG. 6D $Z_{out}$ 654. Because a bipolar transistor in the so-called "active region" as an almost constant current as a function of $V_{CE}$, it has a very high output impedance given by:

$$Z_{out} = \frac{\partial V_{CE}}{\partial I_C} \qquad \text{Equation 18}$$

A similar very high output impedance applies to the "pinch off" region of an MOS transistor. In either case active loads can provide much higher impedance at a given bias current than can a resistor with the same voltage across it and current through it. Active loads are common practice in the integrated circuit design art, though not generally so in use with RFID detectors.

While the active load can provide for very high output impedance, it requires special steps to control. When two transistor collectors (or drains in the case of MOS transistors) are driving against each other, the currents in the two transistors cannot easily be perfectly matched. Thus, the output voltage of the common connection tends to go all the way high (almost to the positive supply) or low (almost to ground), depending on which current source provides more current. This is dealt with in IC design by use of negative feedback that adapts one current source to almost perfectly match the other, so that the output voltage can be at a desired level between the positive and negative (or ground) supply voltages.

To provide negative feedback in the case when $Z_{load}$ 634 is an active load, a low power feedback system may sample output voltage 636 and adapt a control voltage of $Z_{load}$ 634 to adjust its current such that output voltage 636 is forced to have a particular value. In certain embodiments, differential analog integrator circuit 637 is implemented with a low power operational amplifier with one input as $V_{out}$ 636 and the other as adjustable $V_{ref}$ 635. The negative feedback and very high DC gain of this circuit will set $V_{out}$ 636 to have a DC level almost identical to $V_{ref}$ 635, which can then almost perfectly match the reference input of a comparator that is "slicing" $V_{out}$ 636 into a "squared up" logic level signal.

$V_{ref}$ 635 may be trimmed to make this match between the DC level in Vout 636 and the comparator's reference or "slicing" level as accurate as desired, and to also trim out operational amplifier and comparator offsets. If the loop bandwidth of the control system formed by integrator 637 is deliberately controlled to a precise low value, then several advantages result. First, the low bandwidth will set the DC content of $V_{out}$ 636 as just described, but will not significantly distort the AC signal part of $V_{out}$ 636, as the spectral components of the demodulated signal will be above the bandwidth of this control loop. Next, the control system action will have the benefits of centering the varying signal around the reference input of the slicing comparator, as long as time is left in the protocol preamble for such centering to occur within the response time of this loop. The ability of the control loop to significantly rebias the current pulled by an active load serving as $Z_{load}$ 634 also significantly extends the dynamic range of the output stage formed by 632 and 634. It forms a type of automatic gain control or AGC, whereby the average current pulled by $Z_{load}$ 634 may perfectly match the average current of drive transistor 632. This is important since under strong RF drive the detected current can actually be not only a significant fraction of standing bias current, but even larger than the standing bias current. Finally, when the loop bandwidth is below the spectral content of the demodulated signal component of the current delivered by minor source 632, the open-loop bandwidth of an operational amplifier in integrator 637 can be low, allowing such operational amplifier to be very low power.

Because the integrator controlled active load servoes out or removes DC variations in output voltage $V_{out}$ 636, it introduces effectively AC coupling in the signal path. Thus, certain embodiments are suited to modulation forms such as Manchester where the spectral content of the signal approaches zero energy density at low frequency. To allow for variable data rates, the loop bandwidth of the integrator 637 control loop may be switched with data rate, thus allowing fastest settling time in the preambles of the protocol.

It is also possible to use a predominantly digital control system instead of the integrator control system 637 of FIG. 6A. This requires a fine trim on the current control input of active $Z_{load}$ 634. Since with even fine trimming there is drift in $V_{out}$ 636 over time and temperature variation, this digitally controlled voltage will need to be regularly updated. One advantage for using a digital control system is that its output may be held constant over a communication interval, deliberately avoiding control system response to the received data, for data types such as PIE that have DC content that varies over time. In the case of PIE, since the symbols have different pulse width, the DC content is not 50% and it also varies over time as a function of the zero and one bit densities in the data stream. Such variation causes "hunting" in a constantly closed loop analog control system, just as it does for AC coupling, which is harmful to the received Bit Error Rate ("BER"). The digital control system action may be deliberately "frozen" over a communications interval to avoid this hunting, which may be considered to allow a temporary state of DC coupling. Herein this temporary DC coupling mode is referred to as "quasi-DC coupling".

Quasi-DC coupling may also be implemented in an analog control loop that controls the active load output voltage 636 by "opening the loop" in the manner of a sample and hold circuit in accordance with various embodiments of the invention. In the case of integrator 637, the sample and hold capacitor may advantageously be the main integrator capacitor.

One skilled in the art will recognize that in describing feedback control of active loads without reference to specifically analog or digital control loops, that such control loops may be analog or digital or combined with features of both, including temporary open loop operation.

For simplicity, $Z_{load}$ 634 may also be a resistive load. In that case, then to properly slice the bias current of transistors 610, 612, and 632 may be trimmed for precise adjustment, or the comparator reference input may be similarly trimmed. In certain embodiments, $Z_{load}$ 634 is a resistor in a less sensitive high dynamic range state, and an active load in a more sensitive lower dynamic range state. A resistive load also has the advantage of allowing pure DC coupling. This is superior as regards distortion control to the effective AC coupling of the integrator controlled active load for modulations such as Pulse Interval Encoding ("PIE"), which do not have zero energy density per Hz as frequency approaches zero. Thus, in a multiple dynamic range state RFID tag receiver based on embodiments of the invention, a high dynamic range state may use a resistive load for $Z_{load}$ 634 and for a better sensitivity low dynamic range state may use an active load for $Z_{load}$ 634.

Certain embodiments of the invention may anticipate a high dynamic range state being useable for Manchester and PIE, while a more sensitive low dynamic range state is Manchester only.

Radios usually have to operate over a wide dynamic range of input signals, with short term variation that can exceed 40 dB due to signal variation and multipath fade, and absolute variation that can exceed 100 dB due to the addition of path loss to short term fading. The square law detector is inherently hostile to wide dynamic range, since its output power is proportional to the square of input power. This may be partially addressed through the use of two or more dynamic range states, but even then it may prove difficult to cover the entire dynamic range. There are also situations where the use of multiple dynamic range states is not allowed for in the system protocol. Deliberate compression of the current output of the detector as a function of input RF power may be provided, as is depicted in FIG. 6E, in order to provide for the higher dynamic range that expansion upon passive RFID sensitivity levels requires.

According to various embodiments of the invention, deliberate detector compression is provided to make use of the saturation region of a bipolar transistor detector. This region, where collector current is a strong function of collector to emitter voltage, is shown as the curve parts below $V_{CEsat}$ 652 of the collector current curves of FIG. 6D. This region applies for $V_{CE}$ less than a few tenths of a volt, and though it actually moderately increases with increasing $I_C$, it is here shown as a constant for simplicity. At these low voltages and at a given base current, the collector current is approximately linearly proportional to $V_{CE}$. There is an analogous zone of operation for an MOS transistor, though it is normally referred to as the "triode" or "linear" region, where for a few tenths of a volt the drain current for a given gate to source voltage is approximately proportional to drain to source voltage. For both bipolar and MOS transistors, at these low voltages the devices acts like a controlled resistor.

It is thus possible to introduce controlled collector to emitter or drain to source voltage in the square law transistor detector such that at low RF power levels the device is in its "active" (bipolar) or "pinch-off" (MOS) zone where the device has a relatively constant collector or drain current with $V_{CE}$ or $V_{DS}$, and where the detector has high conversion gain from RF input power to output detected baseband current. But, as RF input power increases and detected current becomes an appreciable fraction of standing bias current, the collector to emitter or drain to source voltage may drop to push the transistor into its saturation (bipolar) or triode (MOS) region where its detected current is smaller than it would be in the active (bipolar) or pinch-off (MOS) regions. A preferred embodiment for performing this function is to introduce resistance in series with the collector or drain of the detector transistor, as in shown with $Z_{compress}$ 611 in FIG. 6A. $Z_{compress}$ 611 forces the total current in the detector collector or drain to follow a "load line" 648 as shown in FIG. 6D.

Various designs of this compression circuit call for first allowing a zone of operation where the compression does not apply, meaning that the bias value of $V_{CE}$ is safely greater than $V_{CEsat}$. Then, a large enough increase in $I_C$ due to RF inducing $\Delta I_C$ increases the drop across the compression resistor and begins pushing the transistor into saturation.

For example, in FIG. 6D an increase from zero RF input power at operating point A is provided to shift total collector current from lower (bias) current curve 652 to higher current curve 644 ($I_{BIAS}$ 652+$\Delta I_{C1active}$ 654). This shifts the operating point from point A to point B as shown in both FIG. 6D and FIG. 6E. In various embodiments, point B is designed to be a critical dividing line between the transistor detector operating in its active region and in its saturation regions. Thus, in FIG. 6E there is a linear increase in total collector current as RF input power increase moves the operating point from point A to point B.

As RF input power increases by a step above that associated with point B, the increasing current through $Z_{compress}$ 611 forces a drop in $V_{CE}$ that takes the transistor from its active region to its saturation region. This results in moving the operating point from point B to point C in both FIG. 6D and FIG. 6E. There is a smaller increase ($\Delta I_{C2sat}$ 650) in total collector current than would occur ($\Delta I_{C2active}$ 646) if the transistor did not enter the saturation region, and the difference between these amounts may be referred to as the degree of "compression" that the circuit provides.

This behavior may be put on a first order analytic basis as follows. The equation of the collector to emitter voltage of the load line 648 of FIG. 6D as applied to detector transistor 610 of FIG. 6A may be written as:

$$V_{CE} = V_{CC} - V_{BE} - I_C Z_{compress} \qquad \text{Equation 19:}$$

In Equation 19, $V_{BE}$ is the base-emitter voltage of diode connected minor transistor 612 of FIG. 6A. $I_C$ is the total collector current, whether in the active or saturated region. When this equation is applied to the active region, current variables may be subscripted as "active" and when applied when current in is the saturation region, then current variables may be subscripted as "sat".

The collector-emitter voltage of the transistor is forced to obey this equation as well as the transistor's operating equations. Though the transistor operation is non-linear, for a first order calculation it may be assumed that the current-voltage relationship of the transistor in saturation is approximated by:

$$V_{CE} = \frac{V_{CEsat} I_{Csat}}{I_{Cactive}} \qquad \text{Equation 20}$$

In equation 21, $V_{CEsat}$ is the dividing line between the active and saturation zones, which is approximately 0.2 volts. $I_{Csat}$ is a variable describing the actual current in saturation under a particular $V_{CE} < V_{CEsat}$, and a particular base current. $I_{Cactive}$ is the total collector current when $V_{CE}$ is greater than or equal to $V_{CEsat}$. If Equation 19 is set equal to Equation 20, then the compressed total current in saturation is found to be:

$$I_{Csat} = \frac{V_{CC} - V_{BE}}{\frac{V_{CEsat}}{I_{Cactive}} + Z_{compress}}$$ Equation 21

When Equation 21 is applied to operating point C of FIGS. 6D and 6E, then it is written as:

$$I_{C3sat} = \frac{V_{CC} - V_{BE}}{\frac{V_{CEsat}}{I_{C3active}} + Z_{compress}}$$ Equation 22

In Equation 22, $V_{CEsat}$ is assumed as constant (approximately 0.2 to 0.3 volts), and $I_{C3}$ active is the sum of the bias current and what would be the detected current at point C if the transistor was allowed to remain in the active region. Equation 22 defines the curve of FIG. 6E giving total detector output current for RF input powers greater than $P_{in}$ 678 associated with point B.

In order to use these small voltages and attain enhanced sensitivity, fully trained AC-coupling and low offset or trimmed comparators may be implemented according to various embodiments of the invention. A natural consequence of operation within square law mode is that multiple dynamic range states may be needed to achieve a preferred range for the RFID system. For example, from about 1 mV to 1 volt is approximately a 60 dB baseband dynamic range, but only about 30 dB RF dynamic range in square law mode.

To solve this problem, multiple dynamic range states may be implemented, or deliberate compression as above, or both. Typical RF dynamic range requirements are from approximately +20 dBm down to a noise limited tag sensitivity level of approximately −60 dBm (bipolar) or −55 dBm (CMOS) without RF LNA. As discussed earlier, with an LNA it is possible to extend sensitivity to be as good as approximately −80 to −90 dBm. However, one skilled in the art will recognize that embodiments of the invention cover any range and/or combination of dynamic range states within an RFID system.

Figure 7:
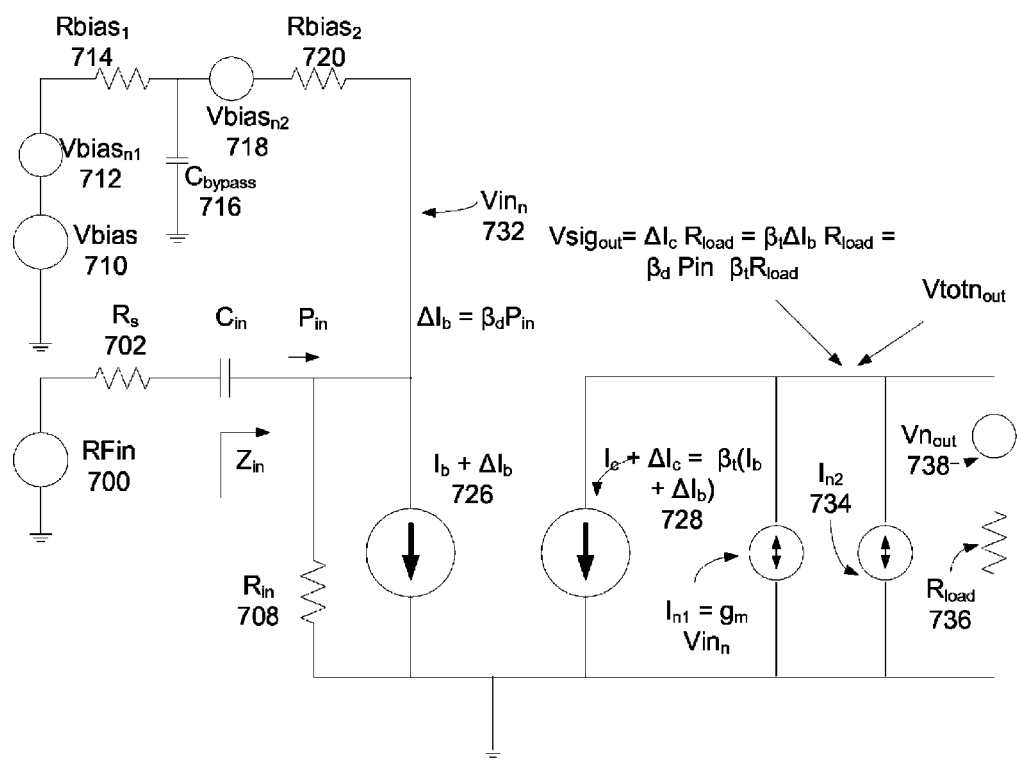
FIG. 7 illustrates a transistor-based detection model capturing baseband signal and noise according to various embodiments of the invention.

FIG. 7 illustrates a more advanced small signal model of the transistor detector including noise sources according to various embodiments of the invention. This model may be used to analyze noise and the resulting signal-to-noise ratio within the tag, leading to analytic sensitivity predictions. Though the discussion below is often in terms of a bipolar detector transistor, this same noise model also applies to CMOS transistor implementation. In fact, CMOS transistors in "weak inversion" have a very similar exponential transfer function to bipolar, and can make excellent square law transistor detectors also. "Weak inversion" or "subthreshold" operation of the MOS transistor is that region of operation where the gate to source voltage difference is less than the threshold voltage of the device. In that regime the first order model of drain current holds that drain current is zero. This is not completely true, as the current is only very small. In that regime the current follows an exponential relationship of drain current to gate to source voltage, and acts much like a bipolar transistor as a square law detector. It is the use of weak inversion mode that allows CMOS to reach as low as −55 dBm without LNA. However, the weak inversion mode CMOS transistor does have greatly reduced bandwidth. Thus, as a square law detector, under some operating conditions it may be necessary to restrict its use to lower data rates, and then use strong inversion for higher data rates. In strong inversion mode, the noise limited CMOS sensitivity without LNA for typical process noise parameters is on the order of approximately −50 dBm, which is still an excellent sensitivity for RDID tags. Thus, the discussion below is not intended to be limited to bipolar detectors, but to apply to MOS transistor detectors and supporting circuitry also.

An RF input 700 with peak voltage $V_s$ is AC-coupled via resistor 702 and capacitor 704 resulting in a detected current $\Delta I_b$. A bias voltage 710 is generated which includes noise voltages 712 and 718 generated by biasing elements within the detector circuitry as well as noise from baseband elements within the transistor detector itself. These are shown as resulting in a voltage bias and noise $Vin_n$, 732.

If $R_{bias2}$ 720 is much larger than $R_{in}$ 708, then the detected current $\Delta I_b$ will almost exclusively flow within the base of the transistor. As a result, the current through the base is totally or almost totally sensed by the transistor and may be multiplied by the gain $\beta_t$ of the transistor which allows for a much more efficient detection of a weak RF signal when compared to the diode-based detector.

Current $I_b + \Delta I_b$ 726 is increased by the multiplication or gain of a current 728 which represents the gain of the transistor. Input noise $Vin_n$ 732 is multiplied to output noise shown as $I_{n1}$ 730, which relates to the transconductance of the gain circuit in the bias condition used. Additional output side noise current $I_{n2}$ 734 is due to inherent noise current on the output, such as flicker noise in the transistor. Flicker noise is a particularly limiting factor in CMOS implementation, and its effect is suppressed by the disclosed PN sequence methods according to various embodiments of the invention, as this PN sequence methods allow higher frequency AC coupling that applies a filtering effect to the low frequency flicker noise. An output voltage 738 is produced across load resistor 736.

A derivation of the tag receiver sensitivity is now provided below using this model. Referring to the detector transistor, a change in collector current in relation to a change in input signal RF voltage is given by:

$$\Delta I_c = \frac{I_c V_s^2}{4 V_T^2} = \frac{I_c P_{in} Z_{in}}{2 V_T^2}$$ Equation 23

In this equation $V_s$ is the peak of the RF input sine wave signal. If the input capacitance is not resonated, then the input impedance may be represented by the following equation:

$Z_{in} = Z_{Cin} \text{Parallel} R_{in}$ Equation 24:

However, if the input capacitance is resonated, the input impedance is increased and may be represented by the following equation:

$Z_{in} = R_{par} \text{Parallel} R_{bias}$ Equation 25:

In the above equation, $R_{par}$ is the effective parallel resistance due the limited Q of the resonant circuit that resonates out effective input capacitance $C_{par}$.

As previously discussed, the receiver may be very sensitive to noise if operating in certain modes. The total output side noise may be represented by the following equation:

$\text{TotNoise} = N_F + \text{GainedNoiseIn} = N_F + g_m^2 Vin_n^2 R_L$ Equation 26:

where:
$Vin_n$ = detector input side noise voltage over the bandwidth of interest
$N_F$ = detector output side noise power over the bandwidth of interest
$R_L$ = detector load impedance $g_m$=transistor baseband transconductance (transfer function from input small signal voltage to output small signal current)

Additional terms to be used are:

$D_R$=data rate $R_n$=effective noise resistance on input side that would generate "$Vin_n$" (often only slightly larger than $R_{bias2}$ 720)

$F_f$="Filter Factor" for a filter 3 dB bandwidth generally moderately greater than bit rate $D_R$ needed to pass the signal, usually between 1.5 and 2.0 to allow fairly sharp edges for simple slicer circuitry.

$N_{bwf}$=effective noise bandwidth factor increase greater than filter 3 dB BW ($F_f$*$D_R$). This factor $N_{bwf}$ is approximately 1.22 for second order filtering, and 1.57 for first order. Physically, this factor allows capturing the noise passed by the filter outside its 3 dB bandwidth due to the fact that the filter skirts are not perfect. Total Noise BW=$D_R$*$F_f$*$N_{bwf}$ and conservatively is approximately 3 times the data rate.

Using these definitions and equation, and assuming that electronic device noises have been filtered down to the thermal noise level (that is the purpose of $C_{bypass}$ 716) the input noise voltage may be represented by:

$$Vin_n = \sqrt{4KTBR_n} = \sqrt{4KTF_fN_{bwf}D_RR_n} \approx \sqrt{12KTD_RR_{bias}} \quad \text{Equation 27:}$$

In the above equation, "$R_{bias}$" is the total "effective" noise resistance combination of $R_{bias1}$ 714, $R_{bias2}$ 720, and any bias circuitry noise. If the low pass corner formed by $C_{bypass}$ 716 and the total resistance is well below the signal passband, then $R_{bias}$ is well approximated by $R_{bias2}$ 720. The last approximation on the right of Equation 27 applies if total effective noise resistance $R_n$ on the input side is dominated by $R_{bias}$ and if the total noise bandwidth is approximately three times the data rate.

The useful baseband detected power for any transistor operating as a square law detector is:

$$SignalPwr = \frac{1}{2}\Delta I^2 R_L \quad \text{Equation 28}$$

Therefore, the signal to noise ratio on the output side of the transistor detector is:

$$SNR = \frac{\frac{1}{2}\Delta I_c^2 R_L}{N_F + g_m^2 Vin_n^2 R_L} \quad \text{Equation 29}$$

Solving for $\Delta Ic_{req}$ as harvested collector signal current that is required to achieve a desired SNR:

$$\Delta Ic_{req} = \sqrt{\frac{2SNR_{req}}{R_L}(N_F + Vin_n^2 g_m^2 R_L)} = \sqrt{2SNR_{req}(I_{NF} + Vin_n^2 g_m^2)} \quad \text{Equation 30}$$

where $I_{NF}$ is detector output side noise current.

If the output side transistor noise floor $N_F$ is negligible, then:

$$\Delta Ic_{req} \approx \sqrt{2SNR_{req} Vin_n^2 g_m^2} \quad \text{Equation 31:}$$

For a particular transistor and biasing circuit, expressions for $\Delta I_{req}$ and $Vin_n$, may be inserted and solved for sensitivity. Thus, equating for harvested signal $\Delta I_c$ as a function of signal power (moved to RF voltage via impedance environment) from Equation 23 and $\Delta Ic_{req}$ from Equation 31 gives:

$$\frac{I_c P_{in} Z_{in}}{2V_T^2} = \sqrt{\frac{2SNR_{req}}{R_L}(N_F + V_{in}^2 g_m^2 R_L)} \quad \text{Equation 32}$$

In Equation 32 $I_c$ is standing bias current. Now solving for sensitivity as minimum input power $P_{in}$ that gives required SNR:

$$P_{in} = \text{Sensitivity} = \frac{2V_T^2}{I_c Z_{in}}\sqrt{\frac{2SNR_{req}}{R_L}(N_F + V_{in}^2 g_m^2 R_L)} \quad \text{Equation 33}$$

From Equation 33 it is found that bipolar transistor detectors with excellent output side noise floors $N_F$ (those not degraded by more than a few dB above thermal noise) can achieve sensitivity on the order of approximately −60 dBm. It is also noted that greater bias current should improve sensitivity as long as the transistor output side noise is dominant over input side thermal or device noise. But, if gained input side noise is dominant, then sensitivity is not a function of bias current because $g_m$ is proportional to bias current and the bias current functional dependence will cancel.

Figure 8:
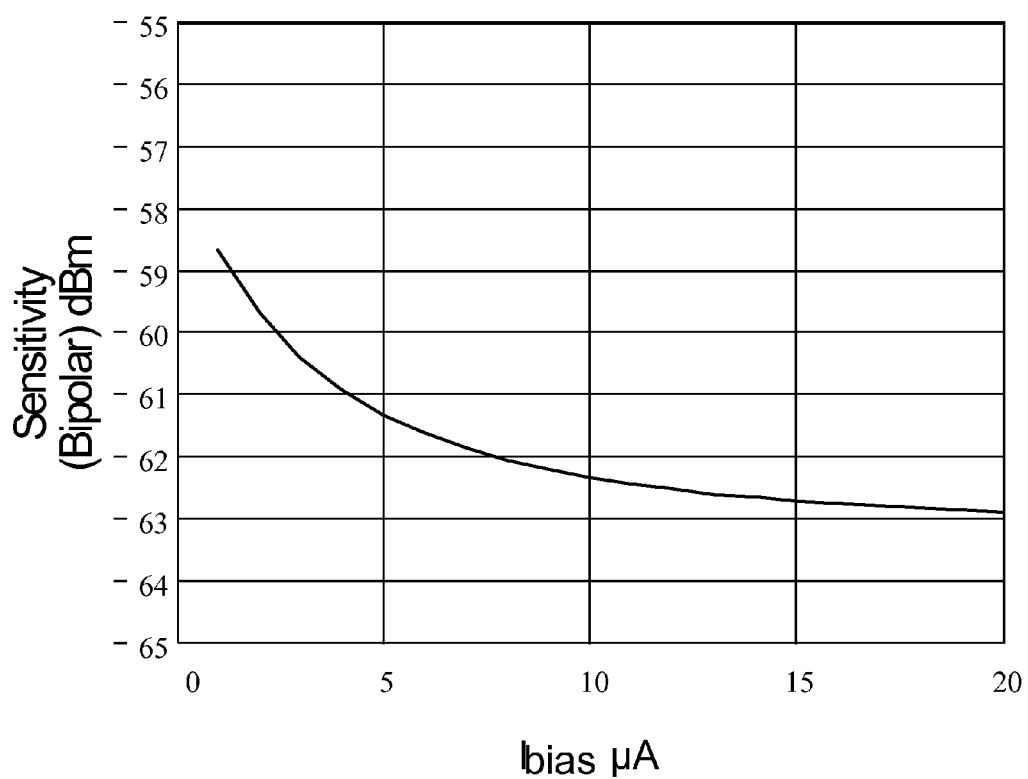
FIG. 8 is an exemplary plot showing bipolar transistor sensitivity (at a particular data rate) as a function of the detector bias current according to various embodiments of the invention.

FIG. 8 shows an exemplary curve 804 of bipolar transistor sensitivity (in dBm) 802 as a function of bias current (in µA) 800 in the transistor. It is obtained from Equation 33 using representative transistor parameters, and represents a case where transistor noise is not negligible but also is not severe. In this particular example, $Z_{in}$ is equal to 200Ω, $R_b$ is equal to 8 kbps, and $R_{bias}$ is equal to 1.8 kΩ. This curve shows the relationship between sensitivity and current such that an increase in the bias current results in an increase in sensitivity up to a point.

CMOS detectors are generally on the order of 5 to 10 dB inferior to the bipolar sensitivity due to moderately smaller signal harvest and the higher flicker noise currents on their output side resulting in larger noise floor $N_F$. The use of Manchester modulation and the PN sequence training, flagging, and synchronizing method result in precision reference control and flicker noise rejection that can extract the best possible sensitivity from CMOS.

To allow for this excellent sensitivity using either bipolar or CMOS transistor detectors on the tag, a plurality of dynamic range states are provided within the RFID system design disclosed herein.

F. Dynamic Range States within an RFID System

An RFID tag is provided with a plurality of dynamic range states in order to cover a wide range from very close to the reader to the longer range in accordance with the tag sensitivity disclosed above. As discussed above, the SNR within the tag relates to the transmit power of the reader and the distance between the reader and the tag, both which are important factors in the received power level at the tag.

Figure 9A:
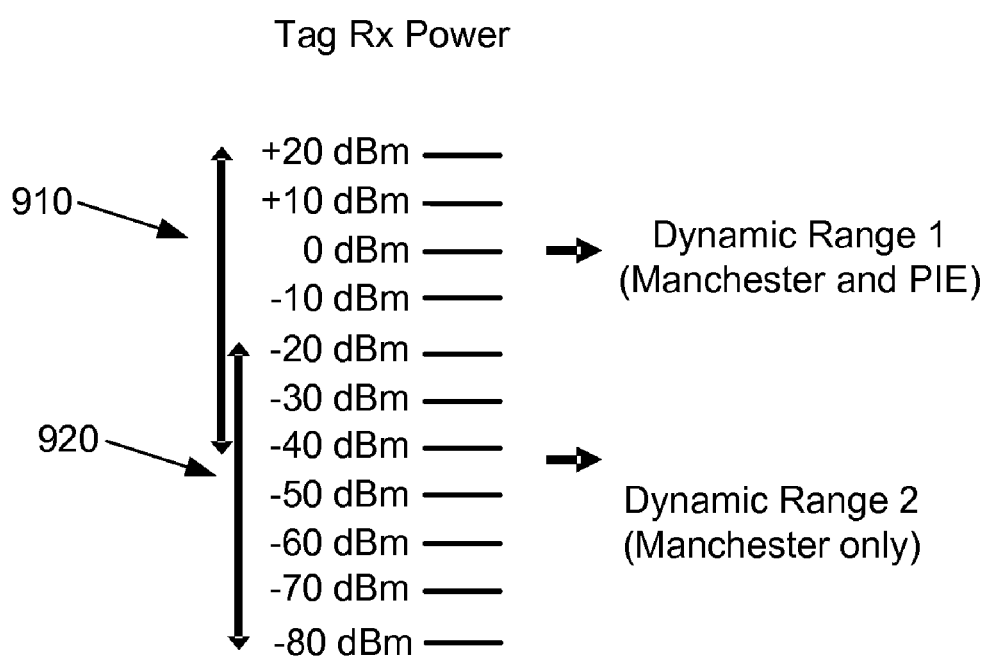
FIGS. 9A and 9B illustrate exemplary multiple dynamic range states of a detector according to various embodiments of the invention.

FIG. 9A illustrates an exemplary chart of dynamic range states that allow a tag to operate over a relatively longer received power range according to various embodiments of the invention. A first dynamic range 910 is shown comprising a relatively higher received power and relating to a first mode of operation for the tag. In this first mode, the tag may function in a peak detection mode over all or part of the higher dynamic range state.

A second dynamic range 920 is shown comprising relatively lower received power and relating to a second mode of more sensitive operation for the tag. In this second mode, the tag may function in a square law mode in order to properly detect and process the received weak RF signals.

In certain embodiments, a protocol allows for multiple forward modulation modes that the more sensitive dynamic range state may be used for a superior modulation mode such as Manchester, while the upper dynamic range state also serves well for the standard passive forward modulation form of Pulse Interval Encoding (PIE) in addition to Manchester. One skilled in the art will recognize that the various dynamic ranges may vary in characteristic and power according to the environments in which they operate.

Figure 9B:
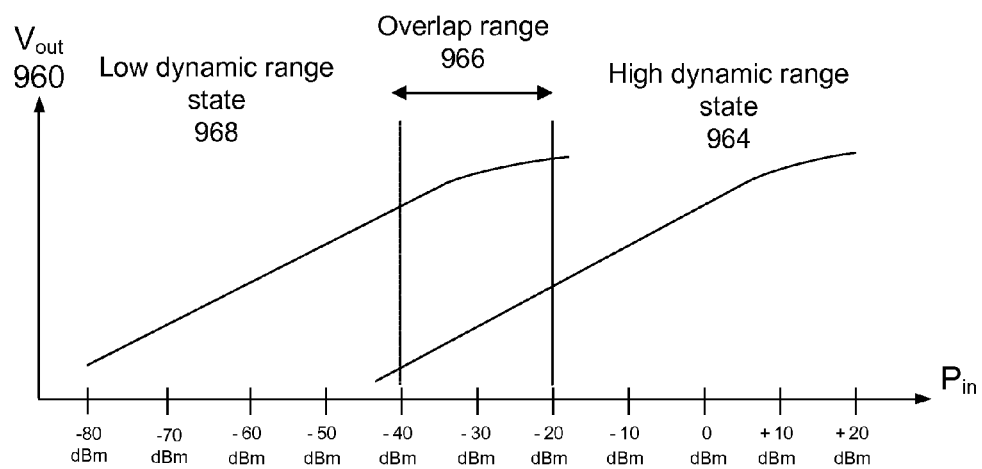

Referring now to FIG. 9B, detector final output voltage 960 is shown as a function of two similar dynamic range states 964 and 968. An overlap range 966 is shown between the low dynamic range 968 and the high dynamic range 964 that reduces the odds that the signal may be lost due to fade events. Accordingly, when $P_{in}$ 962 lies within the overlap range 966, the tag may operate within either of the low or high dynamic range states.

G. Signal Training and Synchronization

As previously discussed, embodiments of the RFID system provide for tags to be operable in a plurality of dynamic state ranges. A transition time may be provided within the system to allow the tags to completely transition from one dynamic range state to another. In various embodiments of the invention, a training period is provided within activation and normal mode command structures that allow this transition time. In many embodiments, this training period is important due to the wide ranges of desired signals present within the environment in which the RFID system operates. For example, if a signal is too strong or has become too strong since the last dynamic range adjustment, then the detector of the tag may saturate. In that case, with proper training time provided, the BAT has enough time to detect the aforementioned condition, and move to a less sensitive dynamic range state. On the other hand, if the desired signal is weak, the BAT may move to the more sensitive dynamic range state.

In yet another embodiment of the present invention, by means of an AGC, the dynamic range can be adjusted or extended within each dynamic range state. The closed loop control of the active load that was previously discussed is one such form of AGC. Additionally, deliberate compression can extend dynamic range performance, and has also been presented.

In addition, methods may be provided that allow for AC coupling training, or equivalently, for quasi-AC coupling or quasi-DC coupling (two forms of adaptable slicer reference acquisition, as discussed below). Use of well controlled comparator reference levels enable this improvement is sensitivity according to certain embodiments of the invention.

H. Non-PN Sequence Based Methods and Basic Forms of Slicer Reference Acquisition In many instances, it may be desirable for the tag to be able to process (slice) detected forward link signals that may have low amplitudes, such as approximately one to a few millivolts, at a comparator (slicer) input. For a comparator to properly "square up" such low amplitude signals, the signal swing should be nearly perfectly centered around a reference voltage on the other comparator input. This process of centering is referred to as "slicer reference acquisition." Among training processes that may be employed in the tag receiver, reference acquisition comes after dynamic range state acquisition and before symbol timing acquisition (bit synchronization).

Since it is common practice to AC couple signals with large DC content and small AC content in order to perform this centering via stripping off the DC content, it is also common to use the term "AC coupling" as a synonym for reference acquisition. However, speaking accurately, AC coupling for this purpose is really only a type of reference acquisition. Other types do exist, and there are several that are pertinent to RFID tag receivers. For example, if a tracking system derives a suitable reference and then holds it stationary over a communications interval of interest, this may be referred to as "DC leveling" or "quasi-DC" coupling. It is not pure DC coupling since the reference so acquired is only temporarily fixed.

Figure 10A:
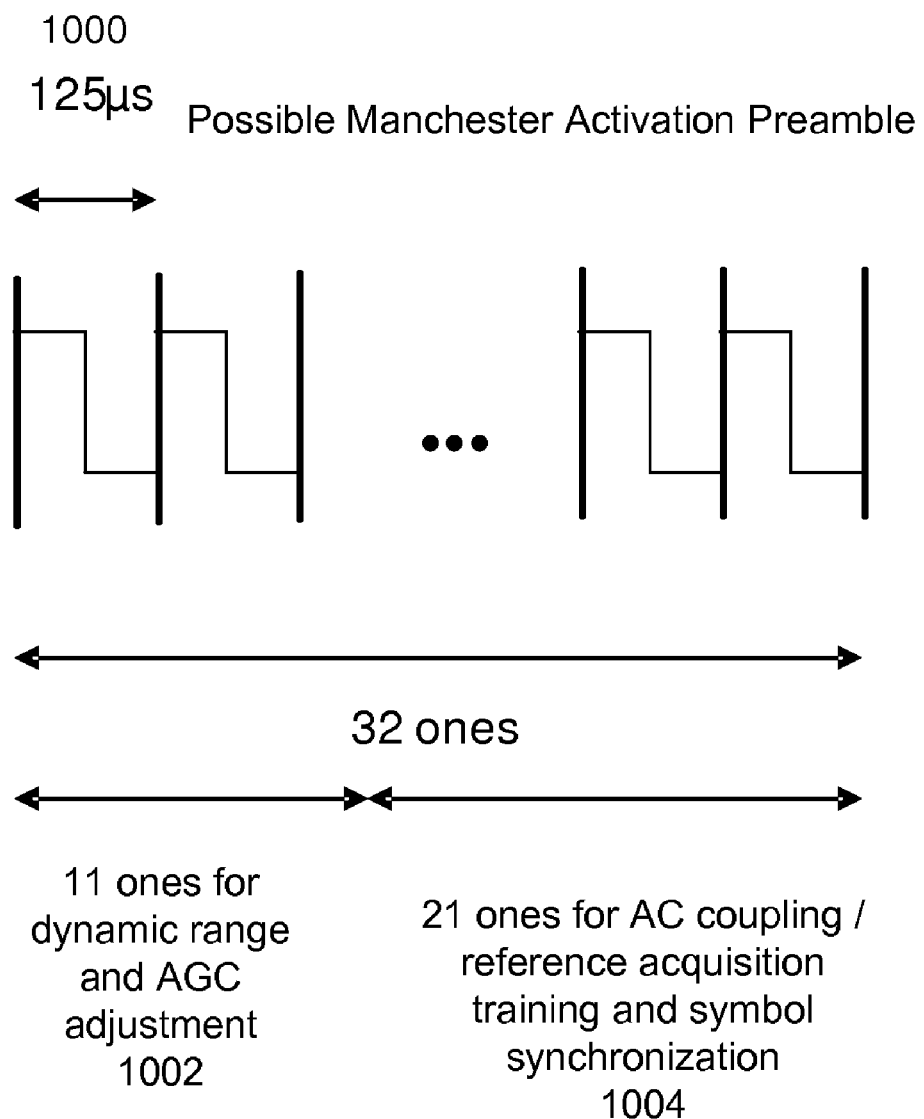
FIGS. 10A through 10G illustrates symbol-based training and slicer reference acquisition according to various embodiments of the invention.

Slicer reference acquisition or training of an AC-coupling device may be assisted at the protocol level by a symbol-based, CW-based, or PN (Pseudo-random Noise) sequence based training technique. FIG. 10A illustrates possible Manchester symbol-based training by designating a time period in the preamble of a repeating set of Manchester bits that allows a BAT receiver sufficient time to select an appropriate dynamic range state according to various embodiments of the present invention and then conduct reference acquisition. Manchester is suitable for small signals and high sensitivity as it may be AC coupled to strip off DC and allow subsequent processing to apply to the AC signal of interest because it is "DC balanced" whereby each symbol has identical DC content. This leads to a random Manchester bitstream having a power spectral density that approaches zero at zero frequency. Thus, if AC coupled or high pass filtered with an AC coupling corner (high pass filter 3 dB point) is used that is well below the main spectral content, it will be passed with little distortion.

In FIG. 10A, a time of 11 symbols 1002 is first communicated to the receiver to allow proper dynamic range selection and any AGC actions. An additional 21 symbols 1004 are next communicated for training of AC-coupling or other method of slicer reference acquisition. Each symbol will have a particular length 1000 (here 125 μs for a slow hibernate mode communications), and the sum of the training symbol times used will define the period of time for training. One skilled in the art will recognize other time periods and symbol counts may be implemented in the preamble of a BAT to generate a sufficient training period.

Figure 10B:
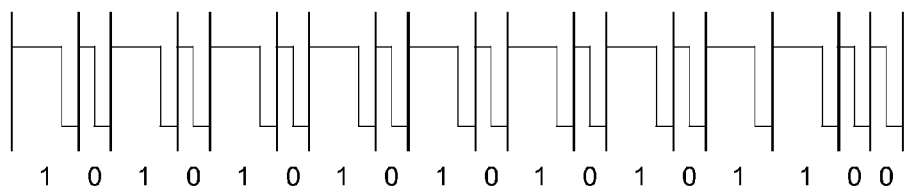

FIG. 10B illustrates an exemplary method of "Advanced PIE" pulse interval encoding forward modulation preamble training according to various embodiments of the invention. "Advanced" PIE in differs from "Simple" PIE in that it has hibernation and some additional commands. By providing training of the tag receiver prior to transmission of the Activation command, the tag may be designed to capture a demodulation reference level for data slicing via a zero power RC low pass filter or other low power linear method, in preference to power consuming non-linear active modes of reference acquisition. Such non-linear methods (such as quasi-DC to be presented shortly) may be acceptable or preferable once the tag is activated, since it is in normal or awakened mode only briefly and thus with little impact on tag battery life. But in hibernate mode, where the tag may be continuously listening, it may be preferred to reduce tag power consumption.

The preamble shown in FIG. 10B is suitable for AC coupling or reference training of hibernating PIE tags according to various embodiments of the invention. However, one skilled in the art will recognize that this preamble may be less suitable if the hibernation PIE symbol time were ever reused as a normal mode data rate. In that event, the statistical probability of confusing this preamble with normal mode commands and data would significantly increase, resulting in power expenditure in the tag to check if normal communications were in fact Activation commands to which the tag should react. This problem will be addressed in the next section disclosing PN sequence based training, activation validity, and frame synchronization.

Figure 10C:
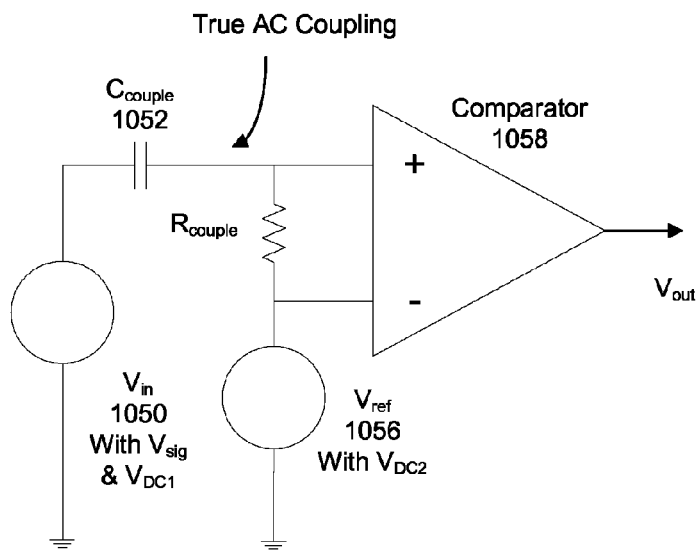
Figure 10D:
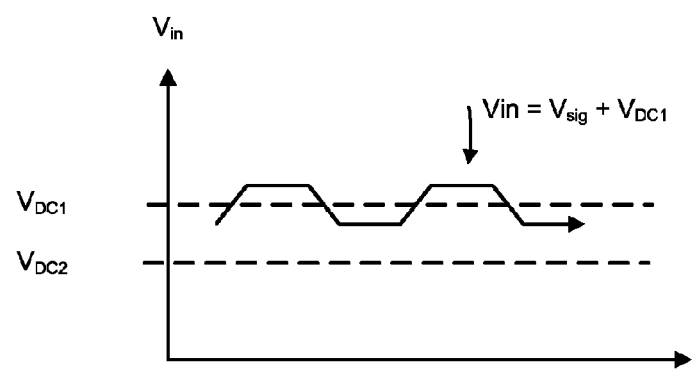

FIG. 10C provides an illustration of "True AC Coupling" according to various embodiments of the invention. The input voltage $V_{in}$ 1050 contains a time varying AC signal $V_{sig}$ and a DC component $V_{DC1}$. FIG. 10D shows input signal $V_{in}$ "swinging around" $V_{DC1}$. If at a certain time $V_{sig}$ "comes on," then after a settling time of a number of time constants of the coupling capacitor 1052 and coupling resistor 1054, the DC voltage between $V_{ref}$ 1056 and the DC content of $V_{in}$ will be charged across coupling capacitor 1052. At that time, the AC component of $V_{in}$ will be seen at the positive comparator input as "swinging around" comparator reference level $V_{DC2}$. This is the process referred to as "AC coupling training", and once it is complete, the comparator will accurately slice or "square up" the input signal and pass it on to digital circuitry for further processing. Since comparator 1058 cannot begin properly squaring up the signal until this training process has occurred, time be provided to allow this training process to complete within an RFID system.

Figure 10E:
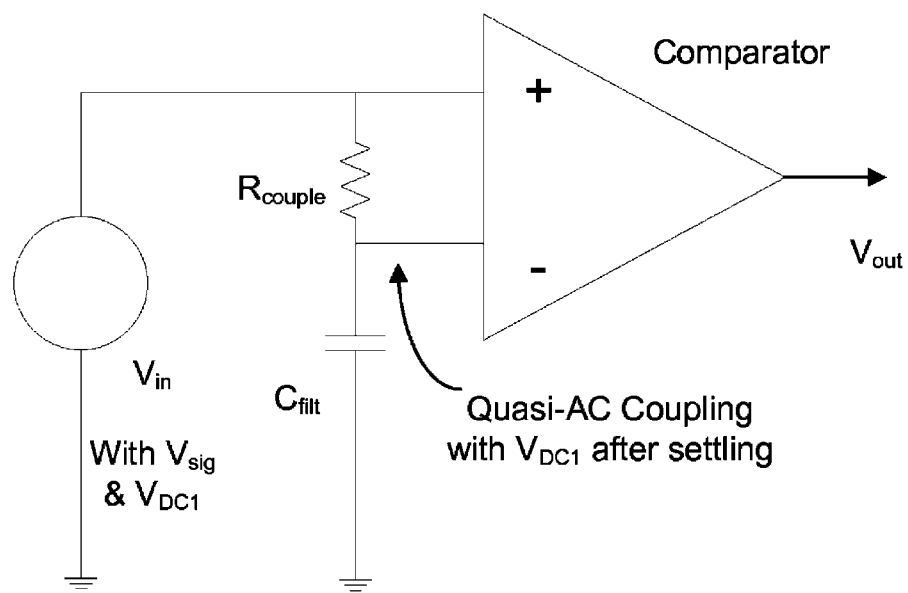

FIG. 10E illustrates "Quasi-AC Coupling" whereby the DC content of the input signal is "filtered out" by the RC filter and used as a comparator reference according to various embodiments of the invention. The RC circuit is in a low pass form as compared to the high pass form of true AC coupling, but the training time requirements are typically the same. It is a case of resistively charging a capacitor to either move the DC presented to the comparator input to match a fixed reference (true AC coupling), or moving comparator reference to match the DC content of the signal (quasi-AC coupling).

Figure 10F:
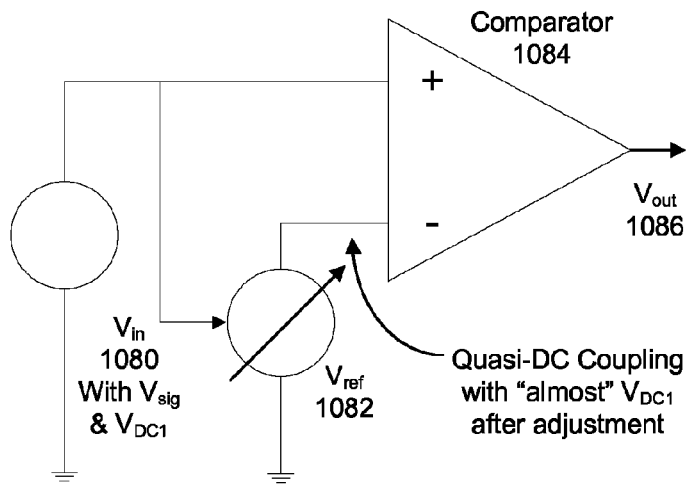
Figure 10G:
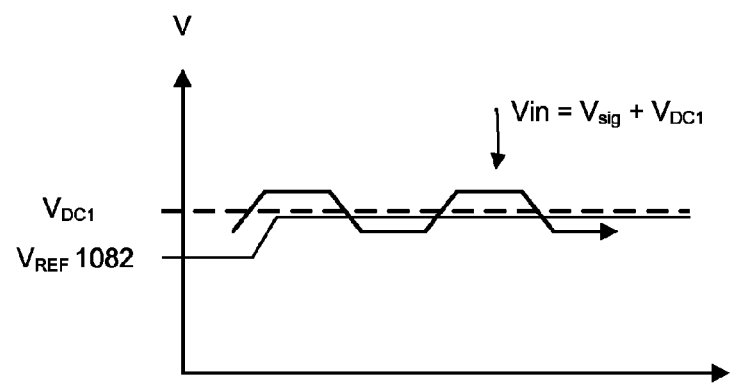

FIGS. 10F and 10G show the more sophisticated case of "Quasi-DC Coupling" according to various embodiments of the invention. This is similar to quasi-AC coupling in that the comparator reference is being moved to center up for slicing. However, the comparator reference is moved by an intelligent digital or non-linear circuit illustrated here as variable voltage reference 1082 that acts upon or processes the input signal to obtain the desired reference level. One form of such processing would be to use peak detectors, capture the positive and negative peaks of $V_{in}$ 1080, and obtain the average of those as a reference level for slicing. One skilled in the art will recognize that various methods may be employed to obtain the desired reference level; all of which are intended to fall within the scope of embodiments of the invention.

There are several advantages of quasi-DC reference acquisition, such as faster acquisition that can allow a lower training time. Another advantage is that the reference voltage may be temporarily "frozen" as illustrated in FIG. 10G. In particular, $V_{ref}$ 1082 allows quasi-DC to perform accurate slicing of modulation forms such as PIE that do not have a 50% DC content, or even a fixed DC content. The waveform of $V_{ref}$ 1082 is shown as quickly adapting to the input signal and acquiring a reference quite close to the true midpoint of the signal swing of $V_{in}$, with only a small "tracking error."

This ability to freeze the slicer voltage reference for a desired interval of communication is referred as "quasi-DC" and relates to a general method of reference acquisition according to certain embodiments of the invention. However, quasi-DC has the disadvantages of more complexity, cost, and power consumption as compared to AC or quasi-AC coupling. In a hibernating RFID tag, where low hibernation power consumption is important to getting a battery life of months or years out of a tiny battery, the power consumption of quasi-DC reference acquisition may be unacceptable.

Hence, various embodiments of this invention may use sufficiently long symbol training in hibernating PIE mode to allow for low power AC or quasi-AC reference acquisition, only reverting to quasi-DC for the brief period of time the tag is awake in normal mode. When the PIE tag is in normal mode, specific symbols (such as RTcal and TRcal within the ISO\IEC 18000-6C standard) may be used to communicate forward and reverse data rate information from reader to tag. These symbols are much longer than the standard zero and one symbols, have DC content that varies drastically from 50%, and yet still must have their pulse widths accurately measured by the tag to determine these data rates. However, the extreme duty cycle of the these long symbols oftentimes tends to pull off AC coupling or quasi-AC coupling from the desired near mid-point values that would allow accurate measurement, particularly at the lower sensitivity levels desired of battery tags.

The problem of maximizing sensitivity of battery tags using the non-ideal PIE modulation mode may be partially addressed by acquiring the reference with only the zero and one symbols in the hibernate mode, and then for the case where the tag is the first accessed after waking up, temporarily "saving" the reference using quasi-DC modulation to use during the time that the long symbols (e.g., RTcal and TRcal) need to be measured in normal mode. If a tag is not immediately accessed in normal mode, then during the time that the reader is accessing other tags, the tag may "refresh" its slicer voltage reference periodically by the available normal reader signaling and be ready to accurately slice forward reader communications when the tag's turn to communicate does arrive.

Figure 11:
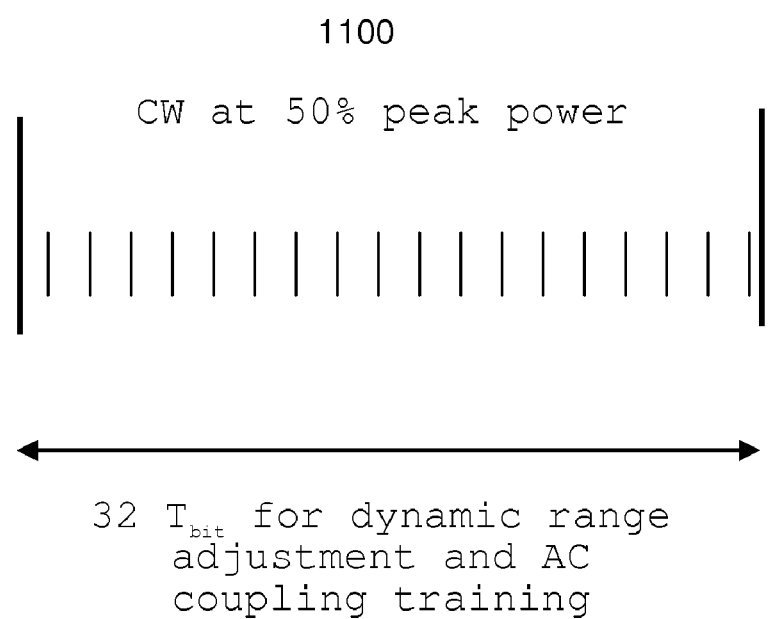
FIG. 11 illustrates possible continuous wave training according to various embodiments of the invention.

FIG. 11 illustrates a CW-based training technique according to various embodiments of the invention. A system may implement the CW-based training 1100 because it has only one spectral component (at the carrier frequency), that allows the CW-based training to create less interference by not transmitting frequency components in other channels that could interfere with the relatively weak tag backscatter signals that other readers are receiving. In this example, a CW is maintained at 50% peak power (i.e., DC average of the signal) or approximately 50% peak power for a period of time 1102 that allows sufficient training time for the BAT.

Figure 12:
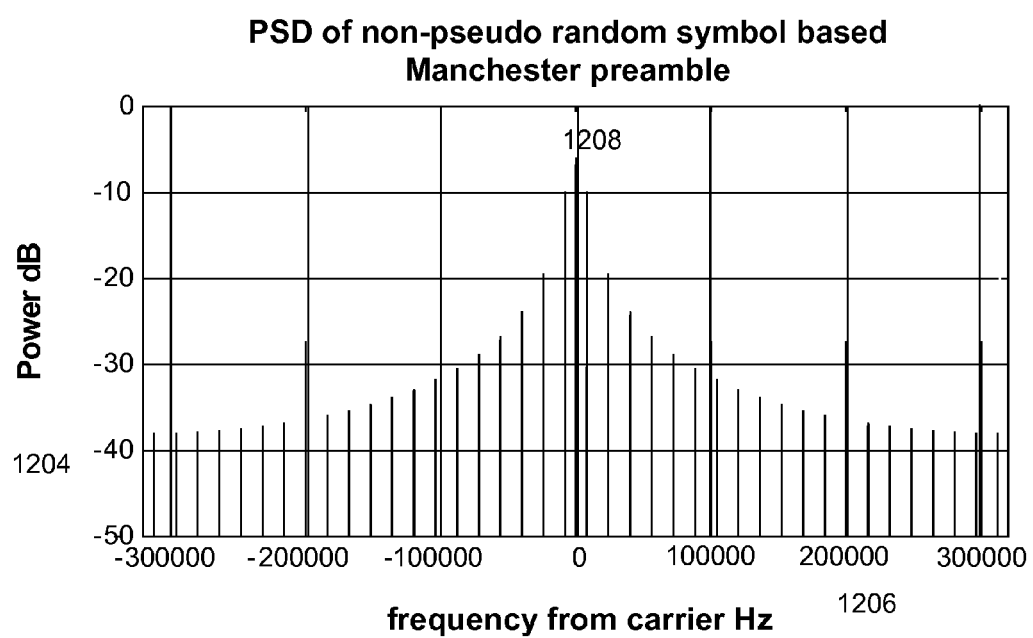
FIG. 12 is a chart showing frequency spray caused by symbol-based training, which may be avoided by the CW based training of FIG. 11.

FIG. 12 is a plot 1200 that illustrates the advantage of CW training over symbol training based on the spectral occupancy of the different training methods. The plot shows frequency power (in dB) 1204 as a function of the frequency of the signal 1206. In this example, a repeating Manchester symbol preamble (all ones) is shown within the frequency domain at which the carrier 1208 is shown in the middle and other frequency components on both sides of the carrier. Comparatively, CW training causes a single impulse at the sine wave carrier frequency in the frequency domain. Accordingly, the CW carrier causes a lower statistical incidence of interference during the training operations and may be preferred in many environments in which frequency spray may adversely interfere with the relatively weak backscatter signals that other readers are receiving. One way CW training may be advantageously used is to allow a CW interval to precede the PN training sequences that are disclosed herein.

I. PN Sequence Based Training and Synchronization

The above training methods using series of all ones or zeroes, or simply pure carrier, have the advantage of simplicity, but may not provide the best possible total performance relative to all the desired functions of a preamble. For example, in order to distinctly differentiate Activation commands from other commands or data at the same data rate, prior art methods used longer symbols as flags that a legitimate activation was being attempted. Such long symbols, being distinct from the normal zero and one symbols, could also serve as frame synchronization flags.

Frame synchronization is generally the next synchronization required above symbol or bit synchronization and is used to process the bitstream, such as allowing the bitstream to be parsed into words or commands. An example of a symbol that may serve as a frame marker or "flag" is a symbol noticeably longer than the zero and one symbols, such that it is clearly distinguishable from the zero and one symbols. An RFID industry term for such a long symbol frame flag is an "interrupt". However, interrupts have the disadvantage of requiring AC coupling methods that have lower high pass corners, which are more expensive of integrated circuit die area and take longer to train. The lower AC coupling corner that passes these interrupts also allows more low frequency flicker noise in the demodulator, and may noticeably harm tag sensitivity, particularly in CMOS implementations. In many RFID systems, it may be preferred to perform all authentication and synchronization functions using only the standard symbol alphabet, which for RFID is normally the zero and one symbols, because higher level signaling (such as 2 bits per symbol, requiring 4 symbol states) is not common practice for the forward link of simple and low cost RFID tags.

Figure 13:
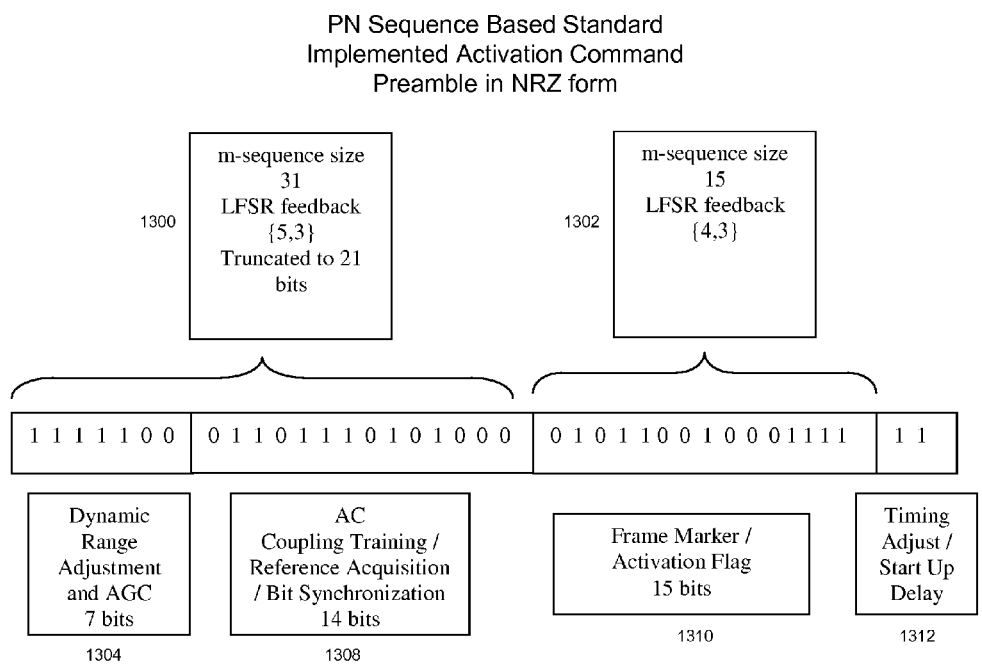
FIG. 13 presents an exemplary method to construct a hibernate mode preamble according to various embodiments of the invention.

Referring now to FIG. 13, an implementation of a hibernation mode Activation command preamble using PN sequences is shown according to various embodiments of the invention. This preamble consists of a set of PN sequences that achieves the combination of dynamic range selection, AC coupling or reference acquisition training, bit synchronization, and frame marking. In various embodiments, the frame marker is an important communication function and in the advantageous form shown here may also provide the additional function of a valid "activation flag" or activation authentication to indicate to a high reliability that a legitimate Activation command is about to follow. This not only provides training, symbol synchronization, and frame synchronization at the tag, but allows the tag to begin powering up circuitry to process the following Activation command and prepare for normal mode operation if the activation is successful. This preamble may also be enhanced with a preceding period of reader CW transmission that allows additional training time for dynamic range selection while causing lower interference through its very narrow spectrum.

In many situations, it may be advantageous to provide the tag the option to begin its power-up sequence as early as possible, so that time may be saved for the power up of key tag subsystems. Examples of such key subsystems that have noticeable time lag associated with their power up delays include the start up times of crystal oscillators and phase locked loop synthesizers, start up routines of microcontrollers, and settling times of voltage regulator based power supplies. If the tag engages in too high a density of these start ups, only to later shut down because it turns out that there was not a legitimate activation underway, then its battery life may be significantly shortened. The high reliability of the frame marker flag prevents the tag from depleting its battery with at least some unnecessary processing.

The particular set of PN sequences in the activation preamble of FIG. 13 start with a sequence of 21 bits 1300 selected out of a 31 bit m-sequence (a type well known in the art). The first 7 bits 1304 are intended for dynamic range state selection and AGC action (if necessary), and the following 14 bits 1308 for AC coupling training or other method of slicer reference acquisition, and symbol synchronization. An advantage of a 31 bit m-sequence is that this preamble may in the future be conveniently extended to the full 31 bits. One reason this may be desired is for selection between more than two dynamic range states, such as might be desired for the case of an RF LNA used in a Class 3 Plus tag, resulting in 3 or 4 dynamic range states. Following the 14 reference and symbol synchronization bits, Frame Marker/Activation Flag 1310 consisting of all 15 bits of a 15 bit m-sequence 1302 is transmitted by the reader. The addition of bit stuffing in the reader and destuffing in the tag that this 15 bit m-sequence frame marker flag is reliable as a frame synchronizer and indicator of legitimate activation, even in the presence of bit errors in the channel.

The preamble of FIG. 13 concludes with 2 "one" bits 1312 to provide a final timing trim and preparation to receive opportunity to the tag prior to the subsequent full Activation command. This period of time may be crucial to having adequate power-up sequencing time for tags that did not take advantage of the opportunity to begin power-up sequencing upon partial correlation of the frame synchronization/activation flag that preceded the final timing adjustment. One skilled in the art will recognize that various hibernation mode Activation command preambles may be used with embodiments of the invention.

Figure 14:
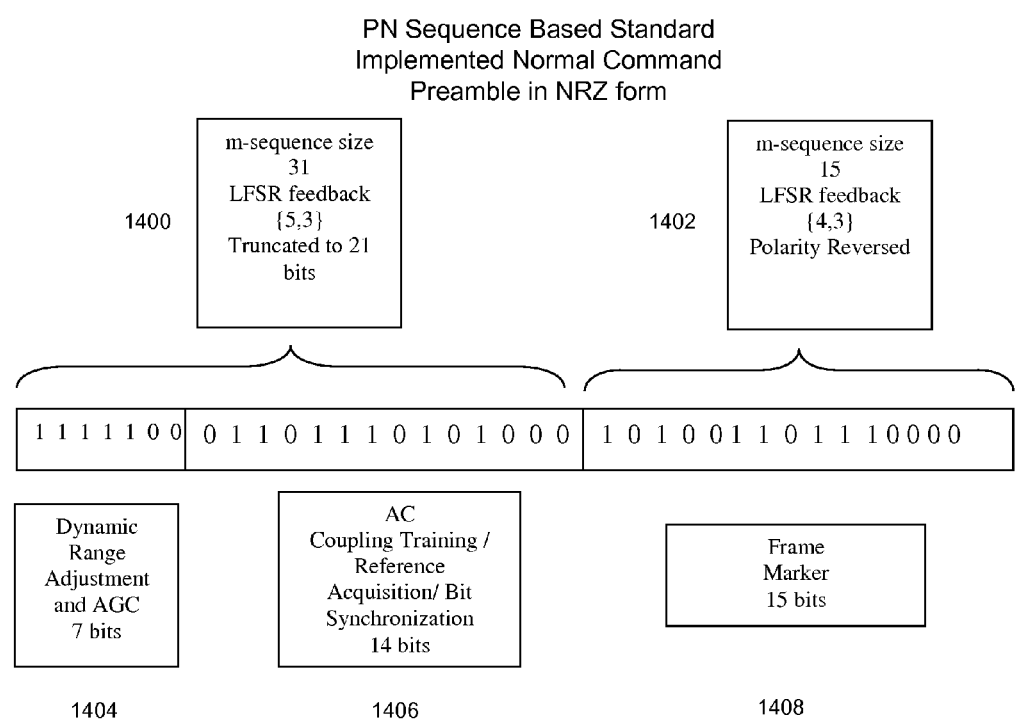
FIG. 14 presents a different exemplary method to construct an example normal mode preamble that allows for dynamic range state selection and AC coupling training, and a complete PN sequence as a frame marker or synchronization flag according to various embodiments of the invention.

Referring now to FIG. 14, an exemplary normal mode command preamble is shown according to various embodiments of the invention. This preamble is similar to the preferred activation mode preamble of FIG. 13. It starts with same 21 bit 1400 truncated 31 bit m-sequence of FIG. 13 for the various training steps of dynamic range state selection (if used), Automatic Gain Control (if used) AC coupling/reference acquisition training, and bit synchronization. Specifically the first 7 bits 1404 are advantageously used for dynamic range and/or AGC adjustment, and the next 14 bits 1406 for AC training or slicer voltage reference acquisition. It then has a 15 bit frame marker 1408 constructed of m-sequence 1402 that may advantageously be the bit by bit logical inverse of the 15 bit frame marker/activation flag 1310 of FIG. 13. Using the bit inverse of the same frame marker allows reuse of frame marker detection circuitry on the tag. The preferred normal mode preamble of FIG. 14 differs from the preferred hibernate mode preamble of FIG. 13 in that it does not have a two bit timing adjust on the end of the preamble. Just as in the case of the hibernate mode preamble, its operation may be enhanced by a period of CW that precedes the first modulated PN bits. Such preceding training is most advantageously conducted at 50% of the peak power to be used during modulation, which means this CW then accurately represents the average power to be used during modulation. Since it is equal, it allows dynamic range selection and reference acquisition training. This then allows the PN bits that precede the frame marker to all be used for symbol synchronization, which can allow for more accurate bit synchronization methods.

Simplification of the PN correlator circuitry on the tag may also be possible. In certain embodiments, a series of shorter PN sequences (subsequences) are used to make up a longer total sequence. The correlator may be simplified to use the shorter PN sequence over and over, for example, incrementing a counter value upon each successful correlation. Full correlation is designated when every subsequence has been successfully correlated.

In various embodiments, the reader may adjust the subsequence length and number of successfully correlated repeats needed to declare successful correlation. This flexibility allows trade-off of the statistics of reliable correlation required vs. hostility in the channel. For example, for very hostile channels where it may be difficult to pass the correlation criteria, the reader may establish relaxed criteria. The tag may also, based upon internal criteria, be allowed to adjust these parameters independently of the reader, for example, when the tag detects a situation where it is receiving what appear to be multiple attempts to send an Activation Flag that are missing correlation due to a high Bit Error Rate on the channel.

This adjustment of parameters might also be useful if the hibernate mode sensitivity is degraded as compared to the higher power consumption normal mode sensitivity. For example, a Class 4 tag will have an active receiver that is normally more sensitive and more selective than its hibernate mode square law receiver. A channel that is difficult for the tag's square law hibernate receiver may be perfectly usable for its active mode receiver, if the reader can get the tag to go active and turn that better receiver on, if the tag detects activity that it suspects is RFID and then autonomously turns on its active receiver to check. These considerations of adaptable threshold of correlation also apply to the case of a single longer PN sequence. It may also be advantageous to store these variable operational settings in the Settings File to be discussed later with regards to the Tag Capabilities Reporting and Setting system.

Part of the reason to use PN sequences as frame synchronization flags is that they offer good cross-correlation properties. In the case of a simple digital correlator, which may be implemented on a tag, the bit-by-bit sum of two versions of the PN sequence, where one is shifted at least one bit differently than the other, has a low sum value. A full sum (15 for a 15 bit sequence) only occurs when the shifts are equal, which reliably indicates synchronization. The correlation of sequence formed of part of a PN sequence plus some random (noise) bits against the full sequence is also generally low.

Figure 15:
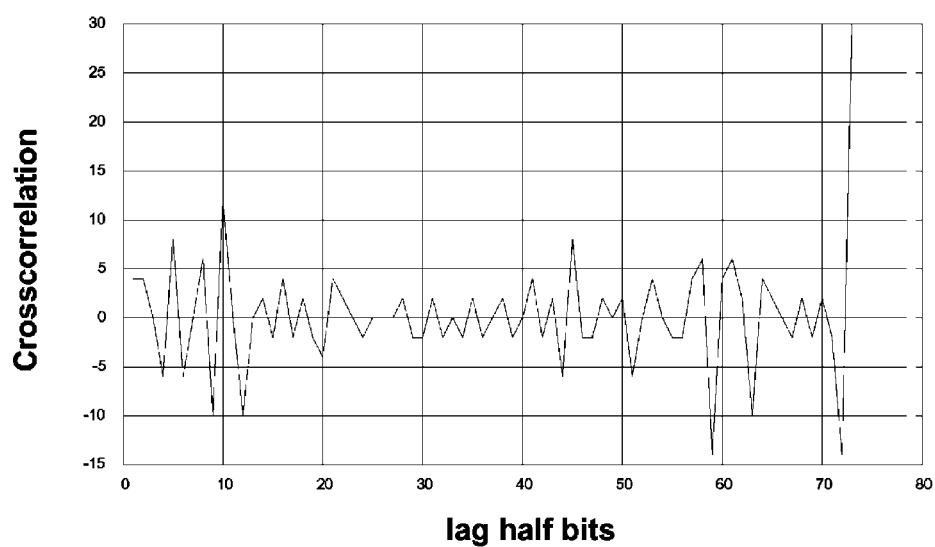
FIG. 15 presents a cross-correlation of a preferred 15 bit PN sequence frame synchronization flag with a preferred 21 training bit PN training sequence and the same 15 bit frame synchronization sequence according to various embodiments of the invention.

For example, FIG. 15 presents a realistic cross-correlation 1500 of a sequence of the 21 NRZ training bits followed by the 15 bit m-Sequence flag presented in FIG. 14 in the case where the receiver correlator was pre-loaded with random data (for example when the tag is powered up). Once the transmission begins, the demodulator is temporarily overloaded during initial training (the receiver may not be in the correct dynamic range state and the AC coupling charge state does not provide the correct slicing reference), as the initial random data in the correlator's buffer is shifted out, the wrongly sliced data is shifted in until the point the demodulator begins to correctly demodulate (at the 37th Manchester half-bit). It can be seen that the value of the correlator's output does not get close to its peak until the full 15-bit PN flag is completely in the buffer. This is the advantage of using a PN flag, when it is correlated to any other signal (including itself but shifted, even slightly shifted), the value of the correlator's output remains low, until the whole sequence is in the correlator's buffer (at the 72nd Manchester half bit), at which point the correlator's output peaks, reliably signaling correct frame synchronization.

In the above discussed exemplary PN sequence preambles, 15 bits of PN sequence for activation validity flags and frame synchronization was disclosed. The system design concern is primarily to prevent false recognition of PN sequence frame markers and activation validity flags. There are various problems that result from such false recognitions as follows:

In normal mode operation, if normal data traffic is mistaken by the tag for a PN frame marker, then the tag may subsequently mistake the following bits as a command that it could mistakenly execute.

In hibernate mode, if normal data traffic is mistaken by the tag for a PN frame marker/activation validity flag, then the tag may subsequently begin its wake up process, thus wasting battery life.

In various embodiments of the invention, bit stuffing may be implemented in the reader data streams so that PN sequence flags are not accidentally transmitted. In certain embodiments, the flag length is $N_{flag}$ bits long. On the transmit (reader) side, when the reader detects it will transmit a forbidden sequence (i.e., 14 bits ($N_{flag}-1$) match the sequence), the reader inserts one additional bit, effectively forcing a different sequence. On the receive side, the inverse process occurs. When the tag detects it is on the brink of receiving the forbidden sequence (the first $N_{flag}-1$ bits match), it examines the last ($15^{th}$) bit to determine if it is a stuffed bit (it is if it is different from the last bit of the PN sequence). If it is a stuffed bit, it is removed from the bit stream. If it is not different from the last PN bit, it is a valid PN flag and is not unstuffed.

Figure 16:
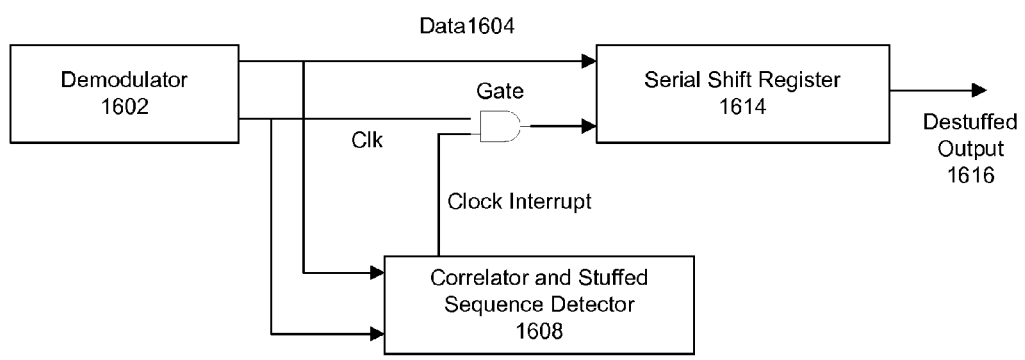
FIG. 16 shows a preferred method of bit destuffing according to various embodiments of the invention.

FIG. 16 shows a method of "unstuffing" in the tag according to various embodiments of the invention. Demodulator 1602 is providing demodulated bits to be evaluated for PN sequence validity by correlator and stuffed sequence detector 1608. In certain embodiments, these two functions are combined into a single module and in other embodiments the functions are provided in discrete modules. Data from demodulator 1602 is simultaneously shifted into correlator 1608 and shift register 1614. When a stuffed bit is detected, indicating there is not a correct PN sequence but a stuffed data stream that almost correlates, then correlator 1608 interrupts the clock of shift register 1614 for a single cycle. This removes the stuffed bit from the serial bit stream, resulting in destuffed bit stream output 1616.

J. PN Flag False Command Response on Real Data

In the absence of bit errors, stuffing has prevented False Command Response due to a tag misinterpreting reader data other than commands on the channel. A False Command Response can occur on real transmissions if the decoder misses the command and a bit error occurs in the reader stuffed bit stream. That situation can occur in a usable but still error prone channel (about 1E-2 to 1E-4 BER), but even then there is statistical protection from the length of the flag code. Most longer commands, such as those within the ISO/IEC 18000-6C RFID standard, also have CRC protection, which allows successfully limiting the False Command Response that can occur when longer commands with parameters and/or data could emulate the flag plus a shorter command that is not CRC protected. In ISO/IEC 18000-6C, Manchester commands that are not currently CRC or specifically random number "handle" protected are Query, QueryRep, QueryAdjust, NAK, and BroadcastID. The worst case is the very common QueryRep command, which is only 4 bits long and thus statistically likely for random data to emulate. The command most likely to suffer a bit error that could falsely emulate a PN flag and the QueryRep command is the Select command, due to its possible long length.

A False Command Response with actual reader transmissions can only occur if these conditions are fulfilled:
  The tag misses the command, since when the tag gets the command it knows to lock out the specific length of known command following bits from any misinterpretation as a flag
  A bit error occurs in a critical place to turn a sequence that is one bit different from the flag into the flag (the situation of a string that is more than one bit different being turned into the sequence is possible, but statistically negligible for workable error rates)
  The bits after the false flag match up to those expected for the command The total False Command Response probability is approximately the probability of missing the flag times the probability that a bit error happens in one of the strings that can be turned into the flag sequence times the probability of a match to the 4 or more bits necessary to emulate a command.

Next the following definitions are made:

$N_{flag}$=the flag/frame synch length in NRZ bits $C_{CL}$=the command code length (4 for Select)

$E_d$=length of essential data such as length (7 bits in the Select command)

$C_L$=total command length (code+all parameters and data)

$P_e$=probability of bit error $P_{pcfr}$(Command)=Probability of Particular Command False Response The probability of missing the frame synch flag plus the command is the probability of at least one error in the flag, command code bits, and the parameters necessary to know the length of the command. If a normal mode frame synch flag size of $N_{flag}$ NRZ bits is used, then:

$$P(\text{Missed\_Command}) = 1 - (1-P_e)^{N_{flag}+C_{CL}+E_d} \quad \text{Equation 34:}$$

In a channel that may be modeled as "All White Gaussian Noise" (AWGN) limited:

$$P_e = 0.5 \cdot erfc(\sqrt{SNR}) \quad \text{Equation 35:}$$

In this equation, "erfc( )" is the complementary error function well known in the communications systems design art, and SNR is the signal to noise ratio in linear units.

Next, the mean number of strings in the command is calculated that are one bit off from the flag sequence. For flags that have $N_{flag}$ bits, this consists of those strings that had $N_{flag}-1$ first bits that matched and were stuffed with the opposite final bit, and also those strings that out of $N_{flag}$ bits just happen to have any $N_{flag}-1$ bits that match. The strings of $N_{flag}$ length that have $N_{flag}-1$ matches are the dominant "almost matches" that a single bit error can make into a match. The number of such events is attained via a standard Bernoulli Trial calculation where the probability of the number of occurrences "k" of an event A with probability "p" of A in N trials is:

$$P(A \text{ occurs exactly } k \text{ times out of } N) = \quad \text{Equation 36}$$

$$\frac{N!}{k!(N-k)!} p^k (1-p)^{N-k}$$

If the event is a bit match (with p=0.5) to occur $N_{flag}-1$ times out of $N_{flag}$ bits, then the above equation gives:

$$P(Nflag - 1 \text{ matches before stuffing}) = \quad \text{Equation 37}$$

$$\frac{N_{flag}!}{(N_{flag}-1)!(1)!} \left(\frac{1}{2}\right)^{(N_{flag}-1+1)} = \frac{N_{flag}}{2^{N_{flag}}}$$

In addition to the matches that occur in $N_{flag}-1$ bits that are not stuffed, there is also the single additional exact match of all bits that was stuffed. Thus the total odds of a string in the stuffed bit string of $N_{flag}$ bits that have $N_{flag}-1$ bits matching the flag are:

$$P(Nflag - 1 \text{ matches after stuffing in } Nflag \text{ bits}) = \quad \text{Equation 38}$$

$$\frac{N_{flag}+1}{2^{N_{flag}}}$$

Thus, the total mean number of strings in a long string of $C_L$ (command length including parameters and data) bits that could be changed to the flag by a single bit error is:

$$S_1 = \frac{C_L}{N_{flag}} \frac{N_{flag}+1}{2^{N_{flag}}} \approx \frac{C_L}{2^{N_{flag}}} \quad \text{Equation 39}$$

For each of the S1 strings that are one bit off, a bit error in the single different bit could change the string to match the flag. The single bit error probability is $P_e$. The total probability of a particular False Command Response (without CRC protection and for a particular command) is the probability of getting the command wrong times $S_1$ (off by one strings) times the probability of for each "one off" string of getting all the matching bits right but also getting a bit error in the single different bit, and then times the probability of getting the particular (non-CRC protected) command code, and is therefore given by:

$$P_{pcfr}(C_{LE}) = \left(1 - (1-P_e)^{N_{flag}+C_{CL}+E_d}\right). \quad \text{Equation 40}$$

$$\frac{C_L}{N_{flag}} \frac{N_{flag}+1}{2^{N_{flag}}} \cdot (1-P_e)^{N_{flag}-1} \cdot P_e 2^{-C_{LE}}$$

This approximation is valid so long as the error rate is low enough that the rate of "one off" strings being turned into complete matches is much greater than the rate of "two off" strings being turned into matches. The error rate could also be lower if the flag and command were correctly received but there was an error in the length received. In that case this equation gives an upper bound on error instead of actual error. The variable $C_L$ is the total command length, and $C_{LE}$ is the essential bits needed in random data following a false flag to successfully counterfeit a command. The worst case $C_{LE}$ is 4, for the QueryRep command of ISO/IEC 18000-6C.

This probability may now be examined using Equation 40 for the worst case in practice of a Select command emulating a QueryRep, which has parameters as follows.

Select Command Code: 1010, 4 bits

QueryRep Command Code: 00XX

Select Command Maximum Size: Theoretically unlimited due to unlimited EBV pointer, but a practical limit of 308 bits when the address uses 2 bytes, and the length is set to 255

Figure 17:
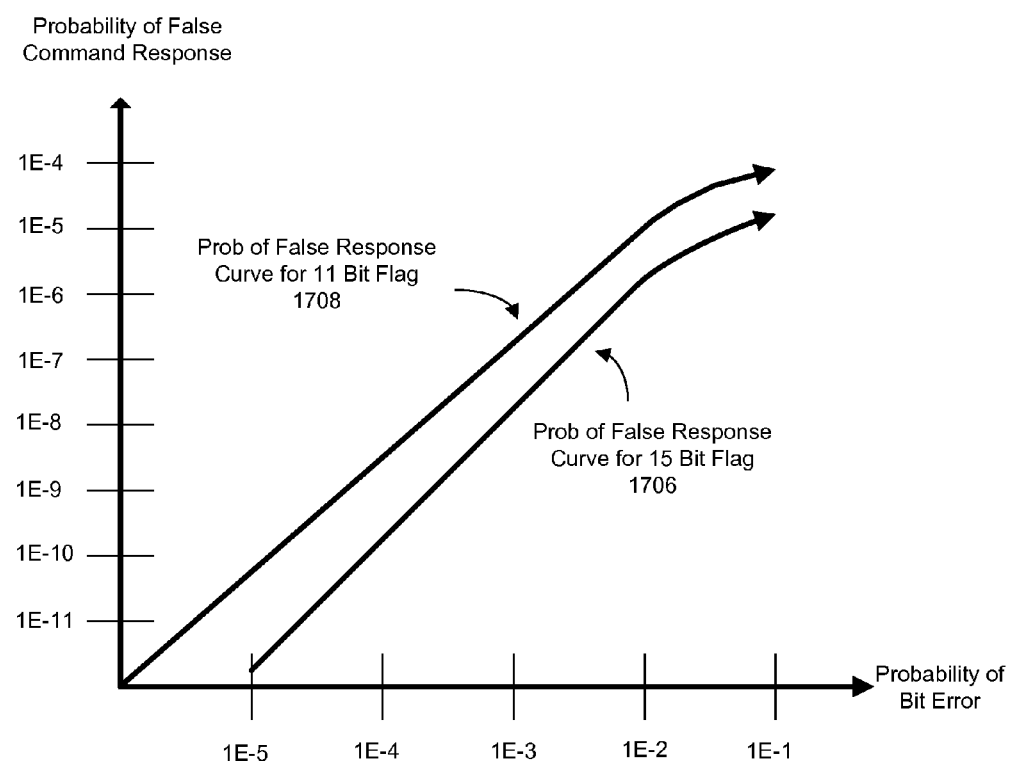
FIG. 17 shows exemplary curves of False Command Response due to bit errors when the stuffed data stream suffers a bit error that causes an accidental PN flag to be seen at the tag.

FIG. 17 depicts the resulting False Command Response vs. Bit Error Rate (BER) for 15 bit NRZ flag 1706 and 11 bit NRZ flag 1708. From this figure, it is noted that flags of length 15 will keep False Command Response below 1E-6 almost to BER of 1E-2. An 11 bit flag only holds 1E-6 False Command Response up to about 2E-3.

K. PN Flag False Command Response on Noise

Embodiments of the invention may also be applied to a Manchester case (where the PN flagging is currently drafted into ISO/IEC 18000-6C) of a highly sensitive receiver under weak signal conditions that is in normal mode and can "toggle on noise" in the absence of any reader signal. This could occur when all nearby readers are temporarily silent, such as in a time coordinated system where readers are systematically controlled to prevent reader-on-reader interference. Let:

$N_{flag}$=NRZ length of the flag $C_{LE}$=Number of essential command bits that must match for an accidental response (4 for QueryRep)

$M_{FFS}$=Mean False Flags per Second $D_R$=Data rate $P_{pcs}$( )=Probability of a false Particular Command per Second on noise toggling Then, $$M_{FFs} = 2^{-2N_{flag}} WordRate = 2^{-2N_{flag}} \frac{D_R}{N_{flag}} \quad \text{Equation 41}$$

$$P_{pcs}(\text{Particular Command's } C_{LE}) = \quad \text{Equation 42}$$

$$M_{FFs} 2^{-2C_{LE}} = \frac{D_R}{N_{flag}} 2^{-2(N_{flag}+C_{LE})}$$

Now the worst case of the unprotected QueryRep command with $C_{LE}=4$, data rate=8 kbps, and $N_{flag}=15$, and we find $P_{pcs}(\text{QueryRep})=1.94\text{E-}9$. Thus, very high protection of False Command Response is provided in the noise toggling case. This is a result of the effective doubling of the number of flag and command bits by the Manchester coding.

L. Battery Life Considerations in PN Flag Length Selection.

In certain embodiments of the invention, a flag length of 15 bits (NRZ) may also meet battery life requirements. In the case of very low current hibernate mode tags, improving and/or maximizing the battery life is an important criterion that drives the PN sequence length up to 15 bits.

Battery life degradation due to false flags is very difficult to avoid (if a partial wake-up on received activation flag is assumed), but the effects can be significantly reduced.

Negligible density of false wake ups may be defined as those causing 1% or less reduction in battery life, though the below mathematics may be applied to other accepted battery life reductions. The effect is even less in the case of higher hibernate powers used to attain better receiver sensitivity. In certain instances, tags can wake up or partially wake up after a flag match, such as those tags that need "warning" in order to get a head start on powering up tag systems. Those that require a full activation mask match for wake up suffer a lower rate of false wake up, and those that check the Activation CRC-16 before any wake-up suffer a still lower rate of false wake-up.

The cases are examined of real data and of a tag receiver that is "toggling on noise", or operating at the noise threshold without "squelch" for maximum sensitivity. In these cases, a problematic scenario is when the tag is receiving a low strength but deterministic signal from a reader, and accidentally encounters a flag in data through an error that defeats the stuffing. In this case, a flag length of 15 bits is preferable to keep battery life penalty below 1%.

First the following variable definitions are made:

$F_w$=Fraction of battery life wasted by false activations
$R_{Aon}$=Rate of accidental wake-ups (on) per second. One of these applies to accidental wake-ups from data transmitted at 8 kbps, and another from noise
$I_{hib}$=Current draw during hibernate
$I_{on}$=Current draw during temporary wake-up. In certain instances, a tag may not wake up unless there is a full mask match, and others unless there is a full mask match and a CRC-16, and these do not suffer a noticeable false wake up.
$T_{Aon}$=Time Accidentally awoken tag is on before detecting accident and going back to sleep
$D_R$=Forward Data Rate
$B_{DF}$=Bits to Detect Failure (accidental wake-up, conservatively 30, but perhaps as many as 168 if not detected until CRC-16 at end of activation is checked)
$N_{flag}$=PN sequence flag length in NRZ bits
BLAF=Battery Life Acceptability Factor The fraction of battery life wasted will be selected as a design parameter. Then, we may write by inspection that:

$$F_w = \frac{AvgWaste}{Draw} = \frac{I_{on}T_{Aon}R_{Aon}}{I_{hib}} \quad \text{Equation 43}$$

Equation 43 may be rearranged as an inequality to depict minimum Nflag as a function of fraction wasted $F_w$:

$$\frac{F_w I_{hib}}{I_{on} T_{Aon} R_{Aon}} = BALF \geq 1 \quad \text{Equation 44}$$

Equation 44 is interpreted to mean that if the quantity Battery Life Acceptability Factor (BALF) is greater than 1, then the parameter set has resulted in battery life fraction Fw of less than the chosen amount.

It may be noted that:

$$T_{Aon} = \frac{B_{DF}}{D_R} \quad \text{Equation 45}$$

$$\frac{F_w I_{hib} D_R}{I_{on} B_{DF} R_{Aon}} \geq 1 \quad \text{Equation 46}$$

From this point the analysis diverges into the two cases of wake-ups from reader data and wake-ups from a wide open tag receiver toggling on noise.

1. Case 1: Accidental Wake-Up Due to Deliberately Transmitted Data.

In certain embodiments of this invention, partial or entire correlation of the Activation and Frame Synchronization flag portion of the preamble is used to allow an early start to tag power-up sequencing, instead of waiting until the full Activation command is correctly received and decoded. This can reduce delay time before the tag is ready to begin normal mode operations. For example, it can take milliseconds to tens of milliseconds to power up a crystal oscillator and/or phase locked loop synthesizer for a Class 3 Plus or Class 4 tag, or to power up and lock a clock synthesizer for a microcontroller clock for a Class 3 tag. Accordingly, the PN sequence Activation Flag is designed so that this optional early start on power-up sequencing does not accidentally happen often enough to noticeably degrade battery life.

An analysis of this case makes use of the earlier development of the statistics under which the bit stuffed channel can by way of errors in the channel still cause an accidental start to wake-up. The channel will be stuffed such that in an error free channel the wake-up flag does not occur. However, in the presence of errors, the stuffed strings of length $N_{flag}$ (which are off from a full match by one bit), and the other strings of length $N_{flag}$ that happen to be off from a full match by one bit, can suffer a bit error that creates the flag. If the tag begins its wake up process at that time (to power up sub-systems) instead of waiting for the mask and the Activation CRC, then the tag can for some period of time waste power before it detects a false wake-up and goes back to sleep. In this case, $R_{Aon}$ (false flags per second) is given by the FlagRate×FalseFlagOdds, which is given by:

$$R_{Aon} = \frac{D_R}{N_{flag}} (1 - P_e)^{N_{flag}-1} P_e \frac{N_{flag}+1}{2^{N_{flag}}} \quad \text{Equation 47}$$

Now substituting into Equation 46:

$$\frac{F_w I_{hib} N_{flag} 2^{N_{flag}}}{I_{on} B_{DF} (1-P_e)^{N_{flag}-1} P_e (N_{flag}+1)} = BALF \geq 1 \quad \text{Equation 48}$$

Equation 48 is a test of sufficient length for $N_{flag}$ to meet the desired battery fraction wasted $F_w$. Now we may examine particular cases of moderate sensitivity receivers of −40 dBm with hibernate current of 100 nA with a long interval of 168 bits to determine that a false flag occurred (worst case of full Activation command), and high sensitivity receivers of −55 dBm with hibernate currents of 2 μA and a quicker $B_{DF}$ of 30 bits to detect a false flag. Variable parameters are defined as follows:

$I_{hib}$=2 μA and 100 nA
$F_w$=0.01 (1% reduction in battery life)
$I_{on}$=25 μA (from wake-up to detection of false wake up)
$B_{DF}$=30 bits (time in bits to detect false wake up) for 2 μA case and 168 bits for the 100 nA case
BER=0.01 (right at fringe of receiver sensitivity)

Figure 18:
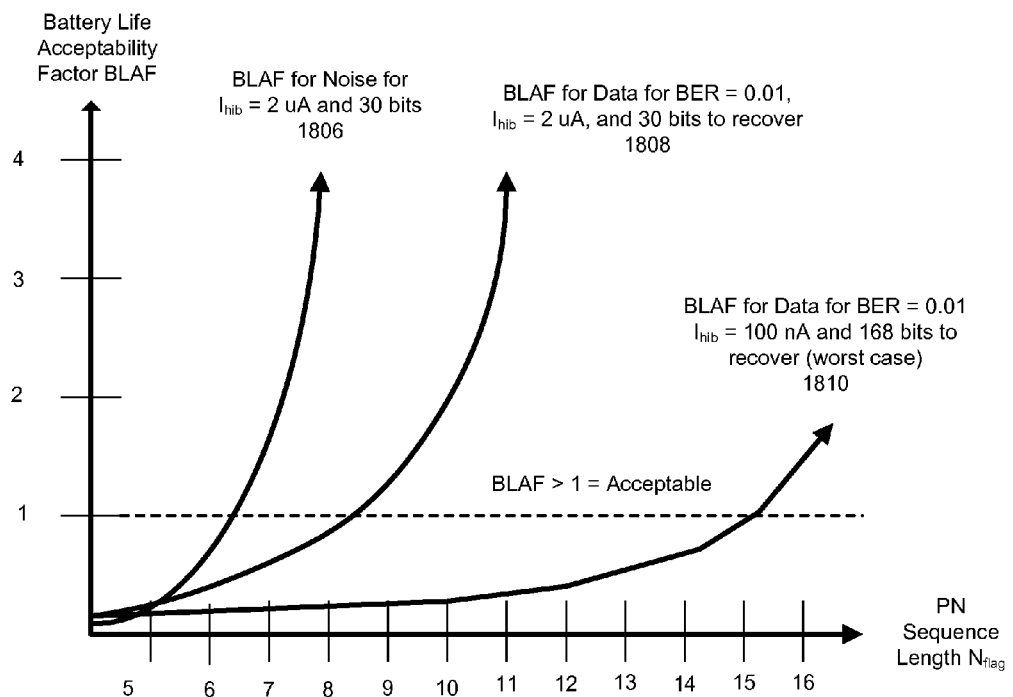
FIG. 18 shows curves of Battery Life Acceptability Factor ("BLAF") that indicate where PN sequence design acceptably achieves false wake up rates that dissipate less than 1% of tag battery life according to various embodiments of the invention.

Referring now to FIG. 18, BLAF curve 1808 shows the 2 μA case. The curve crosses the acceptable line of BALF>1 at $N_{flag}$ between 6 and 7 bits. BLAF curve 1810 for 100 nA does not cross into acceptability until right at 15 bits, hence is a strong reason to design and standardize $N_{flag}$ at 15 bits.

2. Case 2: Accidental Wake-Up when Toggling on Noise. By inspection, $$R_{Aon} = (FlagRate)(\text{Random Flag Probability}) = \quad \text{Equation 49}$$

$$\frac{D_R}{N_{flag}} 2^{-2N_{flag}} = \frac{D_R}{N_{flag} 2^{2N_{flag}}}$$

Note that because $N_{flag}$ is in NRZ format, there are two trials per NRZ bit to get a random matching Manchester bit, hence the factor of 2 on $N_{flag}$.

Substituting this relation into the basic equation for $F_w$ (Equation 43):

$$F_w = \quad \text{Equation 50}$$

$$\frac{I_{on} T_{Aon} R_{Aon}}{I_{hib}} = \frac{I_{on}}{I_{hib}} \frac{B_{DF}}{D_R} \frac{D_R}{N_{flag} 2^{2N_{flag}}} = \frac{I_{on}}{I_{hib}} \frac{B_{DF}}{N_{flag} 2^{2N_{flag}}}$$

This equation may be rearranged as an inequality to use as an indicator of acceptable length for $N_{flag}$ for negligible false wake-ups. When the below inequality exceeds 1.0, then the flag is of acceptable length.

$$N_{flag} 2^{2N_{flag}} \frac{I_{hib} F_w}{I_{on} B_{DF}} = BALF \geq 1 \quad \text{Equation 51}$$

Now we may examine a particular cases of a high sensitivity receivers of −55 dBm with hibernate currents of 2 μA. Parameters assumed are:

$I_{hib}$=2 μA (case 1) and 100 nA (case 2)
$F_w$=0.01 (1% reduction in battery life)
$I_{on}$=25 μA (from wake-up to detection of false wake up)
$B_{DF}$=30 bits (time in bits to detect false wake up)

This result is graphed in FIG. 18, BLAF curve 1806, which satisfies the practical cases examined, needing only $N_{flag}$ of 7 to satisfy the 1% battery life reduction criterion. Thus, the worst case found was for the 100 nA ultra-low receiver current case with false flags on real data, leading to a worst case $N_{flag}$ requirement of 15 (curve 1810).

M. Extensible Command Structure and Interference Control

Interference control and future expandability are oftentimes important requirements of a wireless system. For example, most dense wireless systems such as cellular telephony are so troubled by interference that they are referred to as "interference limited" systems. Attaining acceptable functionality in such systems often revolves around interference controlling system design. Unfortunately, RFID systems have not historically been designed for effective interference control. Their self-interference is fundamentally only acceptable because of the limited sensitivity at both ends of the link.

The sensitivities disclosed herein thus lead to higher propensity for interference that may be dealt with through deliberate system design. For example, the passive state machine behavior and command responses of standardized Class 1 RFID systems in the EPCglobal™ Gen 2 Class 1 standard version 1.2.0, which are carried over into ISO/IEC 18000-6C, were designed assuming a much less sensitive tag than Advanced PIE and Manchester allow. This can lead to certain non-ideal behaviors for battery systems, such as the sensitive tags responding to any "Select" command (the command that pre-selects tags by attribute for inclusion in a subsequent operation called a Query round where they may be singulated for individual access) they receive from an "enemy reader" by departing the state their associated reader desires them to be in and going back to the starting or "Ready" state.

To reduce the incidence of such undesired interference, Advanced PIE and Manchester tags may provide an interference rejecting feature(s) of optionally not responding to commands with embedded Session flag unless those sessions match the session to which they were activated. (This state is referred to herein as "Interference Rejection On") This feature is further strengthened by the use of tag-to-reader locking whereby the tag receives an 8 bit reader ID code that even more reliably identifies a tag's associated reader.

The reader may at its option activate the tag without Session Locking, also called "Promiscuous Mode". "Promiscuous Mode" is typically only used in environments where there are low odds of interference from "enemy" readers (which under some circumstances is any reader other than the activating reader). Additionally, dense wireless systems usually use transmit power level control to limit transmitted power to no more than that required to effectively conduct desired communications. Power leveling may be advantageously added to RFID systems according to various embodiments of the invention by the preferred use of new command set improvements and other features that enable this capability and which are described herein.

RFID and wireless systems oftentimes grow over time and may need to adapt to changes in technologies and standards. In the RFID case, a particular growth opportunity is for higher performance battery assisted tags. In accordance with various embodiments of the invention, command and feature sets are provided that facilitate this growth within an RFID system and allow scalability across different RFID standards, technologies and devices.

In certain embodiments of the invention, a command structure is provided that extends upon prior art passive RFID methods (such as those depicted within EPCglobal™ Gen 2 version 1.2.0 and ISO/IEC 18000-6C standards) to allow for much improved operation using battery assisted tags. Examples of such improvement include:

"Tag-to-reader locking" where the tag responds only to the reader which awakened or "activated" it from a low power "hibernate" mode, thus improving interference rejection Other features built into the command set and tag state machine response to provide interference rejection, such as "session locking". Previous Class 1 oriented RFID system design assumed a "promiscuous" tag that responded freely to all reader commands it heard, with very limited protection from false responses. According to this disclosure, much more sensitive tags using this promiscuous mode will commonly mistakenly respond to commands from enemy readers.

Programmable sensitivity upon activation and deactivation

Activation selectable as to type of tag (Class 3, Class 3 Plus, Class 4, tags with sensors, etc), and activation extendable to control active tag features Reuse of session flags as timer flags in power leveling, and reader programmable precision timers on the tags for optimum power leveling control Additional command set features to support power leveling, such as reader reporting to tag any offset between forward and reverse reader carrier power (for Class 3 power leveling), or directly reporting reader forward power (for Class 3 Plus and Class 4 power leveling)

Combining "Select" for choosing tags to enter a query round (tag singulation and access operation) and "Query" (to actually enter a query round) command functions into a single command for faster operation. This may be particularly important for quickly pulling high value tags such as sensor tags into a query round, such that these high value tags get priority.

As battery tags can be quite sophisticated and have a large range of features, providing reader awareness of tag capabilities though on-tag "Capabilities Files" and control of these features through on-tag "Setting Files". For example, programmable duty cycle may control tag normal and hibernate mode receiver duty cycles.

Providing a directory system on the tag (Tag Capabilities and Reporting System Map, or TCRS) for accessing capabilities and settings files efficiently, with the minimum number of reads in the hostile radio environment, and for growth over time of the TCRS system FIG. 19 illustrates an exemplary Activation command structure for Semi-Passive Class 3 tags according to various embodiments of the invention. The fields shown within the command structure may vary in length and type as dictated by its Extension Flag 1914. The structure may comprise a preamble 1900, for example one based on PN sequences as discussed earlier such as FIG. 13. The Activation Control field 1902 allows the reader to command post-activation forward data rate and is extended to also include programming of post activation tag sensitivity according to certain embodiments of the invention. This Activation Control field is further detailed in FIG. 22.

A Target field 1904 (see FIG. 24) identifies tag flag states upon which activation may be made selective. But, in contrast with prior art, the target field may also include a sub-field specifying category or categories of tags to be activated, such as Class 3, Class 3 Plus, Class 4, tags with sensors, combinations thereof, and additional future options. Prior art has previously included a "Mask" field 1910 that is to be compared against memory or register contents on the tag, which is referred to as the "Activation Code" AC within ISO/IEC 18000-6C. When other requirement of the activation are met, such as required tag class, then a match between Activation Code on the tag and Mask as sent in the Activation command authorizes the tag to awaken. The prior art Mask Length field 1906, Address/Offset field 1908, and Mask field 1910 are used to precisely bit align the transmitted Mask with the desired portion of the prior art Activation Code stored on the tag. Only tags that have a perfect Mask to partial or full AC match will activate.

A "Reader/Interrogator Information" field 1912 (see FIG. 23 for full expansion) may also be integrated within an Activation command structure. This Reader Info field 1912 may be used to enable the tag-to-reader locking feature that prevents BATs activated by one reader from acting upon other commands of other readers. It provides the Interrogator ID needed by the tag to associate with future reader commands, a bit to control whether Tag-to-Reader Locking is to be in effect, and a Regulatory Region field that informs the tag of the geographic region of operation. Extension Flag field 1914 informs the tag if there is more information to follow, such as a Class 3 Plus Active Transmit Set Up field, or if the Activation command is about to terminate. The command ends with CRC 1916 which may optionally be used by tag to confirm almost certain perfection in the received Activation command.

The activation and other commands may also be expanded for the more advanced tags, taking advantage of the Extension flag. Examples include extensions to command active transmit and receive channels.

FIG. 20 illustrates an exemplary Activation command structure for Semi-Active Class 3 Plus tags according to various embodiments of the invention. This command structure is similar to the Class 3 Activation command of FIG. 19 and may also wake up Class 3 tags in parallel with Class 3 Plus, depending upon setting in the Target field of FIG. 24. In the case that the reader is sending this expanded Activation command, the first Extension Flag 2014 is set and is followed by Active Tx Set up field 2016 (further described in FIG. 25). This active transmitter set up field is followed by second Extension Flag 2018 which is not set since the command does not include Class 4 Active Rx Set Up Information. The command ends with the CRC 2020.

FIG. 21 illustrates an exemplary Activation command structure for Fully-Active Class 4 tags. This command structure is similar to the Class 3 Plus Activation command of FIG. 20, except with more information appended. It may also wake up Class 3 and Class 3 Plus tags in parallel with Class 4 tags, depending upon setting in the Target field of FIG. 24. In the case that the reader is sending this further expanded Activation command, the first Extension Flag 2114 is set and is followed by Active Tx Set up field 2116 (further described in FIG. 25). This active transmitter set up field is followed by second Extension Flag 2118 which is now set since the command does include the following Class 4 Active Rx Set Up field 2120 (further described in FIG. 26). The command ends with the "cyclic redundancy check" or CRC 2122, which provides a high reliability error check at the tag that the command was correctly received.

FIG. 22 expands the Reader Activation Control field of the various Activation commands. Reserved for Future Use (RFU) field 2202 allows for future change. Activation Version field 2204 allows for selecting the Long Activation command of FIG. 19 or a Short Activation command (not shown). Data Rate field 2206 allows for informing the tag of what reader transmitted forward data rate will be used following activation. Sensitivity field 2208 allows for programming the tag sensitivity to be used in normal mode. This field would most commonly be used to program high sensitivity, but in higher interference environments may be used to program low sensitivity and thus prevent the tag from responding to or being as badly interfered with by more distant readers. However, one skilled in the art will recognize that this field may be used for numerous different command features. The field ends with additional RFU bits 2210.

FIG. 23 illustrates an exemplary expanded reader information field for Activation commands according to various embodiments of the invention. This reader information field contains information to be used to enable the tag-to-reader locking feature to prevent BATs activated by one reader from acting upon other readers' commands. In certain specific examples, this field includes Reader ID field 2302 with an 8 bit "Short Reader ID," allows a combination of up to 256 reader ID codes.

Reader Lock field 2304 informs the tag of whether or not to apply tag-to-reader locking. For example, this functionality may not be desired in certain situations such as if the tag is to be deliberately accessed by multiple readers in normal mode. When tag-to-reader locking is enabled, readers append their IDs in a field to normal mode commands so that BATs may only respond to commands from the particular reader which activated the corresponding BAT. This behavior is important in the case of the high sensitivity tags disclosed herein in order to limit undesired tag responses. Accordingly, a reader may adjust its transmitted power to a high power level to reach a desired distant locked tag while still maintaining a low probability of disrupting other tags that have been engaged by other readers.

In various embodiments of the invention, this expanded reader information field may be integrated within the Activation command structures shown in FIGS. 19, 20, 21, and 30. FIG. 23 also contains a Region field 2306 which may inform the tag of geographic region or regulatory region of operation. Different areas of the world have different radio regulatory requirements, and the tag may use the Region field information advantageously to adapt its operation. For example, it may adjust front end RF filtering to optimize to the band in use in a certain region, or observe limits on its transmit frequency and maximum transmit power that are in keeping with local regulations.

FIG. 24 illustrates an expanded Target field of the Activation commands that enables the applicant invented feature of selective BAT activation according to tag class 2402. The reader also typically awakens tags according to the state of a particular Session flag 2404. In certain embodiments, the normal Session flag states are re-used as time-out indication states while hibernating, for use in controlling power leveling. As will be discussed in more detail later, closer range tags that have been accessed at a lower reader transmit power level are put back to hibernate with a timer running, and its running state is indicated in hibernate mode by the Inventory Flag being in symbolic logic state "B". This state is indicated in Inventory flag Target field 2408, and may be mapped to either electrical logic state. While this timer flag is in state B, normal power leveling operation is for the reader to wake up new tags that have not been accessed by waking then up selectively using state A of the Inventory flag. Thus, according to the invention the utility of the Inventory flag has been expanded from the normal mode to a key functionality needed in the hibernate mode.

When in normal mode, the Inventory (or Session) flags indicate if a tag has recently been accessed. When in hibernate mode, the Inventory flag indicates if the tag was recently activated and accessed, with the definition of "recently" being defined at least partially relative to the timer programming according to various embodiments of the invention. If the reader wishes to wake up tags regardless of timer state, it may set Inventory Flag Use field 2406 to "Don't Care". This may be done, for example, when the reader has taken too long to complete a power leveling "mini-round" and some earlier tags that were hibernating with timers running have timed-out and reset their inventory flags to state A, while others are in state B.

The reader may wake up a group of tags or all of the tags within a system using a Don't Care in Inventory flag state in order to reprogram or "refresh" their hibernate timers. Stateful Hibernate Timeout field 2410 provides a 4 bit programmable time value up to 4096 seconds. The timer accuracy may be specified to various values or ranges, such as being at least +/−20% over the nominal temperature range of −25° C. to +40° C., but it is typically much more accurate. In certain instances, the precision of this timer may be critical to reliable power level operations, as it provides the reader with a guaranteed time interval during which recently accessed tags will not respond. This allows the reader to reserve its higher transmit powers for a small number of more distant tags that may be quickly accessed, greatly reducing the time that the reader uses high power, and thus greatly reducing interference.

Embodiments of the invention also provide for the use of "Session Locking" (also called "Interference Resistance Mode") whereby the tag limits its responses to commands featuring session flags that match the session flag it was activated to. In particular this includes the EPCglobal™ Select command and its overpowering effect on passive tag state machine operation. In certain embodiments, this feature is specified during activation by the Inventory Flag Use field 2406 of FIG. 24. If this field is set to "Do Care" then the tag not only selectively activates upon the state of the timer controlled Session flag state in hibernate mode, but also alters its post-activation Class 1 state machine behavior to reject commands that would undesirably alter its state by observing "Session Locking". This double use of the Inventory Flag Use field was chosen by the ISO 18000-6C committee over the proposed method of a more flexible separate one bit "Interference Resistance Flag" or IRF to command the proposed preferred embodiment of "Session Locking" because it could accomplish most of the primary mission of improved interference resistance and save a bit in the Activation command.

When in the "Session Locking" mode the tag shall obey Select command flag programming and state machine changes only if the Session of the Select command as specified in its "Target" field matches that of the Activation Session. Unlike promiscuous Class 1 tag behavior, the Class 3 tag with Session Locking ON shall only return to the Ready state in response to Select commands where the Select command session matches that of the Activation Session. Non-matching Select commands are ignored. Furthermore, for the preferred embodiment of tag-to-reader locking in effect, the still stronger interference resistance is incorporated of the tag only responding to commands if the Short Reader ID field of the command matches that provided by the last Activation command.

FIG. 25 shows an exemplary Active Tx Set Up field used for Class 3 Plus and Class 4 tags to control the frequency, power, data rate, and optionally modulation mode of their active transmitters according to various embodiments of the invention. Class 3 Plus tags are preferably also able to operate in backscatter transmit mode, thus preserving their active transmit operation for situations where it is required, thus improving battery life. The Base Mode field 2500 indicates if the tag is to use its backscatter transmitter, or its active transmitter, and if active, over a low or optionally high power range. New Channel field 2502 is a bit field indicating desired carrier frequency in incremental steps. For example, the New Channel Field 2502 may provide incremental steps of 25 kHz and cover a range of 204.8 MHz, which allows coverage of all known planned RFID bands. Auto Power Level field 2504 instructs the tag as to whether it should use only the transmit power level commanded by the reader, or calculate its own transmit power level based on its own measurement of link loss. Transmit Power fields 2506 and 2508 are obeyed by the tag if Auto Power Level field is set to "No." Data Rate field 2510 is used for the reader to command the tag reverse active data rate. Modulation Mode field 2512 is used to command the tag's return modulation mode, if the tag supports more than one modulation mode.

FIG. 26 shows an exemplary Active Rx Set Up field used for programming Class 4 tags according to various embodiments of the invention. Such tags would normally also support Class 3 and Class 3 Plus modes of operation, with full active transceiver operation being a part time option used only as needed. When the active receive mode is used, it may advantageously be duty cycled in order to minimize average power consumption. Receiver OFF Time field 2600 is used to program the time period the active receiver is off, and Receiver ON time field 2602 to program the time the active receiver is on. When the active receiver is off, the tag has the option of using a low power Class 3 square law receiver. New channel field 2604 sets the receiver listening frequency.

Unlike a square law RFID receiver with broad selectivity limited by its wide band front end RF filter, the optional active receiver can have a very narrow bandwidth generated at baseband (direct conversion receiver) or at an intermediate frequency (superheterodyne receiver) that is highly efficient at rejecting interference from all transmitters not directly on the desired channel. Data Rate field 2606 commands post activation receive data rate. Modulation Mode field 2608 commands post activation receive modulation mode, if the receiver supports multiple modes.

FIG. 27 illustrates an exemplary reader command called "Query Rep" with the option of transmitting the "short reader ID" field in case tag-to-reader locking is in effect for the particular round according to various embodiments of the invention. In certain embodiments of the invention, the reader locking feature may be set at the time of activation for eliminating the possibility of BATs acting upon other reader's commands. Tags that are not otherwise locked to the reader by a particular agreed authentication feature, such as an exchanged random number key, may make advantageous use of the Short Reader ID code 2706 as a way of authenticating the reader command and avoiding undesirable response to other readers. To avoid tags accidentally being activated and locking to an undesired reader, readers may advantageously employ time coordination, directional antennas, and power leveling. Judicious use of power leveling, whereby readers use low power to access nearby tags, is an effective way to "zone" tags so that they strongly tend to be accessed by the desired (normally closest) reader.

FIG. 28 illustrates the Manchester mode Next command according to various embodiments of the invention. This command comprises a Hibernate Sensitivity Control field 2804 to set the tag's hibernate sensitivity to a modest sensitivity state or a high sensitivity state. These two sensitivity states may be advantageously combined with two or more dynamic range states in a high sensitivity square law tag receiver as described herein. This command puts single tags back to sleep using the 16 bit random number RN16 generated by the tag and communicated previously to the reader as an authentication step. Because the tag authenticates the reader command this way, this command does not need to employ tag-to-reader locking via the Short Reader ID code.

FIG. 29 illustrates the Manchester Deactivate_BAT command according to various embodiments of the invention. The purpose of the Deactivate_BAT command is to send groups of tags back to hibernation. Since it is group command, according to embodiments of the invention, it includes a Short Reader ID code in field 2916 in order to allow tag-to-reader locking. It also may include Hibernate Sensitivity field 2914 similarly to the improved Next command. Override field 2912 is another improvement, and allows sending all tags back to hibernate regardless of session. This allows a reader, when deliberately intended, to take rapid control and return all tags to a known state.

Figure 31:
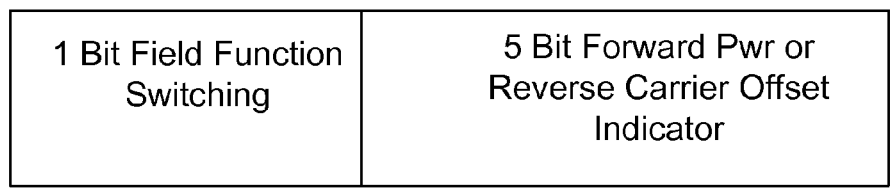
FIG. 31 is an exemplary expansion of the reader power information field of FIG. 29 according to various embodiments of the invention.

FIG. 30 shows the Class 3 Activation Command extended to provide a Power Information field 3014 for enhanced RF power control operations according to various embodiments of the invention. An exemplary Power Information field is shown in FIG. 31. In this particular expansion a single bit 3102 is included as a switch to indicate to the tag if the following 5 bit field 3104 represents current reader forward power or the change the reader will introduce in its carrier power between forward and reverse modes. The switching of field function allows a more flexible command.

The reason for introducing an offset in reader transmitted forward link and reverse link power as a preferred embodiment of this invention is the asymmetric Class 3 link physics as discussed earlier and shown in FIGS. 2 and 3. As illustrated in FIG. 3, over typical Class 3 ranges of a few meters to a few tens of meters, forward link power may typically be from 10 to 40 dB less than reverse link power while still maintaining a matched link condition. This physical fact leads to the advantageous use of more carrier power in reverse mode than forward mode, which causes much less reader on reader interference since the reverse carrier is very spectrally pure and does not cause interference to readers listening on other channels. But, if this advantageous behavior is used, the tag may need to know the offset between forward and reverse power in order to adapt its backscatter power for both interference control and regulatory compliance reasons. Because the tag can measure forward power, if it is told the reverse power offset from forward power, it may then easily calculate reverse carrier power as seen at the tag, and use this information to control its backscatter. Alternatively, the 5 bit field 3104 may directly indicate the forward power to be used, as specified by function switching bit 3102. This allows the tag to calculate the path loss from its measurement of forward power as received at the tag. If the reader then uses either no offset from forward power, or an offset known to the tag from other methods, then the tag intelligently adjusts its backscatter from this information also.

Figure 32:
FIG. 32 is an exemplary expansion of a reader power information field that may be used in the case of Class 3 Plus and Class 4 tags according to various embodiments of the invention.

FIG. 32 is an exemplary expansion of a reader power information field that may be used in the case of Class 3 Plus and Class 4 tags for a power leveling enhanced Activation Command similar to FIG. 30, but extended to Class 3 Plus and Class 4. In the case of the Class 3 Plus and Class 4 system, there is no reader reverse mode carrier, and instead control is applied to the active carrier generated by the tag. In this case there are two 5 bit fields, one to indicate forward reader power and one to indicate desired reverse power, or reverse power change from an assumed nominal tag transmit power, or reverse power as desired to be seen in the reader receiver. Functional switching fields may be added to this field to allow all these options. This field could also be simplified down to be only the reverse mode active carrier information, if the Power Information field of FIG. 30 were also included in an Activation Command with improved power leveling capability that covered Class 3, Class 3 Plus, and Class 4.

FIG. 33 shows the new Flex_Query command according to various embodiments of the invention. This command corrects a situation in which previously required separate Select and Query commands are required in order to selectively bring different categories of tags (such as ID only tags and sensor enabled tags) into interrogation/query rounds. In passive systems in particular this is problematic, as the low sensitivity of passive tags lead to tags in motion only having brief windows of time in which they can be accessed. This new command allows faster access while still maintaining the ability to selectively bring tags into Query rounds based on their basic types and attributes. This is referred to herein as a "mini-select" function, as compared to a full featured separate "Select."

The types of tags are selected in the Tag Type Select field, which is detailed in FIG. 34 according to various embodiments of the invention. The 12 bits of this field allow selection of any combination of Passive Class 1 and 2, Semi-Passive Class 3, Semi-Active Class 3 Plus, several variation of Class 4 (such as simpler Class 4 that do not feature tag-to-tag networking, and more advanced Class 4 that may feature tag-to-tag networking), several types of sensors including so called Simple and Full Function sensors, tags with sensors that have experienced an alarm condition (such as temperature out of range), and RFU bits for future expansion.

Certain embodiments of the invention provide the Flex_Query an ability to control Simple Sensor entry into interrogation/query rounds and also control of Simple Sensor response. "Simple Sensors" are defined as sensors with a set of preprogrammed behaviors that generate a small amount of sensor data (for example, a notification that a temperature sensing tag has been exposed to temperature limit outside its preprogrammed range) and that were originally intended to automatically transmit that data in addition to their identifying data when the tag was properly singulated. Simple Sensors automatic response allows their data to be read by the reader without taking the time to choose Simple Sensor tags via the "Select" command for inclusion in a query round. Taking such time, particularly in the case of tags with less than excellent sensitivity, leads to a statistical increase in the tag read failure rate. But, having Simple Sensors always transmitting their data, in case of many Simple Sensor tags mixed with a population of tags without Simple Sensors, would noticeably slow the singulation process, also statistically leading to an increase in the number of missed tags that were not properly singulated and read.

Embodiments of the invention build the "mini-select" functionality described above into a specialized query command that could then choose whether or not Simple Sensor commands would enter the query round, and also whether their automatic response function would be in effect for the particular query round.

In further embodiments of the invention, a system is provided of Tag Capabilities Reporting and Setting (TCRS) for reporting and controlling capabilities of advanced tags. Battery tags can be very sophisticated wireless terminals with many options, and the TCRS system provides a convenient and adaptable means for the tag to report its possibly complex capabilities, and for the interrogator to command behavioral modes. An option under TCRS is to allow interrogator control of duty cycle to optimize battery power and tag latency of response.

Among capabilities to report, there are numerous possible combinations of Simple PIE, Advanced PIE, Manchester, Dead Battery Response (where the Class 3 tag with a dead battery can act as a passive tag), and Passive Fall Back (where the tag with Class 3 receiver completely off can use a passive receiver) that may be relevant. There is also a wide range of tag sensitivities that can exist and which may be provided to the reader for system control, from approximately −80 dBm (sensitive square law receiver plus RF low noise amplifier) to approximately −15 dBm for passive tags or passive mode receiving on a BAT.

The TCRS system may use Capabilities Files and Setting Files in tag memory, where the detailed file definitions are linked to a Version Code.

Figure 35:
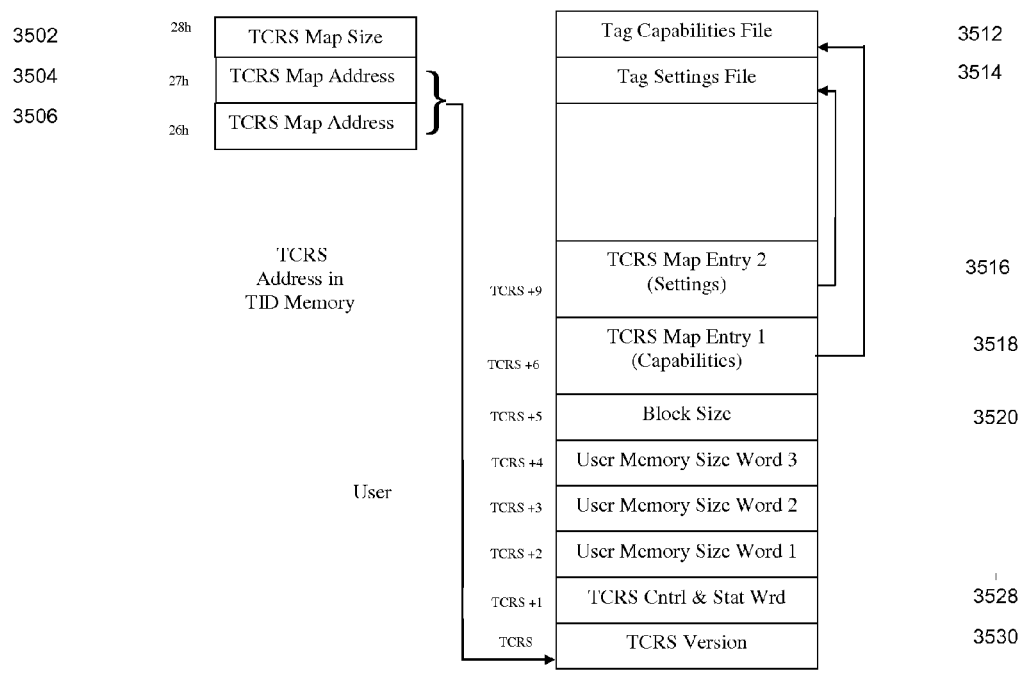
FIG. 35 illustrates a system that allows for a wide range of tag capabilities to be reported by the tag to the reader, and for the reader to in turn select operating modes through tag settings according to various embodiments of the invention.

FIG. 35 illustrates the memory structure of an initial Tag Capabilities and Reporting system according to various embodiments of the invention. This constitutes a simple but effective file system for managing this information. An initial pointer to the TCRS Map (directory), here TCRS Map Address 3504 and 3506, is placed in a known memory location where it is not subject to being written over, such a standardized location in Tag ID or TID memory. In addition to this address pointer, a TCRS Map Size 3502 is included so that the reader can access the full TCRS map and no more in a single efficient read operation. This pointer points to the first word of the TCRS Map, here Version Code word 3530. In certain examples, the TCRS Map may be stored in the User memory bank of an IS O/IEC 18000-6C tag.

The TCRS Map also comprises a status word 3528. Above that are three words specifying the size of the User memory, followed by Block Size indicator word 3520. The block size is used in certain memory access commands. For example, TCRS Map Entry 1 for Capabilities 3518 points to the address of the Capabilities File 3512, and provides information as to the used and maximum allowed size of this file. TCRS Map Entry 2 3516 provides similar directory information for the Settings File 3514. The single read of the TCRS Map may also provide the version and directory information needed for the reader to access Tag Capabilities File 3512 and Tag Settings File 3514. In certain embodiments, the Tag Capabilities file is stored in "locked" memory for security, and the Tag Settings File will be in "unlocked" memory for reader updating.

FIG. 36A provides an example of a Battery Capabilities Word (BCW) in a Capabilities File according to various embodiments of the invention. This illustration provides a small fraction of the myriad possible operating capabilities that the tag may have and that the reader may be aware of.

FIG. 36B provides an example of a Battery Settings Word (BSW) that may be part of a Settings File according to various embodiments of the invention. This particular word shows the feature of tag receiver duty cycling. Since RFID tags spend most of their time listening and not transmitting, the listen mode power consumption is critical. In general, better sensitivity in tag receivers requires more power consumption, so there is an inherent trade-off between sensitivity and battery life. One way to optimize this operation is to "duty cycle" the tag wherein it periodically listens for some period of time, the shuts down to save power. This repeats at a rate suitable to maintain low latency. To best serve various applications the duty cycling may be adjustable. A preferred way to control this adjustment is via the Battery Settings Words disclosed herein.

N. RF Power and Interference Control in the Class 3, Class 3 Plus, and Class 4 Cases "Power leveling" is a term for transmit power control that has its origins in the cellular industry, where a group of handset transmit signals as viewed on a spectrum analyzer display at the base station have similar received power or "level". Powers that are "level" to within the transmitted adjacent channel splatter of the handsets keeps the splatter from one handset from unacceptably interfering one channel over, allowing the base station to keep handset signals separated by frequency filtering. By also keeping power as low as is consistent with reliable communications, interference is geographically limited, allowing frequency reuse at shorter ranges and thus maximizing use of the radio spectrum. Lower powers also greatly reduce the creation of higher order, particularly $3^{rd}$ order, intermodulation products. Because $3^{rd}$ order products are "in-channel" they cannot be filtered off. Since they grow proportional to the $3^{rd}$ power of the driving sources (3 dB per dB), they drop rapidly as power is reduced and thus are much more manageable for lower receive powers. Hence, power leveling has become standard practice in dense wireless systems, which are by their nature "interference limited".

In RFID, the reader is comparable to the base station of a cellular system, but it does not intentionally simultaneously listen to multiple tags at the same time whose power must be "leveled" as seen at the reader. Hence the term "power leveling" is not exactly analogous. What is really needed in RFID is "power control", and particularly of the readers in order to prevent reader on reader and reader on tag interference. However, in this disclosure the phrase "power leveling" is used as a pseudonym for "power control" since it is such a common wireless industry term.

Various embodiments of the invention provide variations of power control suited to the asymmetric link physics of backscatter RFID. In the case of battery tags, this physics leads to the need for ultra-sensitive readers, and this in turn requires strict power control on the part of other readers in order to control the interference they impose both by splatter and by intermodulation product creation in victim readers. The wideband nature of the direct detector receiver in the tag, which normally simultaneously listens to the entire regulatory band allocated to the RFID system, is also prone to high interference as the tag becomes more sensitive. Thus, there is a compelling need for power control in these RFID systems.

Reader-on-reader interference is particularly troublesome in Semi-Passive Class 3 in forward mode because the readers are extra sensitive as compared to passive systems. Co-channel and even adjacent channel transmission at higher powers can cause interference at great distances. For this reason "split band plans" that separate the forward and reverse links into separate band segments with sufficient safety band of unused frequency between them for good filtering at the reader would be of great benefit. A particular troublesome case of readers interfering with other readers occurs when they are trying to listen to weak tag backscatter. Advantageously, in the split band plan case the interference from readers nearby in frequency is not spread out by forward modulation (only quiet carriers to support backscatter are near in frequency) where it overlays desired tag sidebands. Thus, in the case of split band plans the selectivity of the reader may be used to reject the nearby in frequency enemy reader carriers.

In the absence of such split band plans, the use of power leveling is even more important, since an enemy reader may be in the very next channel to the one where a reader is listening to low level tag replies, and if it is at high power its splatter may easily interfere with tag backscatter. Based on the extended command set disclosed herein, advantageous methods of power level control may be implemented.

According to various embodiments of the invention, the use of precision programmable timers in the tags are used relative to RFID power control and the use of intelligently controlled and sometimes differing forward and reverse reader powers are employed. Both of these are extensions of the power control within the practice of RFID and certain embodiments may be explained referring to FIGS. 2, 3, 37 and 38.

Reviewing FIG. 2, it is apparent to one of skill in the art that there is a large difference in required tag and reader sensitivity due to the asymmetric link physics of backscatter systems. When tags are extended to sensitivities of −40 dBm and below, the limits of noise physics do not allow the reader to maintain a matched link in the case of equal forward and reverse reader power. At a tag receive sensitivity of −40 dBm, attained with the square law receiver methods according to embodiments of the invention, the reader would have to attain and use a sensitivity of −110 dBm to keep up. This is right at the limit of physics and is very difficult to attain. As an example, a truly outstanding reader in current technology might attain −105 dBm relative to total received backscatter counting backscatter carrier and sidebands. Lower levels corresponding to tag sensitivities much below −40 dBm are not attainable at practical data rates.

To maintain system performance it may become necessary for the reader to actually be able to use the full sensitivity that it does attain. Thus for Class 3 systems interference as seen at the reader at the frequency where tag sidebands lie preferably should have a level constrained to be about −110 to −120 dBm and below. Interference as seen at the tag anywhere in the band during the time the tag is receiving should be on the order of at least 10 dB below the desired reader signal as seen at the tag, and preferably at a general level below about −50 to −70 dBm. Higher levels can be temporarily allowed through time coordination and through locally higher desired powers that overcome interference levels, but in accordance with the material presented in this application, the need for low interference levels is clear.

A review of FIG. 3 reveals the opportunity for reduced forward transmission power levels as compared to reverse backscatter supporting carrier power levels. At typical Class 3 RFID ranges of a few meters to a few tens of meters, this difference can be approximately 10 to 40 dB. Reducing forward carrier power several tens of dB on average allows for much lower interference levels as seen at the reader due to spectral splatter than can overlay tag sidebands as seen in the reader. Stated another way, the backscatter supporting reverse link power should generally be higher than the forward link power by about 10 to 40 dB. Due to the non-linear nature of intermodulation product creation, it reduces intermodulation product interference even more. For example, a 20 dB reduction in $3^{rd}$ order intermodulation creating powers reduces the created $3^{rd}$ order products by 60 dB.

Figure 37:
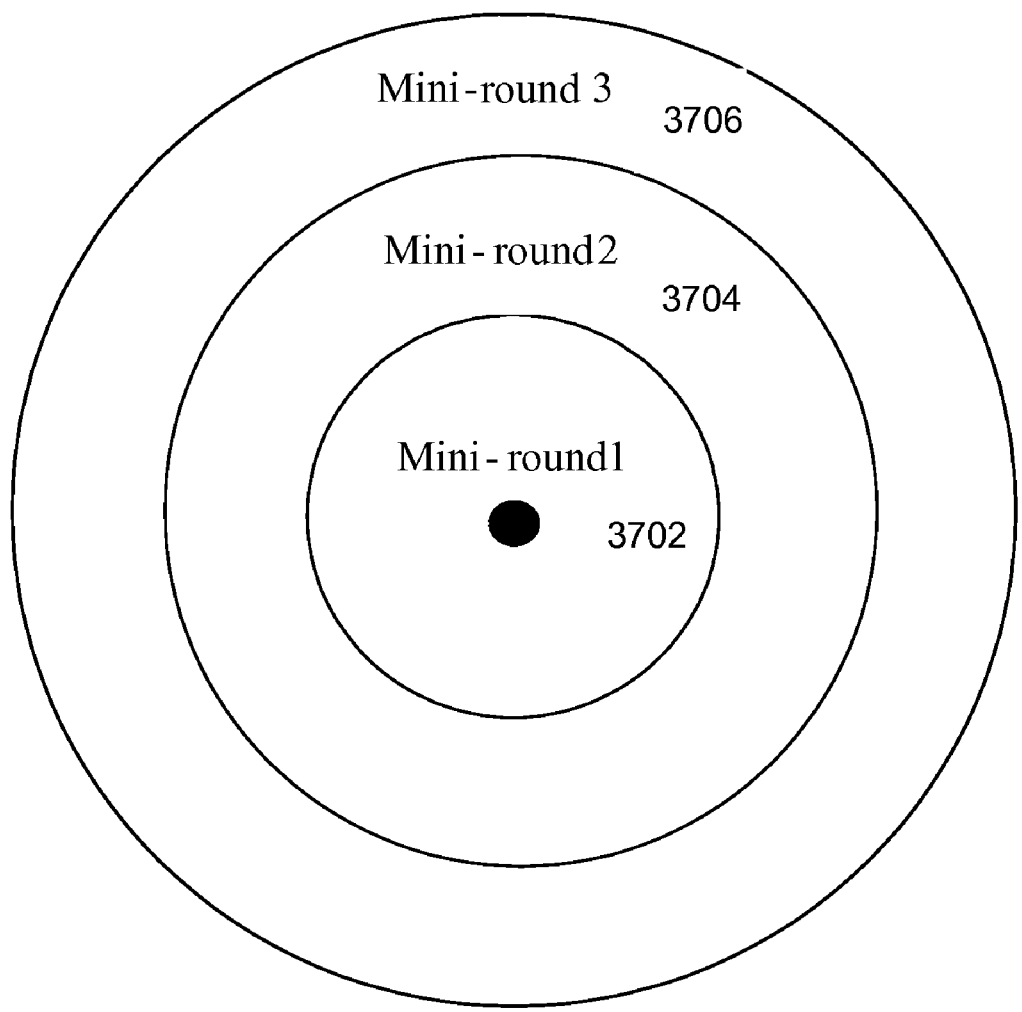
FIG. 37 conceptually illustrates mini-rounds used to discover and communicate with a plurality of tags according to various embodiments of the invention.

FIG. 37 illustrates the concept of "mini-rounds" used to discover and communicate with a plurality of tags according to various embodiments of the invention. The mini-round concept is actually applicable to Class 1, Class 2, Class 3, Class 3 Plus, Class 4, and mixed class system. Here three mini-rounds 3702, 3704, and 3706 are depicted, but circumstances of a particular system may lead to a different number. Geometrically tags in a logical mini-round tend to be in band between a minimum range and a maximum range suited to the forward power level in use in a particular mini-round.

The general method of working with mini-rounds is for closer tags to be accessed at lower reader transmit powers, and then put to sleep with precision reader controlled timers running that prevent their responding to Activation commands aimed at more distant tags using higher reader power. When accessing more distant mini-round tags, the reader has already accessed closer tags at a lower power, and is not using sufficient power to reach beyond a certain maximum range. The timer values chosen by the reader are based upon the expected number of tags, the data rates in use, the amount of information to be read from the tags, the interference suffered, any necessity for the reader to refrain from access due to time sharing of the radio band with other readers, and other factors. However, the time is picked with the intent that the reader can conduct a full set of mini-rounds out to a maximum desired range before the inner ring tags time out and begin responding.

In certain embodiments of the invention, each mini-round is a separate logical Query round, and within each such mini-round/Query round there may be separate "quasi-rounds" used with the "QueryAdjust" command in order to resolve tag collisions from tags that use the same time slot. The general method of tag singulation, as the tags have only wideband receivers, is to separate tag replies in time using random time slots. This wastes some time for slots where no tags reply, but allows the key cost and power reducing factor of wideband tag receivers. By using a sufficiently large number of random time slots relative to the tag population, most tags are read without collision. The small number of tags that do collide are then efficiently read in a follow up "quasi-round" using a smaller number of random time slots suited to the number of tags that actually collided.

If the reader miscalculates the time needed and inner mini-ring tags are about to time out, the reader may revert to low power, awaken those tags by pointing to state B in the Activation command (the state indicating that the timer is running), and reprogram or "refresh" the timers. The tags may then be put back to sleep at the same time with Deactivate_BAT without being accessed. If some but not all tag timers in a mini-round have expired, the reader may use a "Don't Care" on Timer/Session flag state. All tags in range will wake up, possibly including some that are better associated with other readers, and all these will have their timers associated with the activation session reprogrammed. However, since there are independent timers available for each of the four session flags, this accidental programming is not a serious problem.

In certain embodiments of the invention, readers may broadcast information about the forward and reverse powers to enable BATs to adjust their backscatter power, effectively enabling reverse link power control. There may be certain systems that are required to limit tag emissions, such as those deployed in Europe which has enacted regulations limiting the amount of tag emissions. Information about reader transmit power in combination with measured link loss in the tag allows the tag to meet these limitations by appropriately controlling the fraction of maximum available backscatter that it reflects.

In a "matched" receiving state, a tag antenna has a load impedance equal to the antenna impedance (which is mostly radiation resistance for an efficient antenna). While receiving maximum available power, the antenna will also reradiate some amount of power. In the "matched" case where antenna impedance is correctly conjugately matched to load impedance, equal current actually flows in both the antenna and the load, and the antenna actually reradiates (backscatters) just as much power as is delivered to the load. Maximum possible backscatter is theoretically four times larger than the maximum receive power at the tag for a given field due to the fact that if a short is switched across the tag antenna, then the current flow induced in the antenna doubles since total impedance limiting current flow is cut in half. As such, there is no power delivered to the zero impedance "load," (since power=$i^2 R$, and "R" is zero) and power backscattered goes up as the square of the current. If this power is found to be in violation of regulations for the measured receive power, then the tag may calculate how much it should degrade or limit the backscatter in order to meet the regulatory requirements, because the tag is aware of how much reader power will go up when the reader transitions from its own transmit to receive state. As described earlier, this information may be coded in a field in commands that precede tag transmissions. The Class 3 tags can use the information on the difference between forward and reverse power in order to be aware of the carrier power that the reader sends in reverse mode, in order to in turn control their emissions based on reflective backscatter. This control may advantageously be in a precise closed loop or feedback form. Such a feedback loop may be analog or digital, or a combination.

The Class 3 tag does not have to be aware of the actual link loss to control its emissions, as it generally simply needs to know what the reverse carrier is at its operating range so that it does not over reflect that available power and thus exceed desired tag emissions. It can know the available power for backscattering by measuring the received forward power and understanding the difference between forward and reverse reader power in a variety of ways. These powers could be the same, have a fixed difference, a temporarily fixed difference, or a difference that the reader dynamically informs the tag of in activation and other commands. The reader can also fine tune the backscatter supporting carrier power it sends. For example, if the reader senses that backscatter power from a particular tag is more than it needs, it may in its communication with that particular tag reduce its backscatter power with or without informing the tag. This has the additional benefit of reducing reader on tag interference to other tags that may be trying to hear their own readers in forward mode at this same time. Recall that since the tag receiver is wideband, it has little rejection of "enemy" reader transmissions.

The reader power preferably also varies with the interference situation, and with the performance of the particular reader. For example, if the highest 10 dB of reader transmit carrier power desensitizes the reader receiver due to carrier leakage and phase noise effects, then the only reason for the reader to use reverse carriers in the highest 10 dB is to overcome interference. That reader should then preferably only use the highest 10 dB of its own backscatter supporting carrier if it senses it needs to overcome interference. This amount of self desensitizing also varies with subcarrier and data rate in use, so may be intelligently adapted as a function of these parameters. A well designed Class 3 reader may achieve full sensitivity at full power with larger subcarriers, but generally not with smaller subcarriers.

The reader may adjust the data rates used in each mini-round in addition to adjusting its power level. In the reverse link limited instance of longer range Semi-Passive Class 3 operations, a lower tag data rate allows a reader to adjust its channel bandwidth to a lower value, thus reducing its noise floor and allowing improved SNR, and thus successful communication.

Class 3 Plus and Class 4 tags need the actual link loss so that they may tailor their transmit power to overcome that link loss. Class 3 Plus and Class 4 tags can calculate such link loss if they are informed by the reader of its forward link power, as they can measure the receive power they see from the reader, with the difference between transmit reader power and that received at the tag being the link loss. They may then set their transmit power to deliver a desired receive power at the reader. The reader may instruct them to adapt that power as necessary to have sufficient receive power, but not an excess of wasted power than only increases interference. Class 3 Plus and Class 4 power leveling will be covered in detail towards the end of this section.

Figure 38:
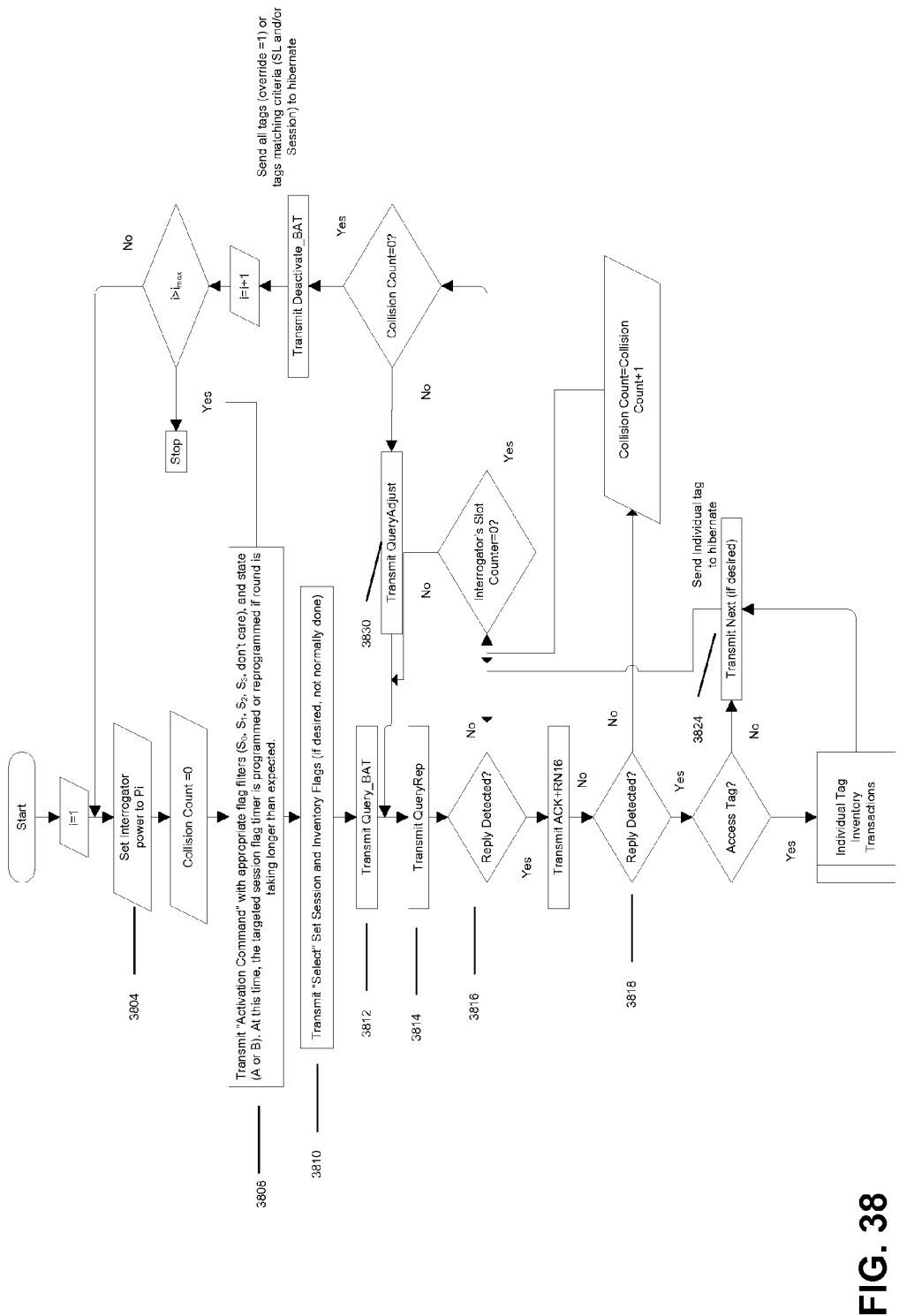
FIG. 38 is a flowchart illustrating a method for forward power control according to various embodiments of the invention.

FIG. 38 is a flowchart illustrating an exemplary forward power control methods according to various embodiments of the invention, particularly for Class 3 systems. The Class 3 power leveling also applies to Class 3 Plus and Class 4 tags operating in their Class 3 "fallback" mode, which they may be expected to do a significant fraction of the time in order to maximize their battery life.

This particular example uses the flag names defined in EPCglobal™ Gen 2 standard version 1.2.0 with the Class 3 extensions of ISO/IEC 18000-6C, and assumes a mini-round based system. One skilled in the art will recognize that other flag naming protocols may be used as well as variations to the mini-round discovery operations.

When power leveling in Class 3 systems, a reader may send an Activation command at a low power $P_1$ over a set of powers $P_i$ 3804, optionally using the tag-to-reader locking and/or session locking features, which wakes up nearby tags of the desired type and inventory flag state. As the tags are awakened their timers are programmed for a time that the reader judges adequate to complete a full set of mini-rounds. The reader then issues Select command 3810 (if desired), though with the disclosed method of a "mini-select" built into the Query_BAT commands for both Advanced PIE and Manchester, the Select command is often not needed. The reader next sends the Query_BAT command 3812 for the reader's assigned session, still using lowest forward transmit power $P_1$. All tags matching the Query criteria enter into the mini-round.

Modern UHF RFID systems based on EPCglobal™ Gen 2 standard version 1.2.0 separate tags in time in a logical Query round (each mini-round) by use of random numbers generated in the tag and loaded into a counter that is decremented by a reader command (the QueryRep command). As tags count to zero, they may be generally individually accessed (singulated) because the random counter was selected large enough to allow for reliably separating most of the tags in time. Those that "collide" on the same random "slot" start over with their counter at a high value that would generally never be counted down to zero, simply expecting to later enter another "quasi-Query round" via the QueryAdjust command where they get a new and smaller random number to count down. When tags reach counter value zero, they reply 3816, and read and/or write operations are individually conducted. At the conclusion of reader access, the reader sends a QueryRep 3814 or QueryAdjust 3830 to get to the next tag, and the Inventory flag of the just inventoried tag changes state. In other words, the state changes to logical state "B", meaning it has been accessed and should not reply until reset to "A" by either a "Select" command. Generally it will not be accessed again, simply put to sleep with timer running and not accessed again until after the timer expires.

On this same QueryRep 3814, another tag may reply with its RN16 or other identifier which is noted by the reader. But, before the reader deals with the new tag, it first puts the tag it last accessed back to the hibernate or sleep state by sending the Next 3824 command with the RN16 handle of the previous tag. The last tag then goes to the hibernate mode with its inventory flag set to B, and it stays in B until timing out or until awoken and reprogrammed via a new Activation command that deliberately activates on timer/inventory flag state A (normally only done if "refreshing" of the timer is needed). Note that the Next command is generally preferred to put tags back to sleep if there have been any collisions, as use of Deactivate_BAT would also send the tags that collided and were not accessed back to sleep. Since the reader is not always sure if there have been collisions, and cannot know if there will be collisions as the mini-round progresses, Deactivate_BAT is in general reserved for low tag density situation and the timer "refresh" operation described above under the discussion of FIG. 37.

When the reader has stepped through the $2^Q-1$ QueryReps 3814 needed for this "mini-round," it repeats with QueryAdjust 3830 and a smaller Q if there were collisions 3818 leaving a few tags left unread in that particular mini-round.

When there are no collisions 3818, the reader is ready to step up to the next higher power level $P_2$, and issues a new Activate command 3808, thus waking up more distant tags of the desired type. The tags just accessed are all in timer state B in hibernate and do not respond to this next higher power Activate command. The inventory process is then repeated with this new set of tags. The reader knows the timeout period and earlier low power level of the tags it has put back to hibernate, and if the total length of the round approaches the flag reset time it reverts to low power, wakes those tags back up with inventory flag state set to their current state or "don't care", and resets their timers. It then reverts to higher power and completes the round.

This process is repeated over however many mini-rounds are appropriate for the local system design and interference environment. In general, a larger number of mini-rounds reduces interference because there are then only a small number of tags that are accessed at higher reader powers. A small number of tags accessed at higher power equates to a small time being used for high power operations, thus statistically reducing the incidence of interference.

Next is covered the special case of Class 3 Plus and Class 4 when they are using their active transmit capability. The active transmit capability of these modes relieves the greatest weakness of the Class 3 system, which is the reverse link limit and sometimes impossibility of the reader attaining adequate sensitivity to maintain a matched link with a sensitive square law tag. Even if the reader does attain outstanding sensitivity, it may still be subject to interference in some cases where its full sensitivity may not be taken advantage of. The part-time active transmit capability of the Class 3 Plus and Class 4 system can lift the effective transmit power of the tags by many tens of dB's, and do so within the limits of a small battery such as a lithium coin cell. This lifts the receive power as seen at the reader to be well above its sensitivity level, and in well controlled system implementations well above the interference level as well. The Class 4 tag has the additional advantage of part time higher sensitivity in the tag, and far more selectivity, than a square law receiver can provide, while still maintaining square law receive capability for maximum battery life.

However, active RFID still requires transmit power level control. Furthermore, when fully integrated with semi-passive Class 3 as disclosed herein, the active tag transmit levels can cause significant interference to Class 3 operations. The power leveling used in the active modes needs full integration with the hibernate mode of Class 3 for maximum total system performance.

A preferred embodiment to achieve these goals is to design the power leveling into the activation and normal mode command sets, whereby power leveling commences in activation and gracefully continues across the wake-up to normal mode operations. This is achieved by providing the Class 3 Plus and Class 4 tags with not only the extensible activation command to control their active circuitry, but also with the key reader transmit and receive information needed for power control as part of the activation command. These tags can measure their own receive power in hibernation or quasi-hibernation (a low power but not fully activated state that may occur after signal detection and passing a test such as PN sequence correlation as presented earlier) before full activation. If they are then informed in the activation process of the reader power, they may calculate path loss. They may then calculate their own desired transmit power in order to present a desired received power as seen by the reader. They may also be instructed by the reader to use a given transmit power that the reader system control software chooses because of the need to control tag to reader range, and/or to place tag transmit powers at desired levels as compared to interference.

This process of informing the tag of necessary link parameters preferably begins in activation and continues to most normal mode commands. Every command received by the tag is an opportunity to adjust the link parameters so as to track path loss variation due to multi-path fade, or to adjust relative to changing interference, without using excessive or unnecessarily high powers that cause interference. It is the best band citizenship possible.

In certain embodiments several variations of tag transmit power control are provided. For example, to limit tag to reader range the tag may be instructed to transmit a given power level that the reader instructs it to. This level varies with desired range, data rate, reader sensitivity, interference, and other factors. Alternately, the reader may instruct the tag to calculate its own transmit power based on desired receive power at the reader, a parameter that may be communicated to the tag in the fields of FIG. 32. From either an initially commanded tag transmit power or one the tag calculates based on information provided by the reader, the reader may on every command adjust the tag transmit power, either in absolute terms (such as transmit "X" dBm) or relative terms (such as adjust last transmit power up or down "Y" dB). The inherent high level of reader control over the tags with a high density of reader commands under EPC Gen 2 derived protocols is ideal for managing tag transmit power on a dynamic basis.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for communicating between an RFID reader and a plurality of RFID tags, the method comprising:
   the RFID reader transmitting at a first carrier power level in a forward link that communicates information from the RFID reader to a first set of RFID tags and a second set of RFID tags within the plurality of RFID tags; and
   the RFID reader compensating for reverse link propagation behavior by transmitting at a second carrier power level supporting reverse link backscatter communications from the first set of RFID tags and the second set of RFID tags to the RFID reader, the second carrier power level being higher than the first carrier power level,
   wherein a lower subcarrier frequency for the reverse link communications is used for communication between the RFID reader and the first set of RFID tags within the plurality of RFID tags and a second higher subcarrier frequency is used for communication between the RFID reader and the second set of RFID tags within the plurality of RFID tags, the first set of RFID tags being proximately closer to the RFID reader than the second set of RFID tags,
   wherein at least one additional forward link power level is used by the RFID reader, a first forward power level being used to communicate with the first set of RFID tags within the plurality of RFID tags and a second forward power level being used to communicate with the second set of RFID tags within the plurality of RFID tags, and the first forward power level being smaller than the second forward power level,
   wherein a first higher data rate is used for the communication between the RFID reader and the first set of RFID tags within the plurality of RFID tags and a second lower data rate is used for the communication between the RFID reader and the second set of RFID tags within the plurality of RFID tags,
   wherein the RFID reader sends instructions to the first set of RFID tags within the plurality of RFID tags for causing the first set of RFID tags to adjust their transmit power,
   wherein the RFID tags in the first set that have been accessed are placed into a non-responsive state for a predetermined period of time by the RFID reader after having been accessed for preventing the tags in the first set that are in the non-responsive state from responding to the RFID reader when the RFID reader is communicating with the second set of RFID tags.

2. The method of claim 1, wherein the RFID reader adjusts its reverse carrier transmit power in response to a particular one of the RFID tags within the plurality of RFID tags in order to not use more power in both forward and reverse modes than necessary when the RFID reader is communicating with the particular one of the RFID tags, the adjusted carrier power resulting in the average forward reader carrier power and the average reverse link tag backscatter power being reduced.

3. The method of claim 1, wherein the RFID tags in the first and second sets of RFID tags are in one or more tag class types selected from a group consisting of Class 1, Class 2, Class 3, Class 3 Plus, and Class 4.

4. The method of claim 3 wherein an RFID tag with optional active transmit capability is using its backscatter transmitter for reverse link communications from tag to reader.

5. The method of claim 1 further comprising:
   returning the RFID tags in the first set of RFID tags that were successfully accessed at a first reader forward mode power level to a hibernate state;
   initiating a timer operation in each of the RFID tags in the first set of RFID tags that are returned to the hibernate state, the timer operation defining a period of time; and
   preventing the RFID tags in the first set of RFID tags that are returned to the hibernate state from responding to an activation command at a second reader forward power level during the period of time, the second reader forward power level being higher than the first reader forward power level; and
   wherein a flag state stored in each of the RFID tags within the first set of RFID tags that are returned to the hibernate state indicates whether the timer operation is active to prevent undesired activation of the RFID tags within the first set of RFID tags that are returned to the hibernate state at the second reader forward power level.

6. The method of claim 1, further comprising placing the RFID tags in the first set of RFID tags within the plurality of RFID tags in the non-responsive state until expiration of a timer indicative of the amount of time for preventing the tags in the first set that are in the non-responsive state from responding to the RFID reader when the RFID reader is communicating at the second forward power level.

7. The method of claim 6, wherein the RFID reader sets the period of time.

8. The method of claim 1, wherein the RFID reader sends information indicative of the difference between the first carrier power level and the second carrier power level to the RFID tags in the first and/or second sets of RFID tags within the plurality of RFID tags in a command for causing the RFID tags receiving the command to adjust a percentage of incident power reflected as backscatter power based on the information.

9. The method of claim 2, wherein the RFID reader identifies one of the RFID tags within the plurality of RFID tags that is beyond a maximum backscatter range and accesses a memory thereof, wherein the RFID reader adjusts its second carrier power level to a level no higher than is necessary to access other tags within the plurality of RFID tags that are within the maximum backscatter range at the adjusted level.

10. The method of claim 9, wherein the RFID tag that is beyond the maximum backscatter range uses an active transmitter to respond to the RFID reader.

11. The method of claim 1, wherein the RFID reader adjusts its reverse carrier transmit power in response to a particular one of the RFID tags within the plurality of RFID tags in order to not use more power in both forward and reverse modes than necessary when the RFID reader is communicating with the particular one of the RFID tags, the adjusted carrier power resulting in the average forward reader carrier power and the average reverse link tag backscatter power being reduced, wherein the RFID reader sets the period of time.

12. The method of claim 1, wherein the RFID reader adjusts its reverse carrier transmit power in response to a particular one of the RFID tags within the plurality of RFID tags in order to not use more power in both forward and reverse modes than necessary when the RFID reader is communicating with the particular one of the RFID tags, the adjusted carrier power resulting in the average forward reader carrier power and the average reverse link tag backscatter power being reduced, wherein the RFID reader sends information in a command, the information being indicative of the difference between the first carrier power level and the second carrier power level to the RFID tags in the first and/or second sets of RFID tags within the plurality of RFID tags for causing the RFID tags receiving the command to adjust a percentage of incident power reflected as backscatter power based on the information.

13. The method of claim 1, wherein the RFID reader sets the period of time.

14. A method for communicating between an RFID reader and a plurality of RFID tags, the method comprising:
the RFID reader transmitting at a first carrier power level in a forward link that communicates information from the RFID reader to a first set of RFID tags and a second set of RFID tags within the plurality of RFID tags; and
the RFID reader compensating for reverse link propagation behavior by transmitting at a second carrier power level supporting reverse link backscatter communications from the first set of RFID tags and a second set of RFID tags to the RFID reader, the second carrier power level being higher than the first carrier power level,
wherein a lower subcarrier frequency for the reverse link communications is used for communication between the RFID reader and the first set of RFID tags within the plurality of RFID tags and a second higher subcarrier frequency is used for communication between the RFID reader and the second set of RFID tags within the plurality of RFID tags, the first set of RFID tags being closer to the RFID reader than the second set of RFID tags,
wherein the RFID reader sends instructions to the first set of RFID tags within the plurality of RFID tags for causing the first set of RFID tags within the plurality of RFID tags to adjust their transmit power,
wherein the RFID reader sends forward link power data to the second set of RFID tags within the plurality of RFID tags for enabling the second set of RFID tags within the plurality of RFID tags to select the transmit power of the second set of RFID tags based on the forward link power data,
wherein the RFID tags in the first set that have been accessed are placed into a non-responsive state for a predetermined period of time by the RFID reader after having been accessed for preventing the tags in the first set that are in the non-responsive state from responding to the RFID reader when the RFID reader is communicating with the second set of RFID tags.

15. The method of claim 14, wherein at least one additional forward link power level is used by the RFID reader, a first forward power level being used to communicate with the first set of RFID tags within the plurality of RFID tags and a second forward power level being used to communicate with the second set of RFID tags within the plurality of RFID tags, and the first forward power level being smaller than the second forward power level.

16. The method of claim 14, wherein a first higher data rate is used by the RFID reader for the communication with the first set of RFID tags and a second lower data rate is used for the communication with the second set of RFID tags.

17. The method of claim 14 wherein higher reader sensitivity results from the use of the second higher subcarrier frequencies in an exemplary case of phase noise limited reader sensitivity.

18. The method of claim 14, wherein at least one additional forward link power level is used by the RFID reader, a first forward power level being used to communicate with the first set of RFID tags within the plurality of RFID tags and a second forward power level being used to communicate with the second set of RFID tags within the plurality of RFID tags, and the first forward power level being smaller than the second forward power level, wherein a first higher data rate is used for communication between the RFID reader and the first set of RFID tags and a second lower data rate is used for communication between the RFID reader and the second set of RFID tags.

19. The method of claim 14 wherein closer range tags that have been accessed at a lower reader transmit power level are placed in a non-responsive state until expiration of a timer.

20. The method of claim 14, wherein the RFID reader adjusts its reverse carrier transmit power in response to a particular one of the RFID tags within the plurality of RFID tags in order to not use more power in both forward and reverse modes than necessary when the RFID reader is communicating with the particular one of the RFID tags, the adjusted carrier power resulting in the average forward reader carrier power and the average reverse link tag backscatter power being reduced, wherein a first higher data rate is used for communication between the RFID reader and the first set of RFID tags and a second lower data rate is used for communication between the RFID reader and the second set of RFID tags.

21. The method of claim 14, further comprising placing the RFID tags in the first set within the plurality of RFID tags in the non-responsive state for a period of time, wherein the RFID reader sets the period of time.

22. A method for communicating between an RFID reader and a plurality of RFID tags, the method comprising:
- the RFID reader transmitting at a first carrier power level in a forward link that communicates information from the RFID reader to a first set of RFID tags and a second set of RFID tags within the plurality of RFID tags; and
- the RFID reader compensating for reverse link propagation behavior by transmitting at a second carrier power level supporting reverse link backscatter communications from the first set of RFID tags and a second set of RFID tags to the RFID reader, the second carrier power level being higher than the first carrier power level,
- wherein a lower subcarrier frequency for the reverse link communications is used for communication between the RFID reader and the first set of RFID tags within the plurality of RFID tags and a second higher subcarrier frequency is used for communication between the RFID reader and the second set of RFID tags within the plurality of RFID tags, the first set of RFID tags being proximately closer to the RFID reader than the second set of RFID tags,
- wherein at least one additional forward link power level is used by the RFID reader, a first forward power level being used to communicate with the first set of RFID tags within the plurality of RFID tags and a second forward power level being used to communicate with the second set of RFID tags within the plurality of RFID tags, and the first forward power level being smaller than the second forward power level,
- wherein the RFID reader adjusts its reverse carrier transmit power in response to a particular RFID tag in the first set of RFID tags within the plurality of RFID tags in order to not use more power in both forward and reverse modes than necessary, the adjusted carrier power resulting in the average forward reader carrier power and the average reverse link tag backscatter power being reduced,
- wherein a first higher data rate is used by the RFID reader for the communication with the first set of RFID tags within the plurality of RFID tags and a second lower data rate is used by the RFID reader for the communication with the second set of RFID tags within the plurality of RFID tags,
- wherein higher reader sensitivity results from the use of the second higher subcarrier frequencies in an exemplary case of phase noise limited reader sensitivity,
- wherein the RFID tags in the first set that have been accessed are placed into a non-responsive state for a predetermined period of time by the RFID reader after having been accessed for preventing the tags in the first set that are in the non-responsive state from responding to the RFID reader when the RFID reader is communicating with the second set of RFID tags.

23. A method for communicating between an RFID reader and a plurality of RFID tags, the method comprising:
- the RFID reader transmitting at a first carrier power level in a forward link that communicates information from the RFID reader to a first set of RFID tags and a second set of RFID tags within the plurality of RFID tags; and
- the RFID reader compensating for reverse link propagation behavior by transmitting at a second carrier power level supporting reverse link backscatter communications from the first set of RFID tags and a second set of RFID tags to the RFID reader, the second carrier power level being higher than the first carrier power level,
- wherein a lower subcarrier frequency for reverse link communications is used for communication between the RFID reader and the first set of RFID tags within the plurality of RFID tags and a second higher subcarrier frequency is used for communication between the RFID reader and the second set of RFID tags within the plurality of RFID tags, the first set of RFID tags being proximately closer to the RFID reader than the second set of RFID tags,
- wherein the RFID reader sends information in a command, the information being indicative of the difference between the first carrier power level and the second carrier power level to the RFID tags in the first and/or second sets of RFID tags within the plurality of RFID tags for causing the RFID tags receiving the command to adjust a percentage of incident power reflected as backscatter power based on the information,
- wherein the RFID tags in the first set that have been accessed are placed into a non-responsive state for a predetermined period of time by the RFID reader after having been accessed for preventing the tags in the first set that are in the non-responsive state from responding to the RFID reader when the RFID reader is communicating with the second set of RFID tags.

24. The method of claim 23, wherein at least one additional forward link power level is used by the RFID reader, a first forward power level being used to communicate with the first set of RFID tags within the plurality of RFID tags and a second forward power level being used to communicate with the second set of RFID tags within the plurality of RFID tags, and the first forward power level being smaller than the second forward power level, wherein a first higher data rate is used for communication between the RFID reader and the first set of RFID tags and a second lower data rate is used for communication between the RFID reader and the second set of RFID tags.

* * * * *